(12) United States Patent
Takikawa et al.

(10) Patent No.: US 10,364,864 B2
(45) Date of Patent: *Jul. 30, 2019

(54) DAMPER DEVICE

(71) Applicant: AISIN AW CO., LTD., Anjo-shi, Aichi-ken (JP)

(72) Inventors: Yoshihiro Takikawa, Tsushima (JP); Hiroki Nagai, Anjo (JP); Masaki Wajima, Nagoya (JP); Takao Sakamoto, Anjo (JP); Kazuhiro Itou, Anjo (JP); Nobuo Suzuki, Toyohashi (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/562,761

(22) PCT Filed: Jun. 8, 2016

(86) PCT No.: PCT/JP2016/067038
§ 371 (c)(1),
(2) Date: Sep. 28, 2017

(87) PCT Pub. No.: WO2016/199806
PCT Pub. Date: Dec. 15, 2016

(65) Prior Publication Data
US 2018/0080524 A1  Mar. 22, 2018

(30) Foreign Application Priority Data

Jun. 8, 2015 (JP) ................. 2015-115845
Jul. 27, 2015 (JP) ................. 2015-147598
Nov. 30, 2015 (JP) ................. 2015-233741

(51) Int. Cl.
F16F 15/134 (2006.01)
F16F 15/123 (2006.01)
(Continued)

(52) U.S. Cl.
CPC .......... *F16F 15/13484* (2013.01); *F16D 3/12* (2013.01); *F16F 15/1236* (2013.01);
(Continued)

(58) Field of Classification Search
None
See application file for complete search history.

(56) References Cited

U.S. PATENT DOCUMENTS

2010/0096788 A1   4/2010 Farahati et al.
2017/0227088 A1*  8/2017 Takikawa .......... F16F 15/13492
(Continued)

FOREIGN PATENT DOCUMENTS

DE   10 2009 013 965 A1   9/2010
JP      2010-230155 A    10/2010
(Continued)

OTHER PUBLICATIONS

Aug. 9, 2016 International Search Report issued in International Patent Application No. PCT/JP2016/067038.
(Continued)

*Primary Examiner* — Timothy Hannon
(74) *Attorney, Agent, or Firm* — Oliff PLC

(57) ABSTRACT

A damper device that includes an input element to which torque from an engine is transferred; an output element; a first intermediate element; a second intermediate element; a first elastic body that transfers torque between the input element and the first intermediate element; a second elastic body that transfers torque between the first intermediate element and the output element; a third elastic body that transfers torque between the input element and the second intermediate element; a fourth elastic body that transfers torque between the second intermediate element and the output element; and a fifth elastic body that transfers torque between the first intermediate element and the second intermediate element.

20 Claims, 13 Drawing Sheets

(51) Int. Cl.
*F16H 45/02* (2006.01)
*F16D 3/12* (2006.01)

(52) U.S. Cl.
CPC .. *F16F 15/12366* (2013.01); *F16F 15/13476* (2013.01); *F16H 45/02* (2013.01); *F16H 2045/0231* (2013.01)

(56) References Cited

U.S. PATENT DOCUMENTS

2018/0073594 A1   3/2018   Takikawa et al.
2018/0080524 A1   3/2018   Takikawa et al.

FOREIGN PATENT DOCUMENTS

JP   2012-506006 A   3/2012
WO   2013/161493 A1   10/2013

OTHER PUBLICATIONS

Nov. 26, 2018 Office Action issued in U.S. Appl. No. 15/553,387.
Jul. 27, 2018 Office Action issued in U.S. Appl. No. 15/501,663.
May 17, 2016 International Search Report issued in International Patent Application No. PCT/JP2016/060849.
Oct. 27, 2015 International Search Report issued in International Patent Application No. PCT/JP2015/076065.
U.S. Appl. No. 15/501,663, filed Feb. 3, 2017 in the name of Takikawa et al.
U.S. Appl. No. 15/553,387, filed Aug. 24, 2017 in the name of Takikawa et al.

* cited by examiner

DAMPER DEVICE

BACKGROUND

The disclosure according to the present disclosure relates to a damper device that has an input element to which torque from an engine is transferred and an output element.

Hitherto, there has been known, as a damper device of this type, a double-path damper used in association with a torque converter (see JP 2012-506006 A, for example). In the damper device, a vibration path from an engine and a lock-up clutch to an output hub is divided into two parallel vibration paths B and C, and the two vibration paths B and C each have a pair of springs and a separate intermediate flange disposed between the pair of springs. In addition, a turbine of the torque converter is coupled to the intermediate flange of the vibration path B in order to make the natural frequencies of the two vibration paths different from each other, and the natural frequency of the intermediate flange of the vibration path B is lower than the natural frequency of the intermediate flange of the vibration path C. In such a damper device, in the case where the lock-up clutch is engaged, vibration from the engine is input to the two vibration paths B and C of the damper device. When engine vibration at a certain frequency reaches the vibration path B which includes the intermediate flange coupled to the turbine, the phase of vibration between the intermediate flange of the vibration path B and the output hub is shifted by 180 degrees with respect to the phase of input vibration. In this event, since the natural frequency of the intermediate flange of the vibration path C is higher than the natural frequency of the intermediate flange of the vibration path B, vibration which is input to the vibration path C is transferred to the output hub without causing a shift (deviation) of the phase. In this way, vibration of the output hub can be damped by shifting the phase of vibration transferred from the vibration path B to the output hub and the phase of vibration transferred from the vibration path C to the output hub by 180 degrees.

SUMMARY

In order to improve the vibration damping performance of the double-path damper described in JP 2012-506006 A mentioned above, it is necessary to appropriately set the natural frequencies of the vibration paths B and C by adjusting the spring constants of elastic bodies on both sides of the intermediate flanges and the weights of the intermediate flanges. If an attempt is made to make the natural frequencies of the vibration paths B and C appropriate by adjusting the spring constants of the elastic bodies, however, the rigidity of the entire double-path damper may be fluctuated significantly. If an attempt is made to make the two natural frequencies appropriate by adjusting the weights of the intermediate flanges and the turbine which is connected thereto, meanwhile, the weights of the flanges and the turbine, and hence the weight of the entire torque converter, may be increased. Thus, in the double-path damper described above, it is not easy to appropriately set the natural frequencies of the vibration paths B and C such that the vibration damping performance is improved, and vibration may not be damped well even by the damper device described in JP 2012-506006 A depending on the frequency of vibration to be damped.

An exemplary aspect of the disclosure provides a damper device that has higher vibration damping performance.

The present disclosure provides a damper device that includes an input element to which torque from an engine is transferred; an output element; a first intermediate element; a second intermediate element; a first elastic body that transfers torque between the input element and the first intermediate element; a second elastic body that transfers torque between the first intermediate element and the output element; a third elastic body that transfers torque between the input element and the second intermediate element; a fourth elastic body that transfers torque between the second intermediate element and the output element; and a fifth elastic body that transfers torque between the first intermediate element and the second intermediate element, in which: a natural frequency of the second intermediate element at a time when torque is transferred from the input element to the output element via all of the first to fifth elastic bodies is higher than a natural frequency of the first intermediate element at a time when torque is transferred from the input element to the output element via all of the first to fifth elastic bodies; and at least one of the third and fourth elastic bodies is disposed on a radially outer side of the first and second elastic bodies.

In the damper device, two natural frequencies can be set for the entire device when deflection of all of the first to fifth elastic bodies is allowed. The studies and the analyses conducted by the inventors revealed that the natural frequency of the damper device which included the first to fifth elastic bodies became lower as the rigidity of the fifth elastic body was lowered, and that variations in the equivalent rigidity of the damper device with respect to variations in the rigidity of the fifth elastic body were significantly small compared to variations in the equivalent rigidity of the damper device with respect to variations in the rigidities of the first to fourth elastic bodies. Thus, with the damper device according to the present disclosure, by adjusting the rigidity of the fifth elastic body, it is possible to set the two natural frequencies of the entire damper device appropriately while keeping the equivalent rigidity of the device appropriate and suppressing an increase in the weights (moments of inertia) of the first and second intermediate elements. Furthermore, the equivalent rigidity of the damper device can be further reduced by disposing at least one of the third and fourth elastic bodies corresponding to the second intermediate element, which has a higher natural frequency, on the radially outer side of the first and second elastic bodies corresponding to the first intermediate element, which has a lower natural frequency. As a result, the vibration damping performance of the damper device can be improved well.

DETAILED DESCRIPTION OF EMBODIMENTS

Now, an embodiment of the disclosure according to the present disclosure will be described with reference to the drawings.

Figure 1:
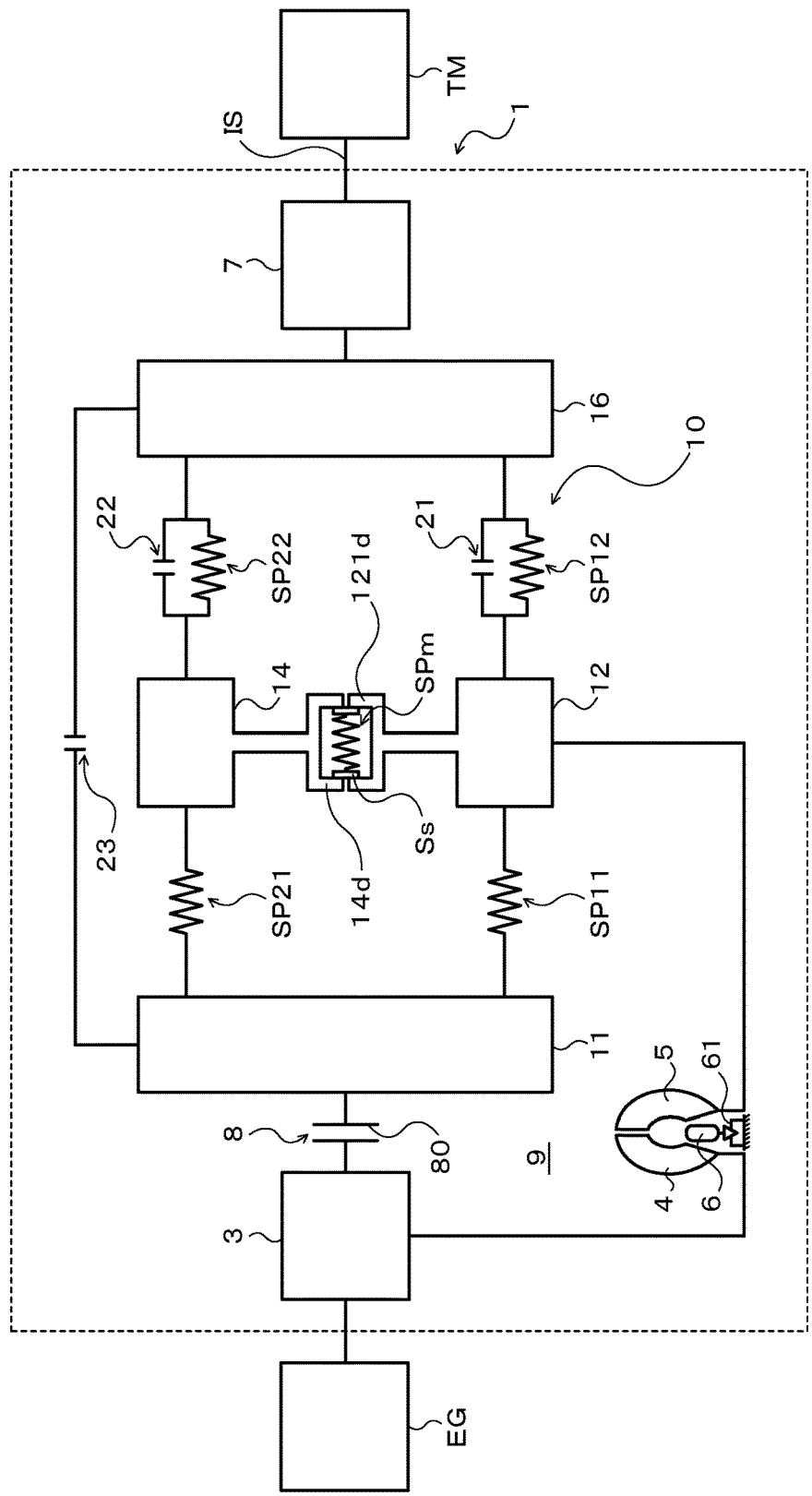
FIG. 1 is a schematic diagram illustrating a starting device that includes a damper device according to the present disclosure.
Figure 2:
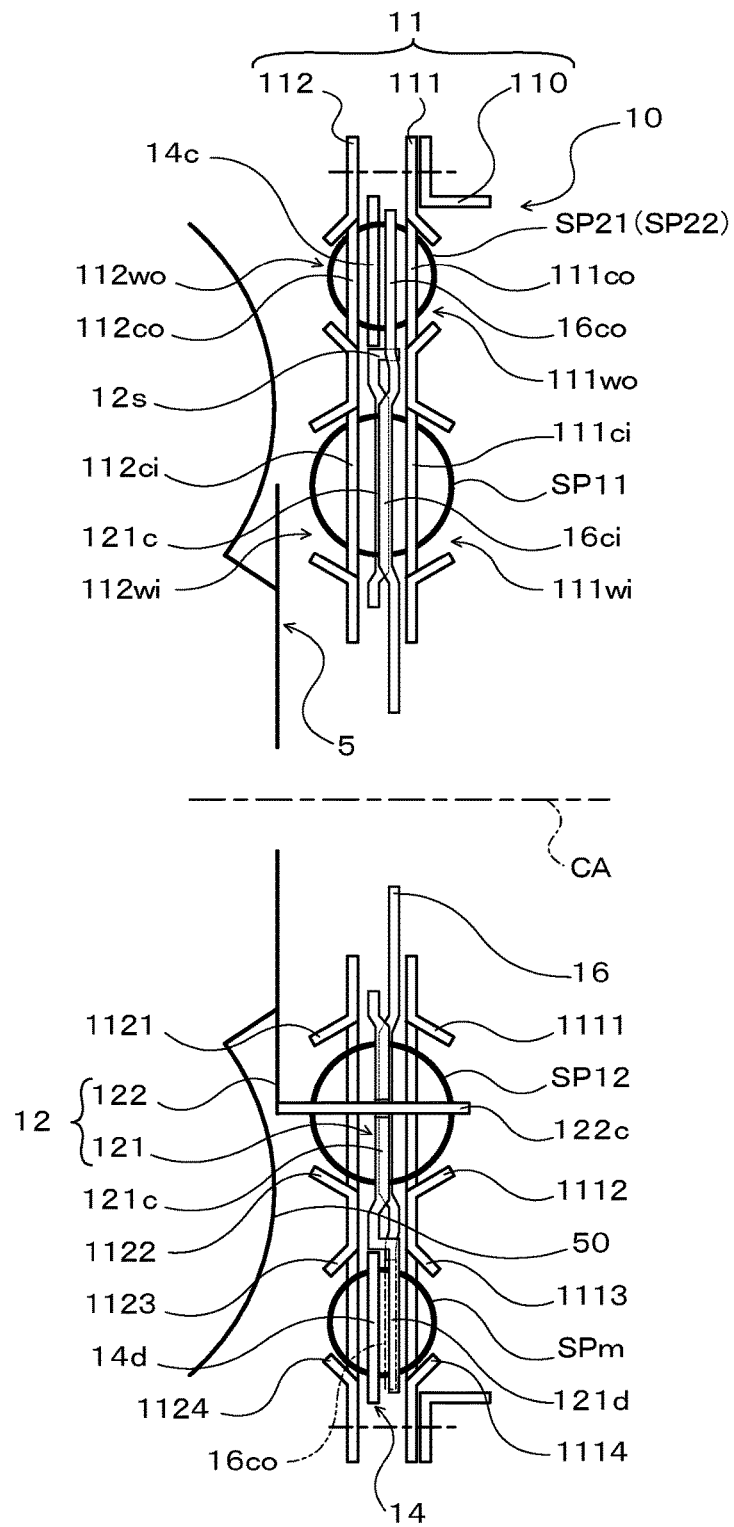
FIG. 2 is a sectional view illustrating the damper device according to the present disclosure.

FIG. 1 is a schematic diagram illustrating a starting device 1 that includes a damper device 10 according to the present disclosure. FIG. 2 is a sectional view illustrating the damper device 10. The starting device 1 illustrated in FIG. 1 is mounted on a vehicle that includes an engine (in the present embodiment, an internal combustion engine) EG that serves as a motor. In addition to the damper device 10, the starting device 1 includes: a front cover 3 coupled to a crankshaft of the engine EG; a pump impeller (input-side fluid transmission element) 4 fixed to the front cover 3; a turbine runner (output-side fluid transmission element) 5 that is coaxially rotatable with the pump impeller 4; a damper hub 7 that serves as a power output member coupled to the damper device 10 and fixed to an input shaft IS of a transmission (power transfer device) TM that is an automatic transmission (AT), a continuously variable transmission (CVT), a dual clutch transmission (DCT), a hybrid transmission, or a speed reducer; a lock-up clutch 8; and so forth.

In the following description, unless specifically stated, the term "axial direction" basically indicates the direction of extension of a center axis CA (axis; see FIG. 2) of the starting device 1 and the damper device 10. In addition, unless specifically stated, the term "radial direction" basically indicates the radial direction of a rotary element such as the starting device 1 or the damper device 10, that is, the direction of extension of a line that extends in directions (radial directions) that are orthogonal to the center axis CA from the center axis CA of the starting device 1 or the damper device 10. Furthermore, unless specifically stated, the term "circumferential direction" basically indicates the circumferential direction of a rotary element such as the starting device 1 or the damper device 10, that is, the direction along the rotational direction of such a rotary element.

The pump impeller 4 has a pump shell (not illustrated) tightly fixed to the front cover 3, and a plurality of pump blades (not illustrated) disposed on the inner surface of the pump shell. The turbine runner 5 has a turbine shell 50 (see FIG. 2), and a plurality of turbine blades (not illustrated) disposed on the inner surface of the turbine shell 50. The inner peripheral portion of the turbine shell 50 is fixed to a turbine hub (not illustrated) via a plurality of rivets. The turbine hub is rotatably supported by the damper hub 7.

The pump impeller 4 and the turbine runner 5 face each other. A stator 6 is disposed between and coaxially with the pump impeller 4 and the turbine runner 5. The stator 6 adjusts a flow of working oil (working fluid) from the turbine runner 5 to the pump impeller 4. The stator 6 has a plurality of stator blades (not illustrated). The rotational direction of the stator 6 is set to only one direction by a one-way clutch 61. The pump impeller 4, the turbine runner 5, and the stator 6 form a torus (annular flow passage) that allows circulation of working oil, and function as a torque converter (fluid transmission apparatus) with a torque amplification function. It should be noted, however, that the stator 6 and the one-way clutch 61 may be omitted from the starting device 1, and that the pump impeller 4 and the turbine runner 5 may function as a fluid coupling.

The lock-up clutch 8 can establish and release lock-up in which the front cover 3 and the damper hub 7 are coupled to each other via the damper device 10. In the present embodiment, the lock-up clutch 8 is constituted as a hydraulic single-plate clutch, and has a lock-up piston (power input member) 80 disposed inside the front cover 3 and in the vicinity of the inner wall surface of the front cover 3 on the engine EG side and fitted so as to be movable in the axial direction with respect to the damper hub 7. A friction material (not illustrated) is affixed to a surface of the lock-up piston 80 on the outer peripheral side and on the front cover 3 side. A lock-up chamber (not illustrated) is defined between the lock-up piston 80 and the front cover 3. The lock-up chamber is connected to a hydraulic control device (not illustrated) via a working oil supply passage and an oil passage formed in the input shaft IS.

Working oil from the hydraulic control device, which is supplied radially outward from the axis side of the pump impeller 4 and the turbine runner 5 (the vicinity of the one-way clutch 61) to the pump impeller 4 and the turbine runner 5 (torus) via the oil passage which is formed in the input shaft IS, can flow into the lock-up chamber of the lock-up clutch 8. Thus, if the pressure in a fluid transmission chamber 9 defined by the front cover 3 and the pump shell of the pump impeller 4 and the pressure in the lock-up chamber are kept equal to each other, the lock-up piston 80 is not moved toward the front cover 3, and the lock-up piston 80 is not frictionally engaged with the front cover 3. If the hydraulic pressure in the fluid transmission chamber 9 is made higher than the hydraulic pressure in a lock-up chamber 89 by the hydraulic control device (not illustrated), in contrast, the lock-up piston 80 is moved toward the front cover 3 by a pressure difference to be frictionally engaged with the front cover 3. Consequently, the front cover 3 (engine EG) is coupled to the damper hub 7 via the lock-up piston 80 and the damper device 10. A hydraulic multi-plate clutch that includes at least one friction engagement plate (a plurality of friction materials) may be adopted as the lock-up clutch 8. In this case, a clutch drum or a clutch hub of the hydraulic multi-plate clutch functions as the power input member.

The damper device 10 damps vibration between the engine EG and the transmission TM. As illustrated in FIG. 1, the damper device 10 includes, as rotary elements (rotary members, i.e. rotary mass bodies) that rotate coaxially relative to each other, a drive member (input element) 11, a first intermediate member (first intermediate element) 12, a second intermediate member (second intermediate element) 14, and a driven member (output element) 16. The damper device 10 further includes, as torque transfer elements (torque transfer elastic bodies): a plurality of (e.g. three in the present embodiment) first inner springs (first elastic bodies) SP11 disposed between the drive member 11 and the first intermediate member 12 to transfer rotational torque (torque in the rotational direction); a plurality of (e.g. three in the present embodiment) second inner springs (second elastic bodies) SP12 disposed between the first intermediate member 12 and the driven member 16 to transfer rotational torque (torque in the rotational direction); a plurality of (e.g. two in the present embodiment) first outer springs (third elastic bodies) SP21 disposed between the drive member 11 and the second intermediate member 14 to transfer rotational torque; a plurality of (e.g. two in the present embodiment) second outer springs (fourth elastic bodies) SP22 disposed between the second intermediate member 14 and the driven member 16 to transfer rotational torque; and a plurality of (e.g. two in the present embodiment) intermediate springs (fifth elastic bodies) SPm disposed between the first intermediate member 12 and the second intermediate member 14 to transfer rotational torque.

In the present embodiment, linear coil springs made of a metal material spirally wound so as to have an axis that extends straight when no load is applied are adopted as the first and second inner springs SP11 and SP12, the first and second outer springs SP21 and SP22, and the intermediate springs SPm. Consequently, a hysteresis due to a friction force generated between the springs which transfer torque and the rotary elements, that is, the difference between torque output when torque input to the drive member 11 is increasing and torque output when torque input to the drive member 11 is decreasing, can be reduced by expanding and contracting the springs SP11 to SPm along the axes more appropriately than the case where arc coil springs are used. The hysteresis may be quantified by the difference between torque output from the driven member 16 when the torsional angle of the damper device 10 is brought to a predetermined angle with torque input to the drive member 11 increasing and torque output from the driven member 16 when the torsional angle of the damper device 10 is brought to the predetermined angle described above with torque input to the drive member 11 decreasing. At least one of the springs SP11 to SPm may be an arc coil spring. The term "axis of a spring" means the center of winding of a metal material wound spirally in a linear coil spring or an arc coil spring.

In the present embodiment, in addition, the first outer springs SP21, the second outer springs SP22, and the intermediate springs SPm are arranged side by side in the order of SP21, SP22, SPm, SP21, SP22, and SPm, for example, along the circumferential direction of the damper device 10 (second intermediate member 14), and disposed in the outer peripheral region in the fluid transmission chamber 9 in proximity to the outer periphery of the starting device 1. In this way, by disposing the intermediate springs SPm side by side with the first and second outer springs SP21 and SP22 on the outer peripheral side along the circumferential direction, it is possible to secure the torsional angle (stroke) between the first and second outer springs SP21 and SP22 and the intermediate springs SPm well. In contrast, the first and second inner springs SP11 and SP22 are disposed on the radially inner side of the first and second outer springs SP21 and SP22 and the intermediate springs SPm such that one first inner spring SP11 and one second inner spring SP22 are paired (act in series with each other), and such that the first and second inner springs SP11 and SP22 are arranged alternately along the circumferential direction of the damper device 10 (first intermediate member 12), and surrounded by the springs SP21, SP22, and SPm.

Figure 3:
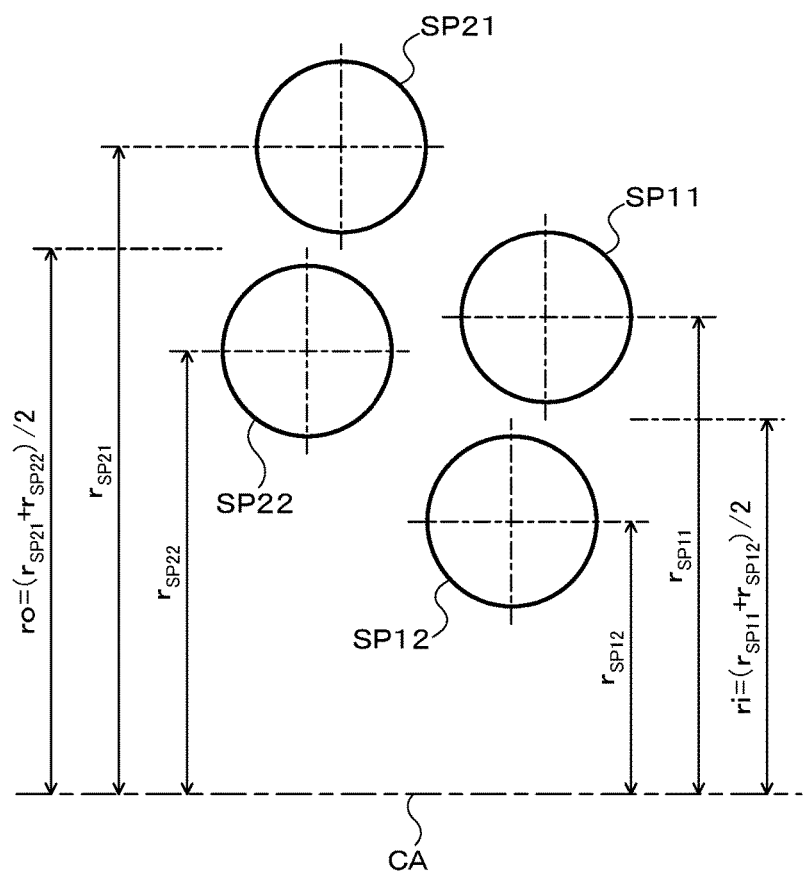
FIG. 3 is a diagram illustrating the average attachment radii of first to fourth elastic bodies in the damper device according to the present disclosure.

Consequently, in the damper device 10, an average attachment radius ro of the first and second outer springs SP21 and SP22 is larger than an average attachment radius ri of the first and second inner springs SP11 and SP12. As illustrated in FIG. 3, the average attachment radius ro of the first and second outer springs SP21 and SP22 is the average value ($=(r_{SP21}+r_{SP22})/2$) of an attachment radius $r_{SP21}$ of the first outer springs SP21, which is the distance from the center axis CA of the damper device 10 to the axis of the first outer springs (third elastic bodies) SP21, and an attachment radius $r_{SP22}$ of the second outer springs SP22, which is the distance from the center axis CA to the axis of the second outer springs (fourth elastic bodies) SP22. As illustrated in FIG. 3, the average attachment radius ri of the first and second inner springs SP11 and SP12 is the average value ($=(r_{SP11}+r_{SP12})/2$) of an attachment radius $r_{SP11}$ of the first inner springs SP11, which is the distance from the center axis CA to the axis of the first inner springs (first elastic bodies) SP11, and an attachment radius $r_{SP12}$ of the second inner springs SP12, which is the distance from the center axis CA to the axis of the second inner springs (second elastic bodies) SP12. The attachment radius $r_{SP11}$, $r_{SP12}$, $r_{SP21}$, or $r_{SP22}$ may be the distance between the center axis CA and a point (e.g. the center or an end portion in the axial direction) determined in advance on the axis of the springs SP11, SP12, SP21, or SP22.

In the present embodiment, in addition, the first and second outer springs SP21 and SP22 (and the intermediate springs SPm) are arranged on the same circumference so that the attachment radius $r_{SP21}$ and the attachment radius $r_{SP22}$ are equal to each other, and the axis of the first outer springs SP21 and the axis of the second outer springs SP22 are included in one plane that is orthogonal to the center axis CA. In the present embodiment, further, the first and second inner springs SP11 and SP12 are arranged on the same circumference so that the attachment radius $r_{SP11}$ and the attachment radius $r_{SP12}$ are equal to each other, and the axis of the first inner springs SP11 and the axis of the second inner springs SP12 are included in one plane that is orthogonal to the center axis CA. In the damper device 10, additionally, the first and second inner springs SP11 and SP12 are disposed on the radially inner side of the first and second outer springs SP21 and SP22 so as to overlap the first and second outer springs SP21 and SP22 in the axial direction as seen in the radial direction. Consequently, it is possible to make the damper device 10 compact in the radial direction, and to shorten the axial length of the damper device 10.

It should be noted, however, that as illustrated in FIG. 3, the attachment radius $r_{SP21}$ from the center axis CA to the axis of the first outer springs SP21 and the attachment radius $r_{SP22}$ from the center axis CA to the axis of the second outer springs SP22 may be different from each other. In addition, the attachment radius $r_{SP11}$ from the center axis CA to the axis of the first inner springs SP11 and the attachment radius $r_{SP12}$ from the center axis CA to the axis of the second inner springs SP12 may be different from each other. That is, the attachment radius $r_{SP21}$, $r_{SP22}$ of at least one of the first and second outer springs SP21 and SP22 may be larger than the attachment radius $r_{SP11}$, $r_{SP12}$ of at least one of the first and second inner springs SP11 and SP12. Furthermore, the axis of the first outer springs SP21 and the axis of the second outer springs SP22 may not be included in one plane that is orthogonal to the center axis CA. In addition, the axis of the first inner springs SP11 and the axis of the second inner springs SP12 may not be included in one plane that is orthogonal to the center axis CA. In addition, the axes of the springs SP11, SP12, SP21, and SP22 may be included in one plane that is orthogonal to the center axis CA, and at least one of the axes of the springs SP11, SP12, SP21, and SP22 may not be included in the one plane.

In the present embodiment, the rigidity, that is, the spring constant, of the first inner springs SP11 is defined as "$k_{11}$", the rigidity, that is, the spring constant, of the second inner springs SP12 is defined as "$k_{12}$", the rigidity, that is, the spring constant, of the first outer springs SP21 is defined as "$k_{21}$", and the rigidity, that is, the spring constant, of the second outer springs SP22 is defined as "$k_{22}$". The spring constants $k_{11}$, $k_{12}$, $k_{21}$, and $k_{22}$ are selected such that the relations $k_{11} \neq k_{21}$ and $k_{11}/k_{21} \neq k_{12}/k_{22}$ are met. More particularly, the spring constants $k_{11}$, $k_{12}$, $k_{21}$, and $k_{22}$ meet the relations $k_{11}/k_{21} < k_{12}/k_{22}$ and $k_{11} < k_{12} < k_{22} < k_{21}$. That is, the smaller one ($k_{11}$) of the spring constants $k_{11}$ and $k_{12}$ of the first and second inner springs SP11 and SP12 is smaller than the smaller one ($k_{22}$) of the spring constants $k_{21}$ and $k_{22}$ of the first and second outer springs SP21 and SP22. When the rigidity, that is, the spring constant, of the intermediate springs SPm is defined as "$k_m$", further, the spring constants $k_{11}$, $k_{12}$, $k_{21}$, $k_{22}$, and $k_m$ meet the relation $k_{11} < k_m < k_{12} < k_{22} < k_{21}$.

As illustrated in FIG. 2, the drive member 11 of the damper device 10 includes: an annular coupling member 110 fixed to the lock-up piston 80 of the lock-up clutch 8; an annular first plate member (first input member) 111 rotatably supported (aligned) by the damper hub 7, for example, and coupled so as to rotate together with the coupling member 110; and an annular second plate member (second input member) 112 disposed in more proximity to the turbine runner 5 than the first plate member 111 and coupled (fixed) to the first plate member 111 via a plurality of rivets (couplers). Consequently, the drive member 11, that is, the first and second plate members 111 and 112, rotates together with the lock-up piston 80, and the front cover 3 (engine EG) and the drive member 11 of the damper device 10 are coupled to each other through engagement of the lock-up clutch 8. In the case where the lock-up clutch 8 is a hydraulic multi-plate clutch, the coupling member 110 may be constituted as a clutch drum of the lock-up clutch 8.

The first plate member 111 is constituted as an annular plate-like member, and disposed in more proximity to the lock-up piston 80 than the second plate member 112. The first plate member 111 has a plurality of (e.g. three in the present embodiment) inner spring housing windows 111wi, a plurality of (e.g. four in the present embodiment) outer spring housing windows 111wo, a plurality of (e.g. three in the present embodiment) spring support portions 1111, a plurality of (e.g. three in the present embodiment) spring support portions 1112, a plurality of (e.g. four in the present embodiment) spring support portions 1113, a plurality of (e.g. four in the present embodiment) spring support portions 1114, a plurality of (e.g. three in the present embodiment) inner spring abutment portions 111ci, and a plurality of (e.g. four in the present embodiment) outer spring abutment portions 111co.

The plurality of inner spring housing windows 111wi extend arcuately, and are disposed at intervals (equal intervals) in the circumferential direction in the inner peripheral portion of the first plate member 111. The plurality of spring support portions 1111 extend along the inner peripheral edges of the respective inner spring housing windows 111wi, and are arranged at intervals (equal intervals) in the circumferential direction. The plurality of spring support portions 1112 extend along the outer peripheral edges of the respective inner spring housing windows 111wi, and are arranged at intervals (equal intervals) in the circumferential direction to face the respective spring support portions 1111 in the radial direction of the first plate member 111. In addition, the inner spring abutment portions 111ci are provided such that each inner spring abutment portion 111ci is interposed between the inner spring housing windows 111wi (spring support portions 1111 and 1112) which are adjacent to each other along the circumferential direction.

The plurality of outer spring housing windows 111wo extend arcuately, and are disposed at intervals in the circumferential direction in the outer peripheral portion of the first plate member 111 so as to be positioned on the radially outer side with respect to the inner spring housing windows 111wi. The plurality of spring support portions 1113 extend along the inner peripheral edges of the respective outer spring housing windows 111wo, and are arranged at intervals (equal intervals) in the circumferential direction. The plurality of spring support portions 1114 extend along the outer peripheral edges of the respective outer spring housing windows 111wo, and are arranged at intervals (equal intervals) in the circumferential direction to face the respective spring support portions 1113 in the radial direction of the first plate member 111. In addition, the outer spring abutment portions 111co are provided such that each outer spring abutment portion 111co is interposed between the outer spring housing windows 111wo (spring support portions 1113 and 1114) which are adjacent to each other along the circumferential direction.

The second plate member 112 is constituted as an annular plate-like member, and disposed in more proximity to the turbine runner 5 than the first plate member 111. The second plate member 112 has a plurality of (e.g. three in the present embodiment) inner spring housing windows 112wi, a plurality of (e.g. four in the present embodiment) outer spring housing windows 112wo, a plurality of (e.g. three in the present embodiment) spring support portions 1121, a plurality of (e.g. three in the present embodiment) spring support portions 1122, a plurality of (e.g. four in the present embodiment) spring support portions 1123, a plurality of (e.g. four in the present embodiment) spring support portions 1124, a plurality of (e.g. three in the present embodiment) inner spring abutment portions 112ci, and a plurality of (e.g. four in the present embodiment) outer spring abutment portions 112co.

The plurality of inner spring housing windows 112wi extend arcuately, and are disposed at intervals (equal intervals) in the circumferential direction in the inner peripheral portion of the second plate member 112. The plurality of spring support portions 1121 extend along the inner peripheral edges of the respective inner spring housing windows 112wi, and are arranged at intervals (equal intervals) in the circumferential direction. The plurality of spring support portions 1122 extend along the outer peripheral edges of the respective inner spring housing windows 112wi, and are arranged at intervals (equal intervals) in the circumferential direction to face the respective spring support portions 1121 in the radial direction of the second plate member 112. In addition, the inner spring abutment portions 112ci are provided such that each inner spring abutment portion 112ci is interposed between the inner spring housing windows 112wi (spring support portions 1121 and 1122) which are adjacent to each other along the circumferential direction.

The plurality of outer spring housing windows 112wo extend arcuately, and are disposed at intervals in the circumferential direction in the outer peripheral portion of the second plate member 112 so as to be positioned on the radially outer side with respect to the inner spring housing windows 112wi. The plurality of spring support portions 1123 extend along the inner peripheral edges of the respective outer spring housing windows 112wo, and are arranged at intervals (equal intervals) in the circumferential direction. The plurality of spring support portions 1124 extend along the outer peripheral edges of the respective outer spring housing windows 112wo, and are arranged at intervals (equal intervals) in the circumferential direction to face the respective spring support portions 1123 in the radial direction of the second plate member 112. In addition, the outer spring abutment portions 112co are provided such that each outer spring abutment portion 112co is interposed between the outer spring housing windows 112wo (spring support portions 1123 and 1124) which are adjacent to each other along the circumferential direction.

As illustrated in FIG. 2, the first intermediate member 12 includes: a plate-like annular member 121 disposed between the first and second plate members 111 and 112 of the drive member 11 in the axial direction and rotatably supported (aligned) by the damper hub 7, for example; and a coupling member 122 fixed to the turbine runner 5. The annular member 121 which constitutes the first intermediate member 12 has: a plurality of (e.g. three in the present embodiment) spring housing windows; a plurality of (e.g. three in the present embodiment) spring abutment portions 121c disposed at intervals in the circumferential direction; a support portion 12s in a short tube shape that extends in the axial direction on the radially outer side with respect to the spring abutment portions 121c; and a plurality of (e.g. four in the present embodiment) second spring abutment portions 121d that extend radially outward from the distal end of the support portion 12s away from the spring abutment portions 121c in the axial direction. The plurality of spring abutment portions 121c are provided such that each spring abutment portion 121c is interposed between the spring housing windows which are adjacent to each other along the circumferential direction. The second spring abutment portions 121d are formed symmetrically with respect to the axis of the annular member 121 such that two (a pair of) second spring abutment portions 121d are proximate to each other. The two second spring abutment portions 121d which are paired with each other are arranged in the circumferential direction at an interval that matches the natural length of the intermediate spring SPm, for example.

The coupling member 122 which constitutes the first intermediate member 12 has: an annular fixed portion (annular portion) fixed by welding, for example, to the turbine shell 50 of the turbine runner 5; and a plurality of (e.g. three at intervals of 120° in the present embodiment) spring abutment portions 122c that extend in the axial direction from the outer peripheral portion of the fixed portion at intervals in the circumferential direction. As illustrated in FIG. 2, the spring abutment portions 122c of the coupling member 122 are inserted into the respective inner spring housing windows 112wi of the second plate member 112 from the turbine runner 5 side, and fitted with associated recessed portions formed in end surfaces (surfaces for abutment with springs) of the spring abutment portions 121c of the annular member 121. Consequently, the annular member 121 and the coupling member 122 which is fixed to the turbine runner 5 are coupled so as to rotate together with each other.

The second intermediate member 14 is an annular plate-like member, and has a moment of inertia that is smaller than that of the annular member 121 of the first intermediate member 12. As illustrated in FIG. 2, the second intermediate member 14 has: a plurality of (e.g. two at intervals of 180° in the present embodiment) spring abutment portions 14c that extend radially inward from an annular outer peripheral portion at intervals in the circumferential direction; and a plurality of (e.g. four in the present embodiment) second spring abutment portions 14d that extend radially inward from portions of the annular outer peripheral portion located between the spring abutment portions 14c which are adjacent to each other in the circumferential direction. The plurality of second spring abutment portions 14d are formed symmetrically with respect to the axis of the second intermediate member 14 such that two (a pair of) second spring abutment portions 14d are proximate to each other. The two second spring abutment portions 14d which are paired with each other are arranged in the circumferential direction at an interval that matches the natural length of the intermediate spring SPm, for example. The second intermediate member 14 is disposed between the first and second plate members 111 and 112 of the drive member 11 in the axial direction. The inner peripheral surfaces of the spring abutment portions 14c and the second spring abutment portions 14d are rotatably supported (aligned) by the outer peripheral surface of the support portion 12s of the annular member 121 (first intermediate member 12) described above.

The driven member 16 is constituted as an annular plate-like member. As illustrated in FIG. 2, the driven member 16 is disposed between the first plate member 111 and the second plate member 112 of the drive member 11 in the axial direction, and fixed to the damper hub 7 via a plurality of rivets. Consequently, the driven member 16 is rotated together with the damper hub 7. The driven member 16 has: a plurality of (e.g. three in the present embodiment) spring housing windows that extend arcuately along the inner peripheral edge of the driven member 16 and that are disposed at intervals (equal intervals) in the circumferential direction; a plurality of (e.g. three in the present embodiment) inner spring abutment portions (inner abutment portions) 16ci disposed at intervals (equal intervals) in the circumferential direction; and a plurality of (e.g. four in the present embodiment) outer spring abutment portions (outer abutment portions) 16co. The plurality of inner spring abutment portions 16ci are provided such that each inner spring abutment portion 16ci is interposed between the spring housing windows which are adjacent to each other along the circumferential direction. The plurality of outer spring abutment portions 16co are arranged at intervals in the circumferential direction on the radially outer side with respect to the plurality of inner spring abutment portions 16ci, and extend in the radial direction.

The first and second inner springs SP11 and SP12 are supported by the associated spring support portions 1111, 1112, 1121, and 1122 of the drive member 11, that is, the first and second plate members 111 and 112, such that one first inner spring SP11 and one second inner spring SP12 are paired (act in series with each other) and such that the first and second inner springs SP11 and SP12 are arranged alternately in the circumferential direction (circumferential direction of the annular member 121). That is, as illustrated in FIG. 2, the plurality of spring support portions 1111 of the first plate member 111 support (guide) the side portions of the associated first and second inner springs SP11 and SP12 (one each) on the lock-up piston 80 side from the inner peripheral side. In addition, the plurality of spring support portions 1112 support (guide) the side portions of the associated first and second inner springs SP11 and SP12 on the lock-up piston 80 side from the outer peripheral side. Furthermore, as illustrated in FIG. 2, the plurality of spring support portions 1121 of the second plate member 112 support (guide) the side portions of the associated first and second inner springs SP11 and SP12 (one each) on the turbine runner 5 side from the inner peripheral side. In addition, the plurality of spring support portions 1122 support (guide) the side portions of the associated first and second inner springs SP11 and SP12 on the turbine runner 5 side from the outer peripheral side.

Furthermore, with the damper device 10 in the attached state, the inner spring abutment portions 111$ci$ of the first plate member 111 are each provided between the first and second inner springs SP11 and SP12, which are disposed in the inner spring housing windows 111$wi$ which are different from each other and which are not paired (do not act in series with each other), to abut against the end portions (end portions in the deflection direction; the same applies hereinafter) of such first and second inner springs SP11 and SP12 in the circumferential direction. Similarly, with the damper device 10 in the attached state, the inner spring abutment portions 112$ci$ of the second plate member 112 are each also provided between the first and second inner springs SP11 and SP12, which are disposed in the inner spring housing windows 112$wi$ which are different from each other (not paired), to abut against the end portions of such first and second inner springs SP11 and SP12 in the circumferential direction. In addition, the spring abutment portions 121$c$ of the annular member 121 which constitutes the first intermediate member 12 and the spring abutment portions 122$c$ of the coupling member 122 are each provided between the first and second inner springs SP11 and SP12, which are paired with each other (act in series with each other), to abut against the end portions of such first and second inner springs SP11 and SP12 in the circumferential direction.

That is, with the damper device 10 in the attached state, the first end portion of each first inner spring SP11 abuts against the associated inner spring abutment portions 111$ci$ and 112$ci$ of the drive member 11, and the second end portion of each first inner spring SP11 abuts against the associated spring abutment portions 121$c$ and 122$c$ of the first intermediate member 12. Furthermore, with the damper device 10 in the attached state, the first end portion of each second inner spring SP12 abuts against the associated spring abutment portions 121$c$ and 122$c$ of the first intermediate member 12, and the second end portion of each second inner spring SP12 abuts against the associated inner spring abutment portions 111$ci$ and 112$ci$ of the drive member 11.

Meanwhile, the first and second outer springs SP21 and SP22 are supported by the associated spring support portions 1113, 1114, 1123, and 1124 of the drive member 11, that is, the first and second plate members 111 and 112, such that one first outer spring SP21 and one second outer spring SP22 are paired (act in series with each other) and such that the first and second outer springs SP21 and SP22 are arranged alternately in the circumferential direction (circumferential direction of the second intermediate member 14). That is, as illustrated in FIG. 2, the plurality of spring support portions 1113 of the first plate member 111 support (guide) the side portions of the associated first and second outer springs SP21 and SP22 (one each) on the lock-up piston 80 side from the inner peripheral side. In addition, the plurality of spring support portions 1114 support (guide) the side portions of the associated first and second outer springs SP21 and SP22 on the lock-up piston 80 side from the outer peripheral side. Furthermore, as illustrated in FIG. 2, the plurality of spring support portions 1123 of the second plate member 112 support (guide) the side portions of the associated first and second outer springs SP21 and SP22 (one each) on the turbine runner 5 side from the inner peripheral side. In addition, the plurality of spring support portions 1124 support (guide) the side portions of the associated first and second outer springs SP21 and SP22 on the turbine runner 5 side from the outer peripheral side.

Furthermore, with the damper device 10 in the attached state, the outer spring abutment portions 111$co$ of the first plate member 111 are each provided between the first and second outer springs SP21 and SP22, which are disposed in the inner spring housing windows 111$wi$ which are different from each other and which are not paired (do not act in series with each other), to abut against the end portions of such first and second outer springs SP21 and SP22 in the circumferential direction. Similarly, with the damper device 10 in the attached state, the outer spring abutment portions 112$co$ of the second plate member 112 are also provided between the first and second outer springs SP21 and SP22, which are disposed in the inner spring housing windows 112$wi$ which are different from each other (not paired), to abut against the end portions of such first and second outer springs SP21 and SP22 in the circumferential direction. In addition, the spring abutment portions 14$c$ of the second intermediate member 14 are each provided between the first and second outer springs SP21 and SP22, which are paired with each other (act in series with each other), to abut against the end portions of such first and second outer springs SP21 and SP22 in the circumferential direction.

That is, with the damper device 10 in the attached state, the first end portion of each first outer spring SP21 abuts against the associated outer spring abutment portions 111$co$ and 112$co$ of the drive member 11, and the second end portion of each first outer spring SP21 abuts against the associated spring abutment portion 14$c$ of the second intermediate member 14. Furthermore, with the damper device 10 in the attached state, the first end portion of each second outer spring SP22 abuts against the associated spring abutment portion 14$c$ of the second intermediate member 14, and the second end portion of each second outer spring SP22 abuts against the associated outer spring abutment portions 111$co$ and 112$co$ of the drive member 11.

In addition, with the damper device 10 in the attached state, as with the inner spring abutment portions 111$ci$ and 112$ci$ of the drive member 11, the inner spring abutment portions 16$ci$ of the driven member 16 are each provided between the first and second inner springs SP11 and SP12, which are not paired (do not act in series with each other), to abut against the end portions of such first and second inner springs SP11 and SP12 in the circumferential direction. Furthermore, as with the outer spring abutment portions 111co and 112co of the drive member 11, the outer spring abutment portions 16co of the driven member 16 are each provided between the first and second outer springs SP21 and SP22, which are not paired (do not act in series with each other), to abut against the end portions of such first and second outer springs SP21 and SP22 in the circumferential direction.

That is, with the damper device 10 in the attached state, the first end portion of the first inner spring SP11 and the second end portion of the second inner spring SP12 which is paired with the first inner spring SP11 abut against the associated inner spring abutment portions 16ci of the driven member 16, and the first end portion of the first outer spring SP21 and the second end portion of the second outer spring SP22 which is paired with the first outer spring SP21 abut against the associated outer spring abutment portions 16co of the driven member 16. As a result, with the damper device 10 in the attached state, the driven member 16 is coupled to the drive member 11 via the plurality of first inner springs SP11, the first intermediate member 12 (the annular member 121 and the coupling member 122), and the plurality of second inner springs SP12, and coupled to the drive member 11 via the plurality of first outer springs SP21, the second intermediate member 14, and the plurality of second outer springs SP22.

The intermediate springs SPm are supported by the associated spring support portions 1113, 1114, 1123, 1124 of the drive member 11, that is, the first and second plate members 111 and 112, such that the intermediate springs SPm are arranged side by side with the first outer springs SP21 and the second outer springs SP22 along the circumferential direction. With the damper device 10 in the attached state, each intermediate spring SPm is supported from both sides in the circumferential direction by the pair of second spring abutment portions 121d of the first intermediate member 12 (annular member 121), and supported from both sides in the circumferential direction by the pair of second spring abutment portions 14d of the second intermediate member 14. Consequently, the first intermediate member 12 and the second intermediate member 14 are coupled to each other via the plurality of intermediate springs SPm. As illustrated in FIG. 1, spring seats Ss may be disposed between the end portions of the intermediate springs SPm and the second spring abutment portions 121d and 14d.

Further, as illustrated in FIG. 1, the damper device 10 includes: a first stopper 21 that restricts relative rotation between the first intermediate member 12 and the driven member 16 and deflection of the second inner springs SP12; a second stopper 22 that restricts relative rotation between the second intermediate member 14 and the driven member 16 and deflection of the second outer springs SP22; and a third stopper 23 that restricts relative rotation between the drive member 11 and the driven member 16. The first and second stoppers 21 and 22 are configured to restrict relative rotation between the associated rotary elements and deflection of the springs generally at the same time as input torque transferred from the engine EG to the drive member 11 has reached torque (a first threshold) T1 that is determined in advance and that is less than torque T2 (a second threshold) corresponding to a maximum torsional angle θmax of the damper device 10. In addition, the third stopper 23 is configured to restrict relative rotation between the drive member 11 and the driven member 16 when torque input to the drive member 11 has reached the torque T2 corresponding to the maximum torsional angle θmax. Consequently, the damper device 10 has damping characteristics in two stages.

In the damper device 10, as discussed above, the average attachment radius ro of the first and second outer springs SP21 and SP22, the rigidity of which is higher (the spring constant of which is larger) than that of the first and second inner springs SP11 and SP12, is determined to be larger than the average attachment radius ri of the first and second inner springs SP11 and SP12. That is, the axis of the first and second outer springs SP11 and SP12 which have a spring constant (rigidity) that is larger than that of the first and second inner springs SP21 and SP22 is positioned on the outer side, in the radial direction of the damper device 10, with respect to the axis of the first and second inner springs SP21 and SP22. In the damper device 10, further, the first and second outer springs SP11 and SP12 are disposed such that the entire first and second outer springs SP11 and SP12 are positioned on the radially outer side with respect to the first and second inner springs SP21 and SP22. Consequently, it is possible to increase the torsional angle (stroke) of the first and second outer springs SP21 and SP22, and thus it is possible to lower the rigidity of the first and second outer springs SP21 and SP22 while allowing transfer of large torque to the drive member 11.

In the damper device 10, in addition, the annular member 121 of the first intermediate member 12, the second intermediate member 14, and the driven member 16 are disposed between the first and second plate members 111 and 112 of the drive member 11 in the axial direction. With the damper device 10 which has such a configuration, a friction force generated between the first and second plate members 111 and 112 and the springs SP11, SP12, SP21, and SP22 because of a centrifugal force, in particular, can be reduced by elaborating on the shape of the spring abutment portions 121c and 14c of the first and second intermediate members 12 and 14 and the inner and outer spring abutment portions 16ci and 16co of the driven member 16. As a result, it is possible to lower the hysteresis of the entire damper device 10 well.

Furthermore, in the damper device 10, as illustrated in FIG. 2, the inner and outer spring abutment portions 111ci, 112ci, 111co, and 112co of the drive member 11, the spring abutment portions 121c and 14c of the first and second intermediate members 12 and 14, and the inner and outer spring abutment portions 16ci and 16co of the driven member 16 extend in the radial direction of the damper device 10. Thus, the spring abutment portions 111ci, 112ci, 111co, 112co, 121c, 14c, 16ci, and 16co can press the associated springs SP11, SP12, SP21, and SP22 so as to be expanded and contracted appropriately along the axes. In the damper device 10, additionally, the second spring abutment portions 121d and 14d of the first and second intermediate members 12 and 14 also extend in the radial direction of the damper device 10. Thus, it is possible for the second spring abutment portions 121d and 14d to press the intermediate springs SPm so as to be expanded and contracted appropriately along the axis. As a result, the vibration damping performance of the damper device 10 can be improved.

In addition, in the damper device 10, as illustrated in FIG. 2, the spring abutment portions 121c of the first intermediate member 12 (annular member 121) and the inner spring abutment portions 16ci of the driven member 16 overlap each other in the axial direction as seen in the radial direction, and the second spring abutment portions 121d of the first intermediate member 12 (annular member 121) and the outer spring abutment portions 16co of the driven member 16 overlap each other in the axial direction as seen in the radial direction. Additionally, the second intermediate member 14 is disposed side by side in the axial direction with the second spring abutment portions 121d of the first intermediate member 12 and the outer spring abutment portions 16co of the driven member 16. Consequently, it is possible to shorten the axial length of the damper device 10.

The damper device 10 further includes the coupling member 122 which has the spring abutment portions 122c which are fixed to the turbine runner 5 and which are each provided between the first and second inner springs SP11 and SP12, which are adjacent to each other, to abut against the end portions of such first and second inner springs SP11 and SP12 in the circumferential direction. Consequently, it is possible to couple the first intermediate member 12 to both the first and second inner springs SP11 and SP12, which are disposed on the radially inner side, and to couple the first intermediate member 12 to the turbine runner 5 while suppressing an increase in the axial length of the damper device 10. By coupling the turbine runner 5 (and the turbine hub) to the first intermediate member 12, the substantial moment of inertia of the first intermediate member 12 (the total of the moments of inertia of the annular member 121, the coupling member 122, the turbine runner 5, and so forth) can be further increased. In addition, by causing both the spring abutment portions 121c of the annular member 121 and the spring abutment portions 122c of the coupling member 122 to abut against the end portions of the first and second outer springs SP21 and SP22, it is possible to smoothly expand and contract the first and second outer springs SP21 and SP22.

Next, operation of the damper device 10 will be described. In the starting device 1, when lock-up by the lock-up clutch 8 is released, for example, rotational torque (power) transferred from the engine EG to the front cover 3 is transferred to the input shaft IS of the transmission TM via a path that includes the pump impeller 4, the turbine runner 5, the first intermediate member 12, the second inner springs SP12, the driven member 16, and the damper hub 7 and a path that includes the pump impeller 4, the turbine runner 5, the first intermediate member 12, the intermediate springs SPm, the second intermediate member 14, the second outer springs SP22, the driven member 16, and the damper hub 7. When lock-up is established by the lock-up clutch 8 of the starting device 1, in contrast, rotational torque (input torque) transferred from the engine EG to the drive member 11 via the front cover 3 and the lock-up clutch 8 (lock-up piston 80) is transferred to the driven member 16 and the damper hub 7 via all the springs SP11 to SPm until torque input to the drive member 11 reaches the torque T1 described above, that is, while deflection of all of the first and second inner springs SP11 and SP12, the first and second outer springs SP21 and SP22, and the intermediate springs SPm is allowed.

Figure 4:
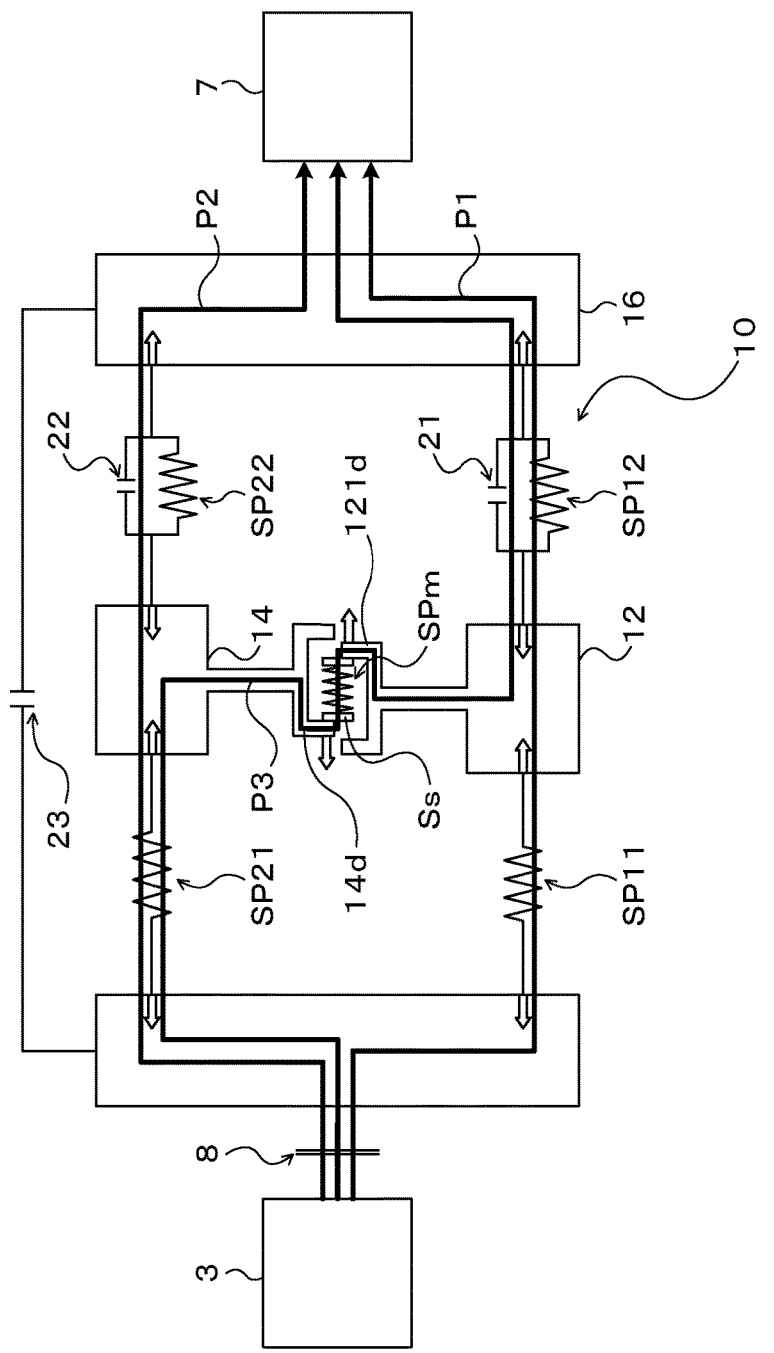
FIG. 4 is a diagram illustrating torque transfer paths in the damper device according to the present disclosure.

That is, during a period before input torque reaches the torque T1 during establishment of lock-up, the first inner springs (first elastic bodies) SP11 transfer rotational torque from the drive member 11 to the first intermediate member 12, and the second inner springs (second elastic bodies) SP12 transfer rotational torque from the first intermediate member 12 to the driven member 16. In addition, the first outer springs (third elastic bodies) SP21 transfer rotational torque from the drive member 11 to the second intermediate member 14, and the second outer springs (fourth elastic bodies) SP22 transfer rotational torque from the second intermediate member 14 to the driven member 16. Thus, as illustrated in FIG. 4, the damper device 10 has, as torque transfer paths between the drive member 11 and the driven member 16, a first torque transfer path P1 that includes the first inner springs SP11, the first intermediate member 12, and the second inner springs SP12 and a second torque transfer path P2 that includes the first outer springs SP21, the second intermediate member 14, and the second outer springs SP22.

In the damper device 10, in addition, as discussed above, the spring constants $k_{11}$, $k_{12}$, $k_{21}$, and $k_{22}$ of the first and second inner springs SP11 and SP12 and the first and second outer springs SP21 and SP22 meet the relation $k_{11} < k_{12} < k_{22} < k_{21}$. Therefore, when torque is transferred to the drive member 11 during a period before input torque reaches the torque T1 during establishment of lock-up, as illustrated in FIG. 4, the second intermediate member 14 is (slightly) twisted with respect to the first intermediate member 12 toward the advancing direction side (toward the downstream side) in the rotational direction (the rotational direction at the time when the vehicle travels forward). Consequently, the intermediate springs SPm are each pressed by one of the pair of second spring abutment portions 14d of the second intermediate member 14 on the side opposite to the advancing direction side in the rotational direction described above, toward one of the pair of second spring abutment portions 121d of the first intermediate member 12 on the advancing direction side in the rotational direction. That is, before input torque reaches the torque T1 during execution of lock-up, the intermediate springs SPm transfer a part of torque (a part of average torque) transferred from the drive member 11 to the second intermediate member 14 via the first outer springs SP21, to the first intermediate member 12. Thus, the damper device 10 has a third torque transfer path P3 that includes the first outer springs SP21, the second intermediate member 14, the intermediate springs SPm, the first intermediate member 12, and the second inner springs SP12.

As a result, during a period before torque input to the drive member 11 reaches the torque T1 described above during establishment of lock-up, torque is transferred from the drive member 11 to the driven member 16 via the first, second, and third torque transfer paths P1, P2, and P3. More particularly, while deflection of all of the springs SP11 to SPm is allowed, rotational torque from the first inner springs SP11 and rotational torque from the first outer springs SP21, the second intermediate member 14, and the intermediate springs SPm are transferred to the second inner springs SP12. In addition, rotational torque from the first outer springs SP21 is transferred to the second outer springs SP22. While deflection of all of the springs SP11 to SPm is allowed, fluctuations in torque transferred to the drive member 11 are damped (absorbed) by the springs SP11 to SPm. Consequently, it is possible to improve the vibration damping performance of the damper device 10 well when input torque transferred to the drive member 11 is relatively small and the rotational speed of the drive member 11 is low.

In addition, when the first and second stoppers 21 and 22 are caused to operate with torque input to the drive member 11 reaching the torque T1 described above, relative rotation between the first intermediate member 12 and the driven member 16 and deflection of the second inner springs SP12 are restricted by the first stoppers 21, and relative rotation between the second intermediate member 14 and the driven member 16 and deflection of the second outer springs SP22 are restricted by the second stoppers 22. Consequently, deflection of the intermediate springs SPm is also restricted with relative rotation of the first and second intermediate members 12 and 14 with respect to the driven member 16 restricted. Thus, the first inner springs SP11 and the first outer springs SP21 act in parallel with each other to damp (absorb) fluctuations in torque transferred to the drive member 11 since torque input to the drive member 11 reaches the torque T1 described above until the input torque reaches the torque T2 described above to cause the third stoppers 23 to operate.

Subsequently, the procedure for designing the damper device 10 will be described.

In the damper device 10, as discussed above, while deflection of all of the first and second inner springs SP11 and SP12, the first and second outer springs SP21 and SP22, and the intermediate springs SPm is allowed, torque (average torque) is transferred between the drive member 11 and the driven member 16 via all of the springs SP11 to SPm. The inventors diligently studied and analyzed the damper device 10 which had complicated torque transfer paths which were neither series nor parallel. As a result, the inventors found that such a damper device 10 had two natural frequencies for the entire device while deflection of all of the springs SP11 to SPm was allowed. In addition, according to the studies and the analyses conducted by the inventors, also in the damper device 10, when resonance (in the present embodiment, resonance of the first intermediate member 12 at the time when the first and second intermediate members 12 and 14 are vibrated in phase with each other) at the lower one of the two natural frequencies (a natural frequency on the low-rotation side (low-frequency side) is generated in accordance with the frequency of vibration transferred to the drive member 11, the phase of vibration transferred from the second inner springs SP12 to the driven member 16 and the phase of vibration transferred from the second outer springs SP22 to the driven member 16 are shifted from each other. Therefore, as the rotational speed of the drive member 11 becomes higher after resonance at the lower one of the two natural frequencies is generated, one of vibration transferred from the second inner springs SP12 to the driven member 16 and vibration transferred from the second outer springs SP22 to the driven member 16 cancels out at least a part of the other.

With such findings, the inventors formulated an equation of motion indicated by the following formula (1) for a vibration system that included the damper device 10 in which torque was transferred from the engine (internal combustion engine) EG to the drive member 11 through establishment of lock-up. In the formula (1), "$J_1$" is the moment of inertia of the drive member 11, "$J_{21}$" is the moment of inertia of the first intermediate member 12, "$J_{22}$" is the moment of inertia of the second intermediate member 14, and "$J_3$" is the moment of inertia of the driven member 16. In addition, "$\theta_1$" is the torsional angle of the drive member 11, "$\theta_{21}$" is the torsional angle of the first intermediate member 12, "$\theta_{22}$" is the torsional angle of the second intermediate member 14, and "$\theta_3$" is the torsional angle of the driven member 16. Furthermore, "$k_1$" is the synthetic spring constant of the plurality of first inner springs SP1 which are provided between the drive member 11 and the first intermediate member 12 to act in parallel with each other, "$k_2$" is the synthetic spring constant of the plurality of second inner springs SP12 which are provided between the first intermediate member 12 and the driven member 16 to act in parallel with each other, "$k_3$" is the synthetic spring constant of the plurality of first outer springs SP21 which are provided between the drive member 11 and the second intermediate member 14 to act in parallel with each other, "$k_4$" is the synthetic spring constant of the plurality of second outer springs SP22 which are provided between the second intermediate member 14 and the driven member 16 to act in parallel with each other, "$k_5$" is the synthetic spring constant (rigidity) of the plurality of intermediate springs SPm which are provided between the first intermediate member 12 and the second intermediate member 14 to act in parallel with each other, "$k_R$" is the rigidity, that is, the spring constant, of the transmission TM, a drive shaft, etc. which are disposed between the driven member 16 and the wheels of the vehicle, and "T" is input torque transferred from the engine EG to the drive member 11.

[Expression 1]

$$\begin{pmatrix} J_1 & 0 & 0 & 0 \\ 0 & J_{21} & 0 & 0 \\ 0 & 0 & J_{22} & 0 \\ 0 & 0 & 0 & J_3 \end{pmatrix} \begin{pmatrix} \ddot{\theta}_1 \\ \ddot{\theta}_{21} \\ \ddot{\theta}_{22} \\ \ddot{\theta}_3 \end{pmatrix} + \begin{pmatrix} k_1+k_3 & -k_1 & -k_3 & 0 \\ -k_1 & k_1+k_2+k_5 & -k_5 & -k_2 \\ -k_3 & -k_5 & k_3+k_4+k_5 & -k_4 \\ 0 & -k_2 & -k_4 & k_2+k_4+k_R \end{pmatrix} \begin{pmatrix} \theta_1 \\ \theta_{21} \\ \theta_{22} \\ \theta_3 \end{pmatrix} = \begin{pmatrix} T \\ 0 \\ 0 \\ 0 \end{pmatrix} \quad (1)$$

Furthermore, the inventors assumed that the input torque T was vibrated periodically as indicated by the following formula (2), and assumed that the torsional angle $\theta_1$ of the drive member 11, the torsional angle $\theta_{21}$ of the first intermediate member 12, the torsional angle $\theta_{22}$ of the second intermediate member 14, and the torsional angle $\theta_3$ of the driven member 16 responded (were vibrated) periodically as indicated by the following formula (3). In the formulae (2) and (3), "$\omega$" is the angular frequency of periodic fluctuations (vibration) of the input torque T. In the formula (3), "$\Theta_1$" is the amplitude (vibration amplitude, i.e. maximum torsional angle) of vibration of the drive member 11 caused along with transfer of torque from the engine EG, "$\Theta_{21}$" is the amplitude (vibration amplitude) of vibration of the first intermediate member 12 caused as torque from the engine EG is transferred to the drive member 11, "$\Theta_{22}$" is the amplitude (vibration amplitude) of vibration of the second intermediate member 14 caused as torque from the engine EG is transferred to the drive member 11, and "$\Sigma_3$" is the amplitude (vibration amplitude) of vibration of the driven member 16 caused as torque from the engine EG is transferred to the drive member 11. Under such assumptions, an identity of the following formula (4) can be obtained by substituting the formulae (2) and (3) into the formula (1) and dividing both sides by "sin $\omega t$".

[Expression 2]

$$T = T_0 \sin \omega t \quad (2)$$

$$\begin{bmatrix} \theta_1 \\ \theta_{21} \\ \theta_{22} \\ \theta_3 \end{bmatrix} = \begin{bmatrix} \Theta_1 \\ \Theta_{21} \\ \Theta_{22} \\ \Theta_3 \end{bmatrix} \sin \omega t \quad (3)$$

-continued $$\begin{pmatrix} -\omega^2 J_1 + k_1 + k_3 & -k_1 & -k_3 & 0 \\ -k_1 & -\omega^2 J_{21} + k_1 + k_2 + k_5 & -k_5 & -k_2 \\ -k_3 & -k_5 & -\omega^2 J_{22} + k_3 + k_4 + k_5 & -k_4 \\ 0 & -k_2 & -k_4 & -\omega^2 J_3 + k_2 + k_4 + k_R \end{pmatrix} \begin{pmatrix} \Theta_1 \\ \Theta_{21} \\ \Theta_{22} \\ \Theta_3 \end{pmatrix} = \begin{pmatrix} T_0 \\ 0 \\ 0 \\ 0 \end{pmatrix} \quad (4)$$

The inventors then focused on the fact that, if the vibration amplitude $\Sigma_3$ of the driven member 16 in the formula (4) became zero, no vibration was transferred in theory to the transmission TM, the drive shaft, etc. in a stage subsequent to the driven member 16 with vibration from the engine EG damped by the damper device 10. Thus, from such a viewpoint, the inventors obtained a conditional expression indicated by the following formula (5) by solving the identity of the formula (4) for the vibration amplitude $\Theta_3$ and setting $\Theta_3$ to zero. In the case where the relationship of the formula (5) is met, vibrations from the engine EG transferred from the drive member 11 to the driven member 16 via the first, second, and third torque transfer paths P1, P2, and P3 cancel out each other, and the vibration amplitude $\Theta_3$ of the driven member 16 becomes zero in theory.

[Expression 3]

$$\omega^2 = \frac{k_5 \cdot (k_1 + k_3) \cdot (k_2 + k_4) + k_1 k_2 k_3 + k_1 k_2 k_4 + k_1 k_3 k_4 + k_2 k_3 k_4}{J_{21} k_3 k_4 + J_{22} k_1 k_2} \quad (5)$$

Figure 5:
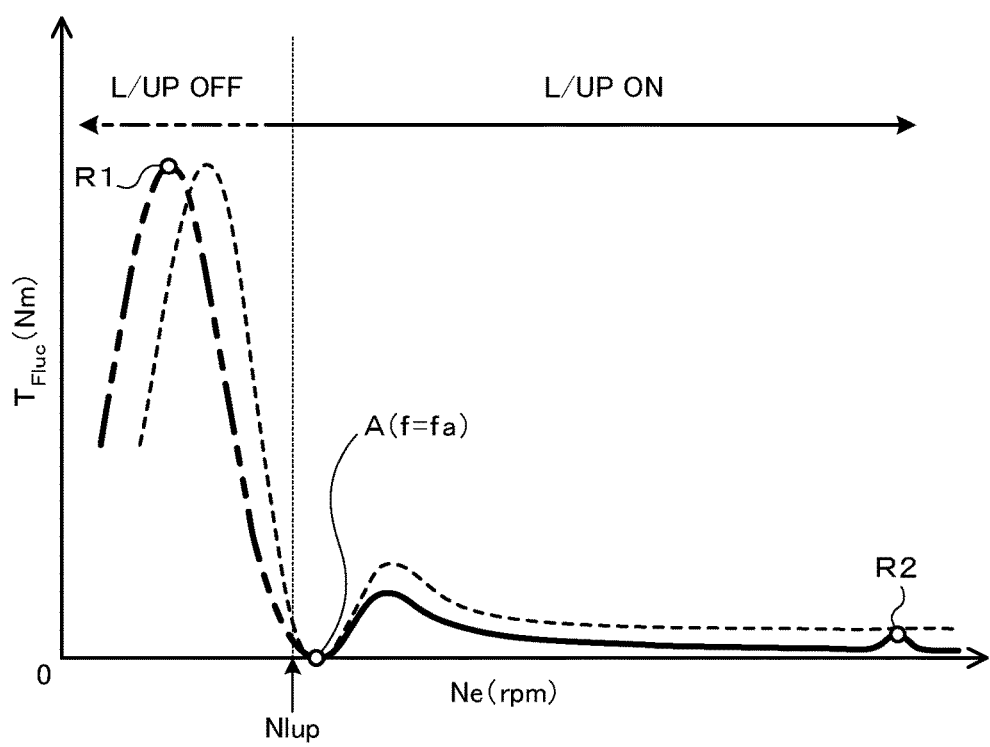
FIG. 5 illustrates an example of the relationship between the rotational speed of an engine and theoretical torque fluctuations of output elements of damper devices.

From such analysis results, it is understood that, with the damper device 10 configured as discussed above, an antiresonance point A at which the vibration amplitude θ3 (torque fluctuations) of the driven member 16 becomes zero in theory as indicated in FIG. 5 may be set with the phase of vibration transferred from the second inner springs SP12 to the driven member 16 and the phase of vibration transferred from the second outer springs SP22 to the driven member 16 are shifted by 180 degrees (inverted) from each other through generation of resonance at the lower one of the two natural frequencies so that the vibrations cancel out each other. In addition, by defining the frequency of the antiresonance point A as "fa" and substituting "ω=2πfa" into the formula (5) given above, the frequency fa of the antiresonance point A is represented by the following formula (6). FIG. 5 indicates an example of the relationship between the rotational speed of the engine EG and the vibration amplitude (torque fluctuations) in theory (under the assumption that no hysteresis is provided) of the driven members of the damper device according to the present disclosure and a damper device from which the intermediate springs SPm have been omitted (the damper device described in JP 2012-506006 A; hereinafter referred to as a "damper device according to a comparative example").

[Expression 4]

$$fa = \frac{1}{2\pi} \sqrt{\frac{k_5 \cdot (k_1 + k_3) \cdot (k_2 + k_4) + k_1 k_2 k_3 + k_1 k_2 k_4 + k_1 k_3 k_4 + k_2 k_3 k_4}{J_{21} k_3 k_4 + J_{22} k_1 k_2}} \quad (6)$$

If it is assumed that the torsional angle $\theta_1$ of the drive member 11 and the torsional angle $\theta_2$ of the driven member 16 are zero and both displacements of the drive member 11 and the driven member 16 are zero, meanwhile, the formula (1) can be transformed into the following formula (7). Furthermore, if it is assumed that the first and second intermediate members 12 and 14 are vibrated in harmony with each other as indicated by the following formula (8), an identity of the following formula (9) can be obtained by substituting the formula (8) into the formula (7) and dividing both sides by "sin ωt".

[Expression 5]

$$\begin{pmatrix} J_{21} & 0 \\ 0 & J_{22} \end{pmatrix} \begin{pmatrix} \ddot{\theta}_{21} \\ \ddot{\theta}_{22} \end{pmatrix} + \quad (7)$$

$$\begin{pmatrix} k_1 + k_2 + k_5 & -k_5 \\ -k_5 & k_3 + k_4 + k_5 \end{pmatrix} \begin{pmatrix} \theta_{21} \\ \theta_{22} \end{pmatrix} = \begin{pmatrix} 0 \\ 0 \end{pmatrix}$$

$$\begin{pmatrix} \theta_{21} \\ \theta_{22} \end{pmatrix} = \begin{pmatrix} \Theta_{21} \\ \Theta_{22} \end{pmatrix} \sin \omega t \quad (8)$$

$$\begin{pmatrix} -\omega^2 J_{21} + k_1 + k_2 + k_5 & -k_5 \\ -k_5 & -\omega^2 J_{22} + k_3 + k_4 + k_5 \end{pmatrix} \begin{pmatrix} \Theta_{21} \\ \Theta_{22} \end{pmatrix} = \begin{pmatrix} 0 \\ 0 \end{pmatrix} \quad (9)$$

In the case where the first and second intermediate members 12 and 14 are vibrated in harmony with each other, both the amplitudes $\Theta_{21}$ and $\Theta_{22}$ are not zero. Thus, the determinant of the square matrix on the left side of the formula (9) is zero, and a conditional expression of the following formula (10) must be met. Such a formula (10) is a quadratic equation for the square value $\omega^2$ of two natural angular frequencies of the damper device 10. Thus, the two natural angular frequencies $\omega_1$ and $\omega_2$ of the damper device 10 are represented by the following formulae (11) and (12), and $\omega_1 < \omega_2$ is met. As a result, if the frequency of resonance (resonance point R1) that causes the resonance point A, that is, the natural frequency of the first intermediate member 12, is defined as "$f_{21}$", and if the frequency of resonance (resonance point R2) generated on the high-rotation side with respect to the antiresonance point A, that is, the natural frequency of the second intermediate member 14, is defined as "$f_{22}$", the natural frequency $f_{21}$ on the low-rotation side (low-frequency side) is represented by the following formula (13), and the natural frequency $f_{22}$ ($f_{22}>f_{21}$) on the high-rotation side (high-frequency side) is represented by the following formula (14).

[Expression 6]

$$(-\omega^2 J_{21} + k_1 + k_2 + k_5)(-\omega^2 J_{22} + k_3 + k_4 + k_5) - k_5^2 = 0 \quad (10)$$

$$\omega_1 = \sqrt{\frac{1}{2} \left\{ \frac{k_1 + k_2 + k_5}{J_{21}} + \frac{k_3 + k_4 + k_5}{J_{22}} - \sqrt{\left(\frac{k_3 + k_4 + k_5}{J_{22}} - \frac{k_1 + k_2 + k_5}{J_{21}}\right)^2 + \frac{4k_5^2}{J_{21}J_{22}}} \right\}} \quad (11)$$

-continued $$\omega_2 = \sqrt{\frac{1}{2}\left\{\frac{k_1+k_2+k_5}{J_{21}} + \frac{k_3+k_4+k_5}{J_{22}} + \sqrt{\left(\frac{k_3+k_4+k_5}{J_{22}} - \frac{k_1+k_2+k_5}{J_{21}}\right)^2 + \frac{4k_5^2}{J_{21}J_{22}}}\right\}} \quad (12)$$

$$f_{21} = \frac{1}{2\pi}\sqrt{\frac{k_1+k_2+k_5}{2J_{21}} + \frac{k_3+k_4+k_5}{2J_{22}} - \sqrt{\left(\frac{k_3+k_4+k_5}{2J_{22}} - \frac{k_1+k_2+k_5}{2J_{21}}\right)^2 + \frac{k_5^2}{J_{21}J_{22}}}} \quad (13)$$

$$f_{22} = \frac{1}{2\pi}\sqrt{\frac{k_1+k_2+k_5}{2J_{21}} + \frac{k_3+k_4+k_5}{2J_{22}} + \sqrt{\left(\frac{k_3+k_4+k_5}{2J_{22}} - \frac{k_1+k_2+k_5}{2J_{21}}\right)^2 + \frac{k_5^2}{J_{21}J_{22}}}} \quad (14)$$

In addition, an equivalent rigidity $k_{eq}$ of the damper device 10 at the time when deflection of all of the first and second inner springs SP11 and SP12, the first and second outer springs SP21 and SP22, and the intermediate springs SPm is allowed can be obtained as follows. That is, if it is assumed that constant input torque $T=T_0$ (static external force) is transferred to the drive member 11, and if it is assumed that the balanced relationship indicated by the following formula (15) is met, an identity of the following formula (16) can be obtained by substituting $T=T_0$ and the formula (15) into the formula (1).

[Expression 7]

$$\begin{bmatrix} \theta_1 \\ \theta_{21} \\ \theta_{22} \\ \theta_3 \end{bmatrix} = \begin{bmatrix} \Theta_1 \\ \Theta_{21} \\ \Theta_{22} \\ \Theta_3 \end{bmatrix} \quad (15)$$

$$\begin{pmatrix} k_1+k_3 & -k_1 & -k_3 & 0 \\ -k_1 & k_1+k_2+k_5 & -k_5 & -k_2 \\ -k_3 & -k_5 & k_3+k_4+k_5 & -k_4 \\ 0 & -k_2 & -k_4 & k_2+k_4+k_R \end{pmatrix} \begin{pmatrix} \Theta_1 \\ \Theta_{21} \\ \Theta_{22} \\ \Theta_3 \end{pmatrix} = \begin{pmatrix} T_0 \\ 0 \\ 0 \\ 0 \end{pmatrix} \quad (16)$$

Furthermore, a relation $T_0 = k_{eq} \cdot (\Theta_1 - \Theta_3)$ is met among the torque $T_0$, the equivalent rigidity $k_{eq}$ of the damper device 10, the vibration amplitude (torsional angle) $\Theta_1$ of the drive member 11, and the vibration amplitude (torsional angle) $\Theta_3$ of the driven member 16. Furthermore, when the identity of the formula (16) is solved for the vibration amplitudes (torsional angles) $\Theta_1$ and $\Theta_3$, "$\Theta_1 - \Sigma_3$" is represented by the following formula (17). Thus, the equivalent rigidity $k_{eq}$ of the damper device 10 is represented by the following formula (18) using $T_0 = k_{eq} \cdot (\Theta_1 - \Theta_3)$ and the formula (17).

[Expression 8]

$$\Theta_1 - \Theta_3 = \frac{\{k_5 \cdot (k_1+k_2+k_3+k_4) + (k_1+k_2)(k_3+k_4)\}T_0}{k_5(k_1+k_3)(k_2+k_4) + (k_1k_2k_3+k_1k_3k_4+k_1k_2k_4+k_2k_3k_4)} \quad (17)$$

$$K_{eq} = \frac{k_5(k_1+k_3)(k_2+k_4) + (k_1k_2k_3+k_1k_3k_4+k_1k_2k_4+k_2k_3k_4)}{k_5 \cdot (k_1+k_2+k_3+k_4) + (k_1+k_2)(k_3+k_4)} \quad (18)$$

The results of analysis conducted by the inventors on the natural frequency $f_{21}$ on the low-rotation side, the frequency fa of the antiresonance point A, and the equivalent rigidity $k_{eq}$ of the damper device 10 obtained as discussed above are indicated in FIGS. 6 to 11. FIGS. 6 to 11 indicate the mode of variations in the natural frequency $f_{21}$, the frequency fa of the antiresonance point A, and the equivalent rigidity $k_{eq}$ at the time when only one of the synthetic spring constants $k_1$, $k_2$, $k_3$, $k_4$, and $k_5$ and the moments of inertia $J_{21}$ and $J_{22}$ of the first and second intermediate members 12 and 14 is varied while keeping the others of the parameters at constant values (fixed values).

Figure 6:
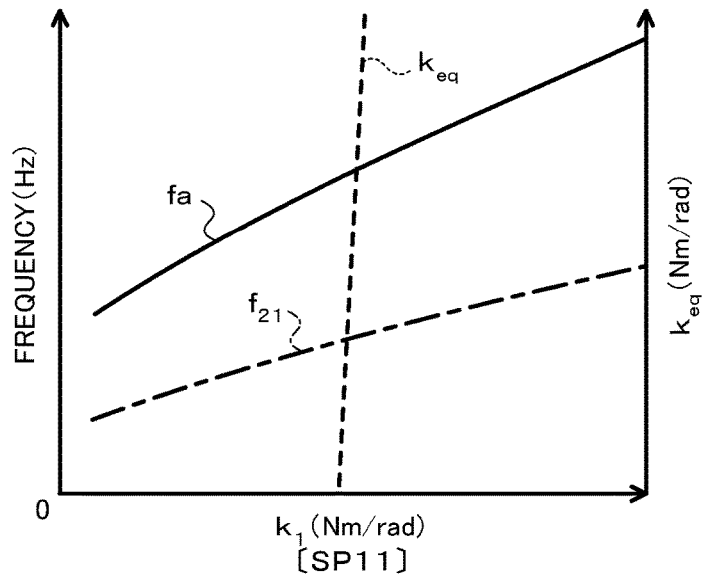
FIG. 6 illustrates an example of the relationship between the rigidity of the first elastic body in the damper device according to the present disclosure and the natural frequency on the low-rotation side, the frequency of the antiresonance point, and the equivalent rigidity of the damper device.

In the case where only the synthetic spring constant (rigidity) $k_1$ of the first inner springs (first elastic bodies) SP11 is varied while keeping the synthetic spring constants $k_2$, $k_3$, $k_4$, and $k_5$ and the moments of inertia $J_{21}$ and $J_{22}$ in the damper device 10 at constant values, as indicated in FIG. 6, the natural frequency $f_{21}$ and the frequency fa of the antiresonance point A become higher as the synthetic spring constant $k_1$ is larger, and become gradually lower as the synthetic spring constant $k_1$ becomes smaller. In contrast, as indicated in FIG. 6, the equivalent rigidity $k_{eq}$ is increased steeply when the synthetic spring constant $k_1$ is increased slightly from a value adapted in advance, and decreased steeply when the synthetic spring constant $k_1$ is decreased slightly from the adapted value. That is, variations (variation gradient) in the equivalent rigidity $k_{eq}$ are very large with respect to variations in the synthetic spring constant $k_1$ of the first inner springs SP11.

Figure 7:
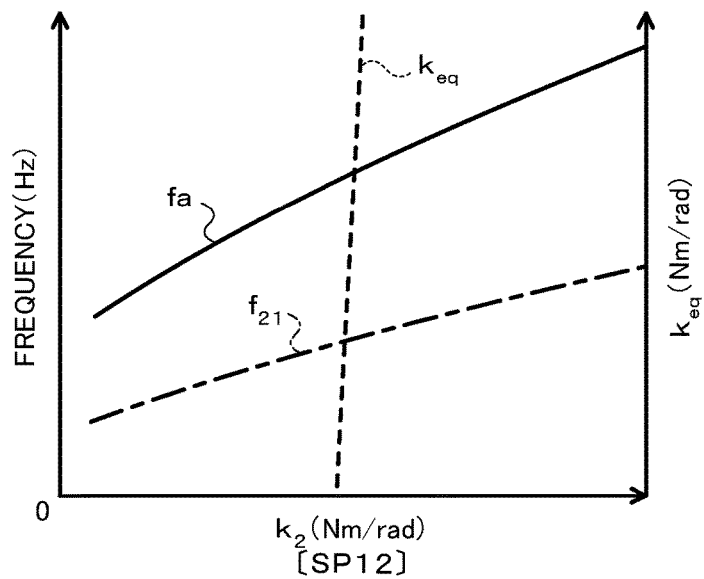
FIG. 7 illustrates an example of the relationship between the rigidity of the second elastic body in the damper device according to the present disclosure and the natural frequency on the low-rotation side, the frequency of the antiresonance point, and the equivalent rigidity of the damper device.

Meanwhile, also in the case where only the synthetic spring constant (rigidity) $k_2$ of the second inner springs (second elastic bodies) SP12 is varied while keeping the synthetic spring constants $k_1$, $k_3$, $k_4$, and $k_5$ and the moments of inertia $J_{21}$ and $J_{22}$ in the damper device 10 at constant values, as indicated in FIG. 7, the natural frequency $f_{21}$ and the frequency fa of the antiresonance point A become higher as the synthetic spring constant $k_2$ is larger, and become gradually lower as the synthetic spring constant $k_2$ becomes smaller. Furthermore, as indicated in FIG. 7, the equivalent rigidity $k_{eq}$ is increased steeply when the synthetic spring constant $k_2$ is increased slightly from a value adapted in advance, and decreased steeply when the synthetic spring constant $k_2$ is decreased slightly from the adapted value. That is, variations (variation gradient) in the equivalent rigidity $k_{eq}$ are also very large with respect to variations in the synthetic spring constant $k_2$ of the second inner springs SP12.

Figure 8:
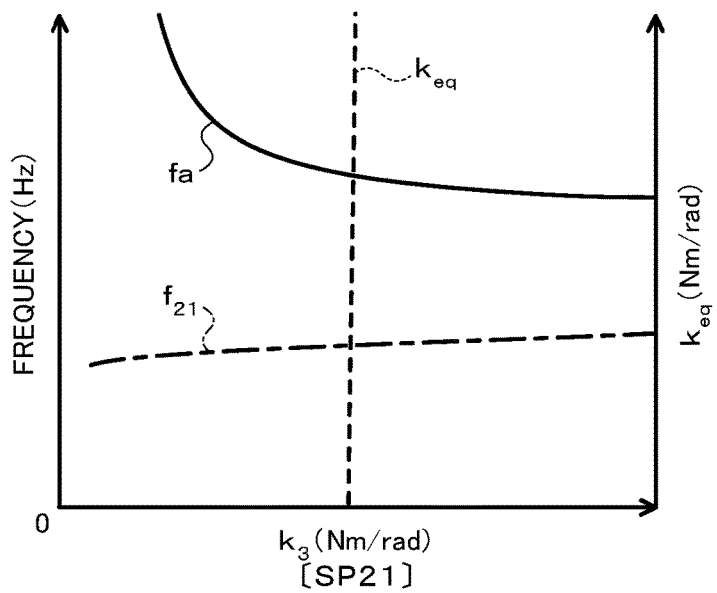
FIG. 8 illustrates an example of the relationship between the rigidity of the third elastic body in the damper device according to the present disclosure and the natural frequency on the low-rotation side, the frequency of the antiresonance point, and the equivalent rigidity of the damper device.

On the other hand, in the case where only the synthetic spring constant (rigidity) $k_3$ of the first outer springs (third elastic bodies) SP21 is varied while keeping the synthetic spring constants $k_1$, $k_2$, $k_4$, and $k_5$ and the moments of inertia $J_{21}$ and $J_{22}$ in the damper device 10 at constant values, as indicated in FIG. 8, the natural frequency $f_{21}$ becomes slightly higher (is kept generally constant) as the synthetic spring constant $k_3$ becomes larger, and the frequency fa of the antiresonance point A becomes higher as the synthetic spring constant $k_3$ is smaller, and becomes gradually lower as the synthetic spring constant $k_3$ becomes larger. In addition, as indicated in FIG. 8, the equivalent rigidity $k_{eq}$ is decreased steeply when the synthetic spring constant $k_3$ is decreased slightly from a value adapted in advance, and increased steeply when the synthetic spring constant $k_3$ is increased slightly from the adapted value. That is, variations (variation gradient) in the equivalent rigidity $k_{eq}$ are also very large with respect to variations in the synthetic spring constant $k_3$ of the first outer springs SP21.

Figure 9:
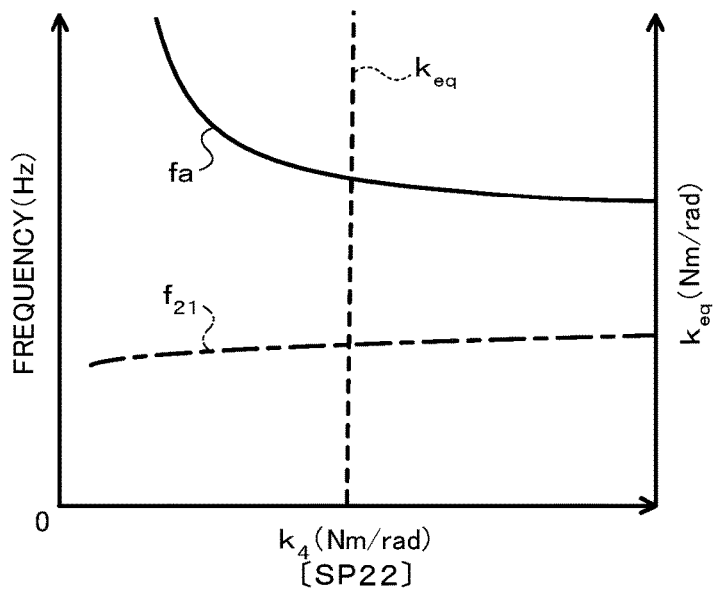
FIG. 9 illustrates an example of the relationship between the rigidity of the fourth elastic body in the damper device according to the present disclosure and the natural frequency on the low-rotation side, the frequency of the antiresonance point, and the equivalent rigidity of the damper device.

Furthermore, also in the case where only the synthetic spring constant (rigidity) $k_4$ of the second outer springs (fourth elastic bodies) SP22 is varied while keeping the synthetic spring constants $k_1$, $k_2$, $k_3$, and $k_5$ and the moments of inertia $J_{21}$ and $J_{22}$ in the damper device 10 at constant values, as indicated in FIG. 9, the natural frequency $f_{21}$ becomes slightly higher (is kept generally constant) as the synthetic spring constant $k_4$ becomes larger, and the frequency fa of the antiresonance point A becomes higher as the synthetic spring constant $k_4$ is smaller, and becomes gradually lower as the synthetic spring constant $k_4$ becomes larger. In addition, as indicated in FIG. 9, the equivalent rigidity $k_{eq}$ is decreased steeply when the synthetic spring constant $k_4$ is decreased slightly from a value adapted in advance, and increased steeply when the synthetic spring constant $k_4$ is increased slightly from the adapted value. That is, variations (variation gradient) in the equivalent rigidity $k_{eq}$ are also very large with respect to variations in the synthetic spring constant $k_4$ of the second outer springs SP22.

Figure 10:
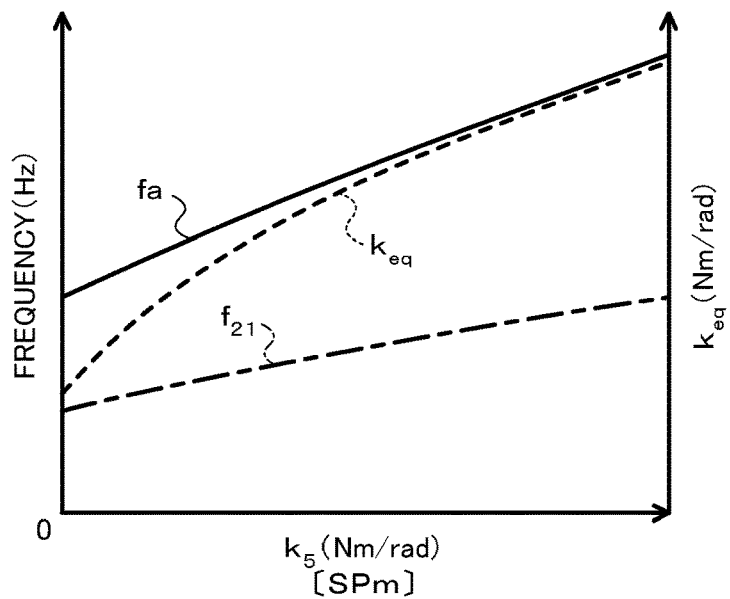
FIG. 10 illustrates an example of the relationship between the rigidity of a fifth elastic body in the damper device according to the present disclosure and the natural frequency on the low-rotation side, the frequency of the antiresonance point, and the equivalent rigidity of the damper device.

In the case where only the synthetic spring constant (rigidity) $k_5$ of the intermediate springs (fifth elastic bodies) SPm is varied while keeping the synthetic spring constants $k_1$, $k_2$, $k_3$, and $k_4$ and the moments of inertia $J_{21}$ and $J_{22}$ in the damper device 10 at constant values, as indicated in FIG. 10, the natural frequency $f_{21}$ and the frequency fa of the antiresonance point A become higher as the synthetic spring constant $k_5$ is larger, and become gradually lower as the synthetic spring constant $k_5$ becomes smaller. In addition, as indicated in FIG. 10, the difference (fa–$f_{21}$) between the natural frequency $f_{21}$ and the frequency fa of the antiresonance point A corresponding to a certain synthetic spring constant $k_5$ becomes gradually larger as the synthetic spring constant $k_5$ becomes larger. Furthermore, in the case where only the synthetic spring constant $k_5$ of the intermediate springs SPm is varied, as indicated in FIG. 10, the equivalent rigidity $k_{eq}$ becomes higher as the synthetic spring constant $k_5$ is larger, and becomes gradually lower as the synthetic spring constant $k_5$ becomes smaller. That is, variations (variation gradient) in the equivalent rigidity $k_{eq}$ with respect to variations in the synthetic spring constant (rigidity) $k_5$ of the intermediate springs SPm are significantly small compared to variations (variation gradient) in the equivalent rigidity $k_{eq}$ with respect to variations in the synthetic spring constants (rigidities) $k_1$, $k_2$, $k_3$, and $k_4$.

Figure 11:
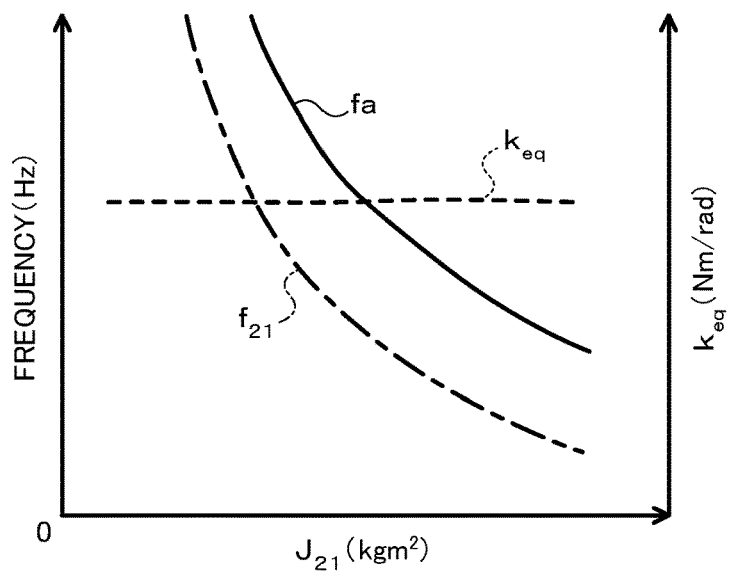
FIG. 11 illustrates an example of the relationship between the moment of inertia of a first intermediate element in the damper device according to the present disclosure and the natural frequency on the low-rotation side, the frequency of the antiresonance point, and the equivalent rigidity of the damper device.

Meanwhile, in the case where only the moment of inertia $J_{21}$ of the first intermediate member 12 is varied while keeping the synthetic spring constants $k_1$, $k_2$, $k_3$, $k_4$, and $k_5$ and the moment of inertia $J_{22}$ of the second intermediate member 14 in the damper device 10 at constant values, as indicated in FIG. 11, the natural frequency $f_{21}$ and the frequency fa of the antiresonance point A become higher as the moment of inertia $J_{21}$ is smaller, and become gradually lower as the moment of inertia $J_{21}$ becomes larger. Furthermore, if only the moment of inertia $J_{21}$ of the first intermediate member 12 is varied, as illustrated in FIG. 11, the equivalent rigidity $k_{eq}$ is kept generally constant. In the case where only the moment of inertia $J_{22}$ of the second intermediate member 14 is varied while keeping the synthetic spring constants $k_1$, $k_2$, $k_3$, $k_4$, and $k_5$ and the moment of inertia $J_{21}$ of the first intermediate member 12 in the damper device 10 at constant values, although not indicated in the drawings, results similar to those obtained in the case where only the moment of inertia $J_{21}$ of the first intermediate member 12 is varied are obtained.

As seen from the analysis results discussed above, by lowering the rigidity of the intermediate springs SPm (reducing the spring constant $k_m$ and the synthetic spring constant $K_5$), it is possible to further reduce the natural frequency $f_{21}$ on the low-rotation side (see the formula (13)) and the frequency fa of the antiresonance point A (see the formula (6)). By enhancing the rigidity of the intermediate springs SPm (increasing the spring constant $k_m$ and the synthetic spring constant $K_5$), conversely, it is possible to increase the difference between the natural frequency $f_{21}$ on the low-rotation side and the frequency fa of the antiresonance point A. Furthermore, the equivalent rigidity $k_{eq}$ is not lowered significantly even if the rigidity of the intermediate springs SPm is lowered (even if the spring constant $k_m$ and the synthetic spring constant $K_5$ are reduced). Thus, in the damper device 10, by adjusting the rigidity (the spring constant $k_m$ and the synthetic spring constant $K_5$) of the intermediate springs SPm, it is possible to appropriately set the natural frequency $f_{21}$ on the low-rotation side and the frequency fa of the antiresonance point A while keeping the equivalent rigidity keq appropriate in accordance with the maximum torque input to the drive member 11 and suppressing an increase in the weights of the first and second intermediate members 12 and 14, that is, the moments of inertia $J_{21}$ and $J_{22}$. By lowering the rigidities of the first and second inner springs SP11 and SP12 (reducing the spring constants $k_{11}$ and $k_{12}$ and the synthetic spring constants $K_1$ and $K_2$), in addition, it is possible to reduce the natural frequency $f_{21}$ on the low-rotation side and the frequency fa of the antiresonance point A. By enhancing the rigidities of the first and second outer springs SP21 and SP22 (increasing the spring constants $k_{21}$ and $k_{22}$ and the synthetic spring constants $K_3$ and $K_4$), further, it is possible to reduce the frequency fa of the antiresonance point A.

In the vehicle on which the engine (internal combustion engine) EG is mounted as a source that generates power for travel, the efficiency of power transfer between the engine EG and the transmission TM can be improved, and the fuel efficiency of the engine EG can be improved, by lowering a lock-up rotational speed Nlup so that torque from the engine EG is mechanically transferred to the transmission TM early. It should be noted, however, that in a low-rotational speed range of about 500 rpm to 1500 rpm, in which the lock-up rotational speed Nlup may be set, vibration transferred from the engine EG to the drive member 11 via a lock-up clutch is increased, and that the vibration level is increased conspicuously in vehicles on which an engine with a reduced number of cylinders such as a three-cylinder or four-cylinder engine, in particular, is mounted. Thus, in order that large vibration is not transferred to the transmission TM etc. during or immediately after establishment of lock-up, it is necessary to further lower the vibration level in a rotational speed range around the lock-up rotational speed Nlup of the entire damper device 10 (driven member 16) which transfers torque (vibration) from the engine EG to the transmission TM when lock-up is established.

In the light of this, the inventors configured the damper device 10 such that the antiresonance point A discussed above was formed when the rotational speed of the engine EG was in the range of 500 rpm to 1500 rpm (the assumed setting range of the lock-up rotational speed Nlup) on the basis of the lock-up rotational speed Nlup which was determined for the lock-up clutch 8. If the number of cylinders of the engine (internal combustion engine) EG is defined as "n", a rotational speed Nea of the engine EG corresponding to the frequency fa of the antiresonance point A is represented as Nea=(120/n)·fa. Thus, in the damper device 10, the synthetic spring constant $k_1$ of the plurality of first inner springs SP1, the synthetic spring constant $k_2$ of the plurality of second inner springs SP12, the synthetic spring constant $k_3$ of the plurality of first outer springs SP21, the synthetic spring constant $k_4$ of the plurality of second outer springs SP22, the synthetic spring constant $k_5$ of the plurality of intermediate springs SPm, the moment of inertia $J_{21}$ of the first intermediate member 12 (with the moment of inertia of the turbine runner 5 etc., which is coupled so as to rotate therewith, taken into consideration (added); the same applies hereinafter), and the moment of inertia $J_{22}$ of the second intermediate member 14 are selected and set so as to meet the following formula (19). That is, in the damper device 10, the spring constants $k_{11}$, $k_{12}$, $k_{21}$, $k_{22}$, and $k_m$ of the springs SP11 to SP$m$ and the moments of inertia $J_{21}$ and $J_{22}$ of the first and second intermediate members 12 and 14 are selected and set on the basis of the frequency fa of the antiresonance point A (and the lock-up rotational speed Nlup).

[Expression 9]

$$500 rpm \leq \frac{120}{n} fa \leq 1500 rpm \tag{19}$$

In this way, by setting the antiresonance point A which may bring the vibration amplitude $\Theta_3$ of the driven member 16 to zero in theory (which may further lower vibration) within the low-rotational speed range from 500 rpm to 1500 rpm (the assumed setting range of the lock-up rotational speed Nlup), as indicated in FIG. 5, resonance that causes the antiresonance point A (resonance unavoidably caused in order to form the antiresonance point A; in the present embodiment, resonance of the first intermediate member 12; see the resonance point R1 in FIG. 5) can be further shifted to the low-rotation side (low-frequency side) so as to be included in a non-lock-up region of the lock-up clutch 8 (see the dash-double-dot line in FIG. 5). That is, in the present embodiment, resonance of the first intermediate member 12 (resonance at the lower one of the two natural frequencies) is virtual and not generated in a rotational speed range in which the damper device 10 is used. In addition, as indicated in FIG. 5, a rotational speed corresponding to the lower one of the two natural frequencies of the damper device 10 (the natural frequency of the first intermediate member 12) is lower than the lock-up rotational speed Nlup of the lock-up clutch 8, and a rotational speed corresponding to the higher one of the two natural frequencies of the damper device 10 (the natural frequency of the second intermediate member 14) is higher than the lock-up rotational speed Nlup. Consequently, one of vibration transferred from the second inner springs SP12 to the driven member 16 and vibration transferred from the second outer springs SP22 to the driven member 16 can be used to cancel out at least a part of the other since the time when lock-up is established by the lock-up clutch 8.

To configure the damper device 10 so as to meet the formula (19) given above, the spring constants $k_{11}$, $k_{12}$, $k_{21}$, $k_{22}$, and $k_m$ and the moments of inertia $J_{21}$ and $J_{22}$ are preferably selected and set such that the frequency of resonance that causes the antiresonance point A (see the resonance point R1 in FIG. 5) is lower than the frequency fa of the antiresonance point A and is as small a value as possible. Therefore, in the damper device 10 according to the present embodiment, the values of the spring constants $k_{11}$, $k_{12}$, $k_{21}$, $k_{22}$, and $k_m$ are determined so as to meet the relation $k_{11} < k_m < k_{12} < k_{22} < k_{21}$ discussed above.

That is, in the damper device 10, the spring constant $k_m$ of the intermediate springs SP$m$ and the spring constants $k_{11}$ and $k_{12}$ of the first and second inner springs SP11 and SP12 are determined to be small such that the natural frequency $f_{21}$ on the low-rotation side and the frequency fa of the antiresonance point A are further reduced. Furthermore, the spring constants $k_{21}$ and $k_{22}$ of the first and second outer springs SP21 and SP22 are determined to be large such that the natural frequency $f_{21}$ on the low-rotation side is further reduced. Consequently, it is possible to set the start point of a rotational speed band (frequency band) in which one of vibration transferred from the second inner springs SP12 to the driven member 16 and vibration transferred from the second outer springs SP22 to the driven member 16 is used to cancel out at least a part of the other on the lower-rotation side (lower-frequency side) by further reducing the natural frequency $f_{21}$ on the low-rotation side and the frequency fa of the antiresonance point A. By setting the start point of such a rotational speed band on the low-rotation side, further, the rotational speed (frequency) at which the phase of vibration transferred from the second inner springs SP12 to the driven member 16 and the phase of vibration transferred from the second outer springs SP22 to the driven member 16 are shifted by 180 degrees from each other can also be set to the low-rotation side. As a result, it is possible to allow lock-up at a still lower rotational speed, and to further improve the vibration damping performance in the low-speed range.

In addition, in the damper device 10, as indicated in FIG. 5, when the rotational speed of the engine EG is enhanced after damping of vibration of the driven member 16 peaks around the antiresonance point A, resonance (in the present embodiment, resonance of the second intermediate member 14; see the resonance point R2 in FIG. 5) at the higher one of the two natural frequencies is generated, and vibration transferred from the second inner springs SP12 to the driven member 16 and vibration transferred from the second outer springs SP22 to the driven member 16 are brought into phase with each other. That is, in the damper device 10 according to the present embodiment, one of vibration transferred from the second inner springs SP12 to the driven member 16 and vibration transferred from the second outer springs SP22 to the driven member 16 cancels out at least a part of the other during a period since resonance (resonance of the first intermediate member 12) at the lower one of the two natural frequencies described above is generated until resonance (resonance of the second intermediate member 14) at the higher one of the two natural frequencies is generated. Thus, the spring constants (synthetic spring constants) $k_1$, $k_2$, $k_3$, $k_4$, and $k_5$ and the moments of inertia $J_{21}$ and $J_{22}$ are preferably selected and set such that the frequency of resonance generated on the high-rotation side (high-frequency side) with respect to the antiresonance point A is higher. Consequently, it is possible to generate such resonance (resonance point R2) in the high-rotational speed range in which vibration does not easily become manifest, which further improves the vibration damping performance of the damper device 10 in the low-rotational speed range.

Furthermore, in the damper device 10, in order to improve the vibration damping performance around the lock-up rotational speed Nlup, it is necessary to separate the lock-up rotational speed Nlup and the rotational speed of the engine EG corresponding to the resonance point R2 from each other as much as possible. Thus, in configuring the damper device 10 so as to meet the formula (19), the spring constants $k_1$, $k_2$, $k_3$, $k_4$, and $k_5$ and the moments of inertia $J_{21}$ and $J_{22}$ are preferably selected and set so as to meet $Nlup \leq (120/n) \cdot fa$ (=Nea). Consequently, it is possible for the lock-up clutch 8 to establish lock-up while suppressing transfer of vibration to the input shaft IS of the transmission TM well, and for the damper device 10 to damp vibration from the engine EG extremely well immediately after the establishment of lock-up.

As discussed above, by designing the damper device 10 on the basis of the frequency fa of the antiresonance point A, it is possible to improve the vibration damping performance of the damper device 10 extremely well. The studies and the analyses conducted by the inventors confirmed that, in the case where the lock-up rotational speed Nlup was determined as a value around 1000 rpm, for example, extremely good results in practice were obtained by configuring the damper device 10 so as to meet 900 rpm≤(120/n)·fa≤1200 rpm, for example.

In addition, as seen from the formulae (13) and (14), the two natural frequencies $f_{21}$ and $f_{22}$ of the damper device 10 are affected by both the moments of inertia $J_{21}$ and $J_{22}$ of the first and second intermediate members 12 and 14. That is, in the damper device 10, the first intermediate member 12 and the second intermediate member 14 are coupled to each other via the intermediate springs SPm. Thus, vibration of the first intermediate member 12 and vibration of the second intermediate member 14 are coupled to each other (vibrations of the first and second intermediate members 12 and 14 affect each other) with a force from the intermediate springs SPm (see the white arrows in FIG. 4) acting on both the first and second intermediate members 12 and 14. In this way, with vibration of the first intermediate member 12 and vibration of the second intermediate member 14 coupled to each other, the natural frequencies $f_{21}$ and $f_{22}$ are affected by both the moments of inertia $J_{21}$ and $J_{22}$ of the first and second intermediate members 12 and 14. Thus, in the damper device 10, it is possible to easily shift resonance at the lower one of the two natural frequencies $f_{21}$ and $f_{22}$ to the low-rotation side, that is, the non-lock-up region, while suppressing an increase in the weights of the first and second intermediate members 12 and 14, that is, the moments of inertia $J_{21}$ and $J_{22}$, and to set the natural frequencies $f_{21}$ and $f_{22}$ and the frequency fa of the antiresonance point A easily and appropriately such that the vibrations cancel out each other at the driven member 16 better when the rotational speed of the drive member 11 is lower.

Furthermore, in the damper device 10, the two natural frequencies $f_{21}$ and $f_{22}$ are affected by both the moments of inertia $J_{21}$ and $J_{22}$ of the first and second intermediate members 12 and 14. Thus, by adjusting the moments of inertia $J_{21}$ and $J_{22}$ of the first and second intermediate members 12 and 14, as indicated in FIG. 5, the natural frequency $f_{21}$ (resonance point R1) on the low-rotation side can be easily further shifted to the low-rotation side of the non-lock-up region compared to the damper device according to the comparative example described above while determining the frequency fa of the antiresonance point A as a value about a frequency fa' of the antiresonance point of the damper device according to the comparative example. Consequently, with the damper device 10, it is possible to further lower the vibration level around the antiresonance point A compared to the damper device according to the comparative example (see the broken line in FIG. 5). In this way, by lowering the vibration level around the antiresonance point A by reducing the natural frequency $f_{21}$ on the low-rotation side, it is possible to keep the lock-up rotational speed Nlup lower even in the case where the order of vibration from the engine EG is lowered along with execution of reduced cylinder operation of the engine EG which has a cylinder stop function.

In addition, the analysis conducted by the inventors has revealed that, by coupling vibrations of the first and second intermediate members 12 and 14 to each other by coupling the first and second intermediate members 12 and 14 to each other using the intermediate springs SPm, vibrations transferred from the first, second, and third torque transfer paths P1, P2, and P3 described above to the driven member 16 tend to cancel out each other, which may reduce the actual vibration amplitude of the driven member 16 around the antiresonance point A and decrease the difference in the torque amplitude (torque fluctuations) between the second inner springs SP12 and the second outer springs SP22 (bring the torque amplitudes of the second inner springs SP12 and the second outer springs SP22 closer to each other). Thus, with the damper device 10, it is possible to allow lock-up (coupling between the engine EG and the drive member 11) at lower rotational speeds, and to improve the vibration damping performance in the low-rotational speed range in which vibration from the engine EG tends to become large.

Here, assuming $k_5=0$ in the formula (13) given above, a natural frequency $f_{21}'$ of the first intermediate member in the damper device according to the comparative example from which the intermediate springs SPm have been omitted is represented by the following formula (20). Assuming $k_5=0$ in the formula (14) given above, a natural frequency $f_{22}'$ of the second intermediate member in the damper device according to the comparative example is represented by the following formula (21). In the damper device according to the comparative example, as seen from the formulae (20) and (21), the natural frequency $f_{21}'$ of the first intermediate member is not affected by the moment of inertia $J_{22}$ of the second intermediate member, and the natural frequency $f_{22}'$ of the second intermediate member is not affected by the moment of inertia $J_{21}$ of the first intermediate member. From this respect, it is understood that, with the damper device 10, the degree of freedom in design of the natural frequencies $f_{21}$ and $f_{22}$ of the first and second intermediate members 12 and 14 may be improved compared to the damper device according to the comparative example.

[Expression 10]

$$f_{21}' = \frac{1}{2\pi}\sqrt{\frac{k_1 + k_2}{J_{21}}} \quad (20)$$

$$f_{22}' = \frac{1}{2\pi}\sqrt{\frac{k_3 + k_4}{J_{22}}} \quad (21)$$

In addition, assuming $k_5=0$ in the formula (6) given above, the frequency fa' of the antiresonance point in the damper device according to the comparative example is represented by the following formula (22). When the formula (6) and the formula (22) are compared with each other, in the case where the spring constants $k_1$, $k_2$, $k_3$, and $k_4$ and the moments of inertia $J_{21}$ and $J_{22}$ are the same, the vibration amplitude fa' of the antiresonance point in the damper device according to the comparative example is smaller than the frequency fa of the antiresonance point A in the damper device 10. It should be noted, however, that with the damper device 10, the value can be easily set to a value about the frequency fa' of the antiresonance point of the damper device according to the comparative example (see the broken line in FIG. 5) by mainly selecting the moments of inertia $J_{21}$ and $J_{22}$ of the first and second intermediate members 12 and 14 as appropriate.

[Expression 11]

$$fa' = \frac{1}{2\pi}\sqrt{\frac{k_1k_2k_3 + k_1k_2k_4 + k_1k_3k_4 + k_2k_3k_4}{J_{21}k_3k_4 + J_{22}k_1k_2}} \quad (22)$$

In the damper device 10 discussed above, the average attachment radius ro of the first and second outer springs SP21 and SP22 corresponding to the second intermediate member 14, which has a natural frequency that is higher than that of the first intermediate member 12, is determined to be larger than the average attachment radius ri of the first and second inner springs SP11 and SP12 corresponding to the first intermediate member 12. That is, the first and second outer springs SP11 and SP12 which have a spring constant (rigidity) that is larger than that of the first and second inner springs SP21 and SP22 are disposed on the outer side, in the radial direction of the damper device 10, with respect to the first and second inner springs SP21 and SP22. Consequently, it is possible to increase the torsional angle (stroke) of the first and second outer springs SP21 and SP22 with a high rigidity, and the rigidity of the first and second outer springs SP21 and SP22 can be lowered while allowing transfer of large torque to the drive member 11. As a result, it is possible to reduce the equivalent rigidity keq of the damper device 10, and to further shift resonance of the entire vibration system including the damper device 10, that is, resonance due to vibration of the entire damper device 10 and the drive shaft of the vehicle (resonance due to vibration generated between the drive member and the drive shaft), to the low-rotation side (low-frequency side). Thus, the vibration damping performance of the damper device 10 can be improved extremely well by bringing the frequency of the antiresonance point A described above closer to the frequency of resonance of the entire vibration system.

Furthermore, in the damper device 10 according to the present embodiment, the first intermediate member 12 (the annular member 121 alone, or the annular member 121 and the coupling member 122) is configured such that the moment of inertia $J_{21}$ is larger than the moment of inertia $J_{22}$ of the second intermediate member 14, and further coupled so as to rotate together with the turbine runner 5. Consequently, it is possible to further lower the vibration level around the antiresonance point A by further reducing the natural frequency $f_{21}$ on the low-frequency side. In addition, by coupling the first intermediate member 12 so as to rotate together with the turbine runner 5, the substantial moment of inertia $J_{21}$ of the first intermediate member 12 (the total of the moments of inertia of the first intermediate member 12, the turbine runner 5, etc.) can be increased. Consequently, it is possible to set the resonance point of the first intermediate member 12 on the low-rotation side (low-frequency side) by further reducing the natural frequency $f_{21}$ on the low-frequency side.

In the damper device 10 described above, the spring constant $K_{21}$ of the first outer springs SP21 is larger than the spring constant $K_{22}$ of the second outer springs SP22 ($k_{22} < k_{21}$). However, the disclosure is not limited thereto. That is, in order to make it easy to design the damper device 10, the specifications such as the spring constant $K_{21}$, the coil diameter, and the axial length of the first outer springs SP21 may be the same as the specifications such as the spring constant $K_{22}$, the coil diameter, and the axial length of the second outer springs SP22 ($k_{22}=k_2$).

In the damper device 10, further, the spring constant $k_m$ of the intermediate springs SPm may be determined to be smaller than the spring constants $k_{11}$, $k_{12}$, $k_{21}$, and $k_{22}$ of the first and second inner springs SP11 and SP12 and the first and second outer springs SP21 and SP22. That is, as discussed above, the natural frequency $f_{21}$ on the low-rotation side (low-frequency side) and the frequency fa of the antiresonance point A are lower as the synthetic spring constant $k_5$ of the intermediate springs SPm is smaller (see FIG. 10). Thus, by making the spring constant (rigidity) $k_m$ of the intermediate springs SPm smaller than the spring constants $k_{11}$, $k_{12}$, $k_{21}$, and $k_{22}$, the natural frequency $f_{21}$ and the frequency fa can be made much lower. Adopting such a configuration also makes it possible to set the start point of a rotational speed band in which one of vibration transferred from the second inner springs SP12 to the driven member 16 and vibration transferred from the second outer springs SP22 to the driven member 16 is used to cancel out at least a part of the other on the lower-rotation side. By setting the start point of such a rotational speed band on the low-rotation side, additionally, the rotational speed (frequency) at which the phase of vibration transferred from the second inner springs SP12 to the driven member 16 and the phase of vibration transferred from the second outer springs SP22 to the driven member 16 are shifted by 180 degrees from each other can also be set to the low-rotation side (low-frequency side). In this case, the spring constants $k_{11}$, $k_{12}$, $k_{21}$, and $k_{22}$ of the first and second inner springs SP11 and SP12 and the first and second outer springs SP21 and SP22 preferably meet at least the relations $k_{11} \neq k_{21}$ and $k_{11}/k_{21} \neq k_{12}/k_{22}$.

In the damper device 10, in addition, the spring constant $k_m$ of the intermediate springs SPm may be determined to be larger than the spring constants $k_{11}$, $k_{12}$, $k_{21}$, and $k_{22}$ of the first and second inner springs SP11 and SP12 and the first and second outer springs SP21 and SP22. That is, as discussed above, the difference (fa-$f_{21}$) between the natural frequency $f_{21}$ on the low-rotation side (low-frequency side) and the frequency fa of the antiresonance point A is larger as the synthetic spring constant $k_5$ of the intermediate springs SPm is larger (see FIG. 10). Thus, by making the spring constant (rigidity) $k_m$ of the intermediate springs SPm larger than the spring constants $k_{11}$, $k_{12}$, $k_{21}$, and $k_{22}$ and thus increasing the difference from the difference (fa-$f_{21}$) between the natural frequency $f_{21}$ and the frequency fa, it is possible to widen the rotational speed band in which one of vibration transferred from the second inner springs SP12 to the driven member 16 and vibration transferred from the second outer springs SP22 to the driven member 16 is used to cancel out at least a part of the other, that is, a range in which the vibration level of the driven member 16 may be lowered well.

In this case, the spring constants $k_{11}$, $k_{12}$, $k_{21}$, and $k_{22}$ of the first and second inner springs SP11 and SP12 and the first and second outer springs SP21 and SP22 are preferably adjusted such that the natural frequency $f_{21}$ and the frequency fa of the antiresonance point A are reduced and the difference (fa-$f_{21}$) therebetween is increased. From the viewpoint of ease of setting the values of the spring constants $k_{11}$, $k_{12}$, $k_{21}$, and $k_{22}$ for further reducing the natural frequency $f_{21}$ and the frequency fa of the antiresonance point A, such a configuration is advantageously applied to a damper device for which maximum torque input to the drive member 11 is relatively small and the required equivalent rigidity keq is relatively low. In this case as well, the spring constants $k_{11}$, $k_{12}$, $k_{21}$, and $k_{22}$ of the first and second inner springs SP11 and SP12 and the first and second outer springs SP21 and SP22 preferably meet at least the relations $k_{11} \neq k_{21}$ and $k_{11}/k_{21} \neq k_{12}/k_{22}$.

Furthermore, the damper device 10 may further include at least one torque transfer path provided in parallel with the first and second torque transfer paths P1 and P2, for example, in addition to the first, second, and third torque transfer paths P1, P2, and P3. Furthermore, at least one of the first and second torque transfer paths P1 and P2, for example, of the damper device 10 may be additionally provided with at least one set of an intermediate member and springs (elastic bodies).

In the starting device 1, in addition, in the case where slip control is executed, in which the actual slip speed (actual rotational speed difference) between the engine EG and the input shaft (drive member 11) of the transmission TM is caused to coincide with a target slip speed is executed, the frequency fa of the antiresonance point A described above may be caused to coincide with a frequency fs of shudder generated when the slip control, or may be set to a value that is close to the frequency fs of the shudder. Consequently, it is possible to reduce shudder generated when the slip control is executed. If the moment of inertia of the lock-up piston 80 and the drive member 11 which rotate together with each other is defined as "$J_{pd}$", the frequency fs of the shudder can be represented as $fs = \frac{1}{2}\pi \cdot \sqrt{(k_{eq}/J_{pd})}$ using the moment of inertia $J_{pd}$ and the equivalent rigidity $k_{eq}$ of the damper device 10.

In the damper device 10 described above, further, the intermediate springs SPm are disposed side by side with the first and second outer springs SP21 and SP22 along the circumferential direction of the damper device 10. However, the disclosure is not limited thereto. That is, in the damper device 10, the intermediate springs SPm may be disposed between the first and second outer springs SP21 and SP22 and the first and second inner springs SP11 and SP12 in the radial direction of the damper device 10. Consequently, it is possible to further increase the torsional angle (stroke) of the first and second outer springs SP21 and SP22.

Figure 12:
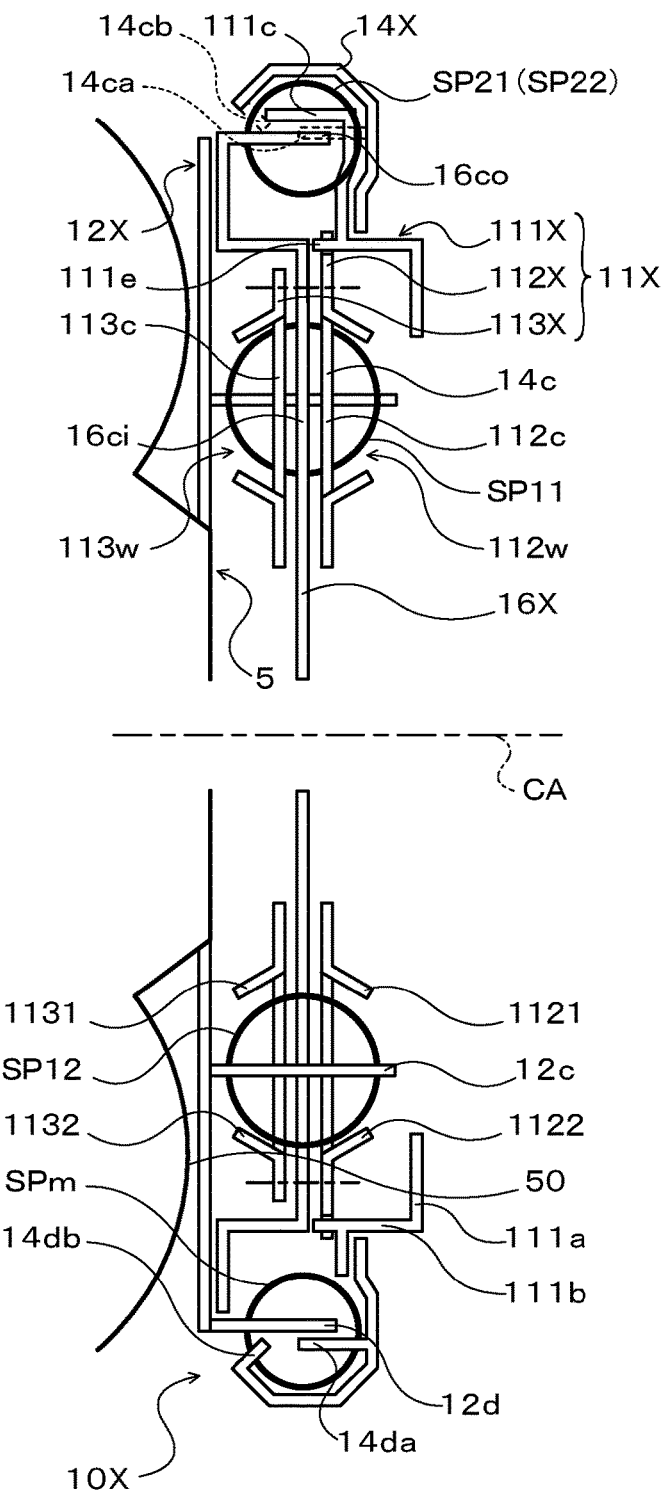
FIG. 12 is a sectional view illustrating another damper device according to the present disclosure.

FIG. 12 is a sectional view illustrating another damper device 10X according to the present disclosure. Constituent elements of the damper device 10X that are identical to the elements of the damper device 10 discussed above are given the same numerals to omit redundant descriptions.

As illustrated in FIG. 12, a drive member 11X of the damper device 10X includes: an annular first plate member (first input member) 111X fixed to the lock-up piston of the lock-up clutch; an annular second plate member (second input member) 112X rotatably supported (aligned) by the damper hub, for example, and coupled so as to rotate together with the first plate member 111X; and an annular third plate member (third input member) 113X disposed in more proximity to the turbine runner 5 than the second plate member 112X and coupled (fixed) to the second plate member 112X via a plurality of rivets. Consequently, the drive member 11X, that is, the first, second, and third plate members 111X, 112X, and 113X, rotates together with the lock-up piston, and the front cover (engine) and the drive member 11X of the damper device 10X are coupled to each other through engagement of the lock-up clutch. In the case where the lock-up clutch is a hydraulic multi-plate clutch, the first plate member 111X may be constituted as a clutch drum of the lock-up clutch.

As illustrated in FIG. 12, the first plate member 111X has: an annular fixed portion 111a fixed to the lock-up piston; a tubular portion 111b that extends in the axial direction from the outer peripheral portion of the fixed portion 111a; a plurality of (e.g. four) spring abutment portions (outer abutment portions) 111c that extend radially outward at intervals (equal intervals) in the circumferential direction from the free end portion of the tubular portion 111b and that extend in the axial direction away from the fixed portion 111a; and a plurality of engagement projecting portions 111e that extend in the axial direction from the free end portion of the tubular portion 111b at intervals in the circumferential direction.

The second plate member 112X is constituted as an annular plate-like member, and has: a plurality of (e.g. three) spring housing windows 112w that extend arcuately and that are disposed at intervals (equal intervals) in the circumferential direction; a plurality of (e.g. three) spring support portions 1121 that extend along the inner peripheral edges of the respective spring housing windows 112w and that are arranged at intervals (equal intervals) in the circumferential direction; a plurality of (e.g. three) spring support portions 1122 that extend along the outer peripheral edges of the respective spring housing windows 112w and that are arranged at intervals (equal intervals) in the circumferential direction to face the respective spring support portions 1121 in the radial direction of the second plate member 112X; and a plurality of (e.g. three) spring abutment portions (inner abutment portions) 112c. The plurality of spring abutment portions 112c are provided such that each spring abutment portion 112c is interposed between the spring housing windows 112w (spring support portions 1121 and 1122) which are adjacent to each other along the circumferential direction. Furthermore, a plurality of engagement recessed portions are formed at the outer peripheral portion of the second plate member 112X at intervals in the circumferential direction. The engagement recessed portions are fitted with the respective engagement projecting portions 111e of the first plate member 111X with backlash in the radial direction. The first and second plate members 111X and 112X are relatively movable in the radial direction with the engagement projecting portions 111e fitted with the engagement recessed portions.

The third plate member 113X is also constituted as an annular plate-like member. The third plate member 113X has: a plurality of (e.g. three) spring housing windows 113w that extend arcuately and that are disposed at intervals (equal intervals) in the circumferential direction; a plurality of (e.g. three) spring support portions 1131 that extend along the inner peripheral edges of the respective spring housing windows 113w and that are arranged at intervals (equal intervals) in the circumferential direction; a plurality of (e.g. three) spring support portions 1132 that extend along the outer peripheral edges of the respective spring housing windows and that are arranged at intervals (equal intervals) in the circumferential direction to face the respective spring support portions 1131 in the radial direction of the third plate member 113X; and a plurality of (e.g. three) spring abutment portions (third abutment portions) 113c. The plurality of spring abutment portions 113c are provided such that each spring abutment portion 113c is interposed between the spring support portions 1131 and 1132 (spring housing windows) which are adjacent to each other along the circumferential direction.

A first intermediate member 12X of the damper device 10X is an annular member fixed to the turbine hub via a plurality of rivets, for example, and coupled so as to rotate together with the turbine runner 5. As illustrated in FIG. 12, the first intermediate member 12X has: a plurality of (e.g. three) spring abutment portions 12c that extend in the axial direction from the inner peripheral portion at intervals (equal intervals) in the circumferential direction; and a plurality of (e.g. four) second spring abutment portions 12d that extend in the axial direction from the outer peripheral portion at intervals in the circumferential direction. The second spring abutment portions 12d are formed symmetrically with respect to the axis of the first intermediate member 12X such that two (a pair of) second spring abutment portions 12d are proximate to each other. The two second spring abutment portions 12d which are paired with each other are arranged in the circumferential direction at an interval that matches the natural length of the intermediate spring SPm, for example.

A second intermediate member 14X of the damper device 10X is formed in an annular shape so as to support (guide) the outer peripheral portions of the first and second outer springs SP21 and SP22 and the intermediate springs SPm, the side portions (right side portions in FIG. 12) of such springs on the lock-up piston side (engine EG side), and the outer peripheral side of the side portions of such springs on the turbine runner 5 side (transmission TM side). The second intermediate member 14X is rotatably supported (aligned) by the tubular portion 111b of the first plate member 111X of the drive member 11X, and disposed in the outer peripheral region in the fluid transmission chamber 9. The second intermediate member 14X has a natural frequency that is higher than that of the first intermediate member 12X and a moment of inertia that is smaller than that of the first intermediate member 12X.

In addition, the second intermediate member 14X has: a plurality of (e.g. two at intervals of 180°) spring abutment portions 14ca disposed at intervals in the circumferential direction; and a plurality of (e.g. two at intervals of 180°) spring abutment portions 14cb disposed at intervals in the circumferential direction. As illustrated in FIG. 12, the spring abutment portions 14ca extend in the axial direction from a side portion of the second intermediate member 14X on the lock-up piston side (right side in FIG. 12) toward the turbine runner 5. The spring abutment portions 14cb extend obliquely inward from the peripheral edge portion of the second intermediate member 14X on the turbine runner 5 side so as to face the respective spring abutment portions 14ca in the axial direction.

The second intermediate member 14X further has: a plurality of (e.g. four) second spring abutment portions 14da that extend in the axial direction toward the turbine runner 5 from portions of the side portion on the lock-up piston side located between the spring abutment portions 14ca, which are adjacent to each other, in the circumferential direction; and a plurality of (e.g. four) second spring abutment portions 14db that extend obliquely inward from portions of the peripheral edge portion on the turbine runner 5 side located between the spring abutment portions 14cb, which are adjacent to each other, in the circumferential direction. The second spring abutment portions 14da are formed symmetrically with respect to the axis of the second intermediate member 14X such that two (a pair of) second spring abutment portions 14da are proximate to each other. The two second spring abutment portions 14da which are paired with each other are arranged in the circumferential direction at an interval that matches the natural length of the intermediate spring SPm, for example. The second spring abutment portions 14db are formed symmetrically with respect to the axis of the second intermediate member 14X such that two (a pair of) second spring abutment portions 14db are proximate to each other. The two second spring abutment portions 14db which are paired with each other are arranged in the circumferential direction at an interval that matches the natural length of the intermediate spring SPm, for example, so as to face the associated two second spring abutment portions 14da in the axial direction.

A driven member 16X of the damper device 10X is constituted as an annular plate-like member. As illustrated in FIG. 12, the driven member 16X is disposed between the second plate member 112X and the third plate member 113X of the drive member 11X in the axial direction, and fixed to the damper hub via rivets. The driven member 16 has: a plurality of (e.g. three) spring housing windows that extend arcuately and that are disposed at intervals (equal intervals) in the circumferential direction; a plurality of (e.g. three) inner spring abutment portions (inner abutment portions) 16ci formed at intervals (equal intervals) in the circumferential direction in proximity to the inner peripheral edge of the driven member 16; and a plurality of (e.g. four) outer spring abutment portions (outer abutment portions) 16co that are arranged at intervals in the circumferential direction on the radially outer side with respect to the plurality of inner spring abutment portions 16ci and that extend in the axial direction from the turbine runner 5 side toward the lock-up piston 80. The plurality of inner spring abutment portions 16ci are provided such that each inner spring abutment portion 16ci is interposed between the spring housing windows which are adjacent to each other along the circumferential direction.

The first and second inner springs SP11 and SP12 are supported by the associated spring support portions 1121, 1122, 1131, and 1132 of the drive member 11X, that is, the second and third plate members 112X and 113X, such that one first inner spring SP11 and one second inner spring SP12 are paired (act in series with each other) and such that the first and second inner springs SP11 and SP12 are arranged alternately in the circumferential direction (circumferential direction of the annular member 121). Furthermore, with the damper device 10X in the attached state, the spring abutment portions 112c of the second plate member 112X are each provided between the first and second inner springs SP11 and SP12, which are disposed in the spring housing windows 112w which are different from each other and which are not paired (do not act in series with each other), to abut against the end portions of such first and second inner springs SP11 and SP12 in the circumferential direction. Similarly, with the damper device 10X in the attached state, the spring abutment portions 113c of the third plate member 113X are also provided between the first and second inner springs SP11 and SP12, which are disposed in the spring housing windows 113w which are different from each other (not paired), to abut against the end portions of such first and second inner springs SP11 and SP12 in the circumferential direction.

In addition, the spring abutment portions 12c of the first intermediate member 12X are inserted into the respective spring housing windows 113w of the third plate member 113X from the turbine runner 5 side, and are each provided between the first and second inner springs SP11 and SP12, which are paired (act in series with each other), to abut against the end portions of such first and second inner springs SP11 and SP12 in the circumferential direction. Furthermore, with the damper device 10X in the attached state, as with the spring abutment portions 112c and 113c of the drive member 11X, the inner spring abutment portions 16ci of the driven member 16X are each provided between the first and second inner springs SP11 and SP12, which are not paired (do not act in series with each other), to abut against the end portions of such first and second inner springs SP11 and SP12 in the circumferential direction.

Meanwhile, the first and second outer springs SP21 and SP22 are supported by the second intermediate member 14X such that one first outer spring SP21 and one second outer spring SP22 are paired (act in series with each other), and such that the first and second outer springs SP21 and SP22 are arranged alternately along the circumferential direction of the second intermediate member 14X. In addition, with the damper device 10X in the attached state, the spring abutment portions 111c of the first plate member 111X of the drive member 11X are each provided between the first and second outer springs SP21 and SP22, which are not paired (do not act in series with each other), to abut against the end portions of such first and second outer springs SP21 and SP22 in the circumferential direction. Furthermore, each spring abutment portion 14ca and each spring abutment portion 14cb of the second intermediate member 14X are provided between the first and second outer springs SP21 and SP22, which are paired with each other (act in series with each other), to abut against the end portions of such first and second outer springs SP21 and SP22 in the circumferential direction. In addition, as with the spring abutment portions 111c of the drive member 11X, the outer spring abutment portions 16co of the driven member 16X are each provided between the first and second outer springs SP21 and SP22, which are not paired (do not act in series with each other), to abut against the end portions of such first and second outer springs SP21 and SP22 in the circumferential direction.

The intermediate springs SPm are supported by the second intermediate member 14X so as to be arranged side by side with the first outer springs SP21 and the second outer springs SP22 along the circumferential direction. With the damper device 10X in the attached state, each intermediate spring SPm is supported from both sides in the circumferential direction by the pair of second spring abutment portions 12d of the first intermediate member 12X, and supported from both sides in the circumferential direction by the pair of second spring abutment portions 14da and the pair of second spring abutment portions 14db of the second intermediate member 14X. Consequently, the first intermediate member 12X and the second intermediate member 14X are coupled to each other via the plurality of intermediate springs SPm. Spring seats may be disposed between the end portions of the intermediate springs SPm and the second spring abutment portions 12d, 14da, and 14db.

In the damper device 10X configured as discussed above, the average attachment radius ro of the first and second outer springs SP21 and SP22 corresponding to the second intermediate member 14X, which has a natural frequency that is higher than that of the first intermediate member 12X, is larger than the average attachment radius ri of the first and second inner springs SP11 and SP12 corresponding to the first intermediate member 12. That is, the axes of the first and second outer springs SP21 and SP22 are positioned on the outer side in the radial direction of the damper device 10X with respect to the axes of the first and second inner springs SP11 and SP12. In the damper device 10X as well, further, the first and second outer springs SP21 and SP22 are disposed such that the entire first and second outer springs SP21 and SP22 are positioned on the radially outer side with respect to the first and second inner springs SP11 and SP12. Consequently, it is possible to increase the torsional angle (stroke) of the first and second outer springs SP21 and SP22 with a high rigidity, and the rigidity of the first and second outer springs SP21 and SP22 can be lowered while allowing transfer of large torque to the drive member 11X. As a result, it is possible to reduce the equivalent rigidity keq of the damper device 10X, and to further shift resonance of the entire vibration system including the damper device 10X to the low-rotation side (low-frequency side). Thus, the vibration damping performance of the damper device 10X can also be improved extremely well by bringing the frequency of the antiresonance point A described above closer to the frequency of resonance of the entire vibration system.

In addition, by causing the second intermediate member 14X to support the first and second outer springs SP21 and SP22, it is possible to reduce the relative speed between the first and second outer springs SP21 and SP22, which are deflected in accordance with the torsional angle of the second intermediate member 14X with respect to the drive member 11X or the driven member 16X, and the second intermediate member 14X. Thus, a friction force generated between the second intermediate member 14X and the first and second outer springs SP21 and SP22 can be reduced. Thus, it is possible to lower the hysteresis of the entire damper device 10X. The first intermediate member 12X of the damper device 10X further has the plurality of spring abutment portions 12c which are fixed to the turbine runner 5 and which are each provided between the first and second inner springs SP11 and SP12, which are adjacent to each other, to abut against the end portions of such first and second inner springs SP11 and SP12 in the circumferential direction. Consequently, it is possible to couple the first intermediate member 12X to both the first and second inner springs SP11 and SP12, which are disposed on the radially inner side, and to couple the first intermediate member 12X to the turbine runner 5 while suppressing an increase in the axial length of the damper device 10X.

Figure 13:
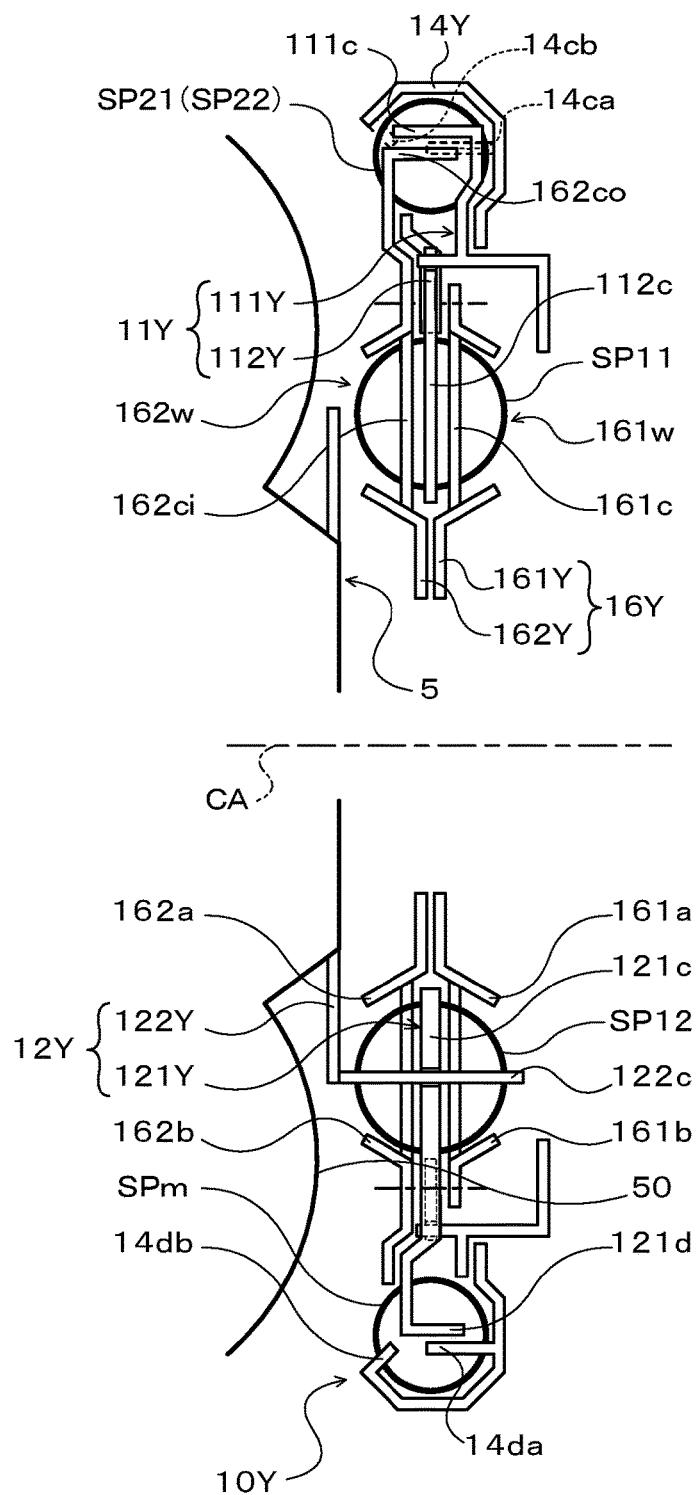
FIG. 13 is a sectional view illustrating still another damper device according to the present disclosure.

FIG. 13 is a sectional view illustrating still another damper device 10Y according to the present disclosure. Constituent elements of the damper device 10Y that are identical to the elements of the damper devices 10 and 10X discussed above are given the same numerals to omit redundant descriptions.

A drive member 11Y of the damper device 10Y illustrated in FIG. 13 includes: a first plate member 111Y (first input member) that has a structure similar to that of the first plate member 111X discussed above; and an annular second plate member (second input member) 112Y coupled so as to rotate together with the first plate member 111Y. The first plate member 111Y has spring abutment portions (outer abutment portions) 111c that abut against the end portions of the first outer springs SP21 in the circumferential direction. Meanwhile, the second plate member 112Y has a plurality of (e.g. three) spring housing windows and a plurality of (e.g. three) spring abutment portions 112c. The plurality of spring abutment portions 112c are provided such that each spring abutment portion 112c is interposed between the spring housing windows which are adjacent to each other along the circumferential direction. The first and second plate members 111Y and 112Y are coupled to each other via fitting portions configured similarly to those of the first plate member 111X and the second plate member 112X discussed above.

A first intermediate member 12Y of the damper device 10Y has an annular member 121Y and a coupling member 122Y configured similarly to those of the first intermediate member 12 of the damper device 10 described above. A second intermediate member 14Y of the damper device 10Y is configured similarly to the first intermediate member 12X of the damper device 10X described above. The second intermediate member 14Y is rotatably supported (aligned) by the first plate member 111Y of the drive member 11Y, and supports the plurality of first outer springs SP21, second outer springs SP22, and intermediate springs SPm so as to be arranged side by side along the circumferential direction. The second intermediate member 14Y has a natural frequency that is higher than that of the first intermediate member 12Y and a moment of inertia that is smaller than that of the first intermediate member 12Y.

A driven member 16Y of the damper device 10Y includes: a first output plate (first output member) 161Y; and an annular second output plate (second output member) 162Y disposed in more proximity to the turbine runner 5 than the first output plate 161Y and coupled (fixed) to the first output plate 161Y via a plurality of rivets. The first output plate 161Y is constituted as an annular plate-like member, and has: a plurality of (e.g. three) spring housing windows 161w disposed at intervals (equal intervals) in the circumferential direction; a plurality of (e.g. three) spring support portions 161a that extend along the inner peripheral edges of the respective spring housing windows 161w; a plurality of (e.g. three) spring support portions 161b that extend along the outer peripheral edges of the respective spring housing windows 161w; and a plurality of (e.g. three) spring abutment portions 161c. The plurality of spring abutment portions 161c are provided such that each spring abutment portion 161c is interposed between the spring housing windows 161w (spring support portions 161a and 161b) which are adjacent to each other along the circumferential direction.

The second output plate 162Y of the driven member 16Y is constituted as an annular plate-like member, and has: a plurality of (e.g. three) spring housing windows 162w disposed at intervals (equal intervals) in the circumferential direction; a plurality of (e.g. three) spring support portions 162a that extend along the inner peripheral edges of the respective spring housing windows 162w; a plurality of (e.g. three) spring support portions 162b that extend along the outer peripheral edges of the respective spring housing windows 162w; a plurality of (e.g. three) inner spring abutment portions 162ci; and a plurality of (e.g. four) outer spring abutment portions 162co. The plurality of outer spring abutment portions 162co are arranged at intervals in the circumferential direction on the radially outer side with respect to the plurality of inner spring abutment portions 162ci.

The first and second inner springs SP11 and SP12 are supported by the associated spring support portions 161a, 161b, 162a, and 162b of the driven member 16Y, that is, the first and second output plates 161Y and 162Y, such that one first inner spring SP11 and one second inner spring SP12 are paired (act in series with each other) and such that the first and second inner springs SP11 and SP12 are arranged alternately in the circumferential direction (circumferential direction of the annular member 121). In addition, with the damper device 10Y in the attached state, the spring abutment portions 112c of the second plate member 112Y of the drive member 11Y are each provided between the first and second inner springs SP11 and SP12, which are not paired (do not act in series with each other), to abut against the end portions of such first and second inner springs SP11 and SP12 in the circumferential direction. Furthermore, each spring abutment portion 121c and each spring abutment portion 122c of the first intermediate member 12Y are provided between the first and second inner springs SP11 and SP12, which are paired with each other (act in series with each other), to abut against the end portions of such first and second inner springs SP11 and SP12 in the circumferential direction. In addition, with the damper device 10 in the attached state, as with the spring abutment portions 112c of the drive member 11Y, each spring abutment portions 161c and each inner spring abutment portions 162ci of the driven member 16Y are provided between the first and second inner springs SP11 and SP12, which are not paired (do not act in series with each other), to abut against the end portions of such first and second inner springs SP11 and SP12 in the circumferential direction.

Meanwhile, the first and second outer springs SP21 and SP22 are supported by the second intermediate member 14Y such that one first outer spring SP21 and one second outer spring SP22 are paired (act in series with each other), and such that the first and second outer springs SP21 and SP22 are arranged alternately along the circumferential direction of the second intermediate member 14Y. In addition, with the damper device 10 in the attached state, the spring abutment portions 111c of the first plate member 111Y of the drive member 11Y are each provided between the first and second outer springs SP21 and SP22, which are not paired (do not act in series with each other), to abut against the end portions of such first and second outer springs SP21 and SP22 in the circumferential direction. Furthermore, each spring abutment portion 14ca and each spring abutment portion 14cb of the second intermediate member 14Y are provided between the first and second outer springs SP21 and SP22, which are paired with each other (act in series with each other), to abut against the end portions of such first and second outer springs SP21 and SP22 in the circumferential direction. In addition, as with the spring abutment portions 111c of the drive member 11Y, the outer spring abutment portions 162co of the driven member 16Y are each provided between the first and second outer springs SP21 and SP22, which are not paired (do not act in series with each other), to abut against the end portions of such first and second outer springs SP21 and SP22 in the circumferential direction.

The intermediate springs SPm are supported by the second intermediate member 14Y so as to be arranged side by side with the first outer springs SP21 and the second outer springs SP22 along the circumferential direction. With the damper device 10 in the attached state, each intermediate spring SPm is supported from both sides in the circumferential direction by the pair of second spring abutment portions 121d of the first intermediate member 12Y, and supported from both sides in the circumferential direction by the pair of second spring abutment portions 14da and the pair of second spring abutment portions 14db of the second intermediate member 14Y. Consequently, the first intermediate member 12Y and the second intermediate member 14Y are coupled to each other via the plurality of intermediate springs SPm. Spring seats may be disposed between the end portions of the intermediate springs SPm and the second spring abutment portions 121d, 14da, and 14db.

In the damper device 10Y configured as discussed above, the average attachment radius ro of the first and second outer springs SP21 and SP22 corresponding to the second intermediate member 14Y, which has a natural frequency that is higher than that of the first intermediate member 12Y, is larger than the average attachment radius ri of the first and second inner springs SP11 and SP12 corresponding to the first intermediate member 12. That is, the axes of the first and second outer springs SP21 and SP22 are positioned on the outer side in the radial direction of the damper device 10Y with respect to the axes of the first and second inner springs SP11 and SP12. In the damper device 10Y as well, further, the first and second outer springs SP21 and S22 are disposed such that the entire first and second outer springs SP21 and S22 are positioned on the radially outer side with respect to the first and second inner springs SP11 and SP12. Consequently, it is possible to increase the torsional angle (stroke) of the first and second outer springs SP21 and SP22 with a high rigidity, and the rigidity of the first and second outer springs SP21 and SP22 can be lowered while allowing transfer of large torque to the drive member 11Y. As a result, it is possible to reduce the equivalent rigidity keq of the damper device 10Y, and to further shift resonance of the entire vibration system including the damper device 10Y to the low-rotation side (low-frequency side). Thus, the vibration damping performance of the damper device 10Y can also be improved extremely well by bringing the frequency of the antiresonance point A described above closer to the frequency of resonance of the entire vibration system.

In addition, by causing the second intermediate member 14Y to support the first and second outer springs SP21 and SP22, it is possible to reduce the relative speed between the first and second outer springs SP21 and SP22, which are deflected in accordance with the torsional angle of the second intermediate member 14Y with respect to the drive member 11Y or the driven member 16Y, and the second intermediate member 14Y. Thus, a friction force generated between the second intermediate member 14Y and the first and second outer springs SP21 and SP22 can be reduced. Thus, it is possible to lower the hysteresis of the entire damper device 10Y. The first intermediate member 12Y of the damper device 10Y further includes the coupling member 122Y which has the spring abutment portions 122c fixed to the turbine runner 5 and which are each provided between the first and second inner springs SP11 and SP12, which are adjacent to each other, to abut against the end portions of such first and second inner springs SP11 and SP12 in the circumferential direction. Consequently, it is possible to couple the first intermediate member 12Y to both the first and second inner springs SP11 and SP12, which are disposed on the radially inner side, and to couple the first intermediate member 12Y to the turbine runner 5 while suppressing an increase in the axial length of the damper device 10Y.

Figure 14:
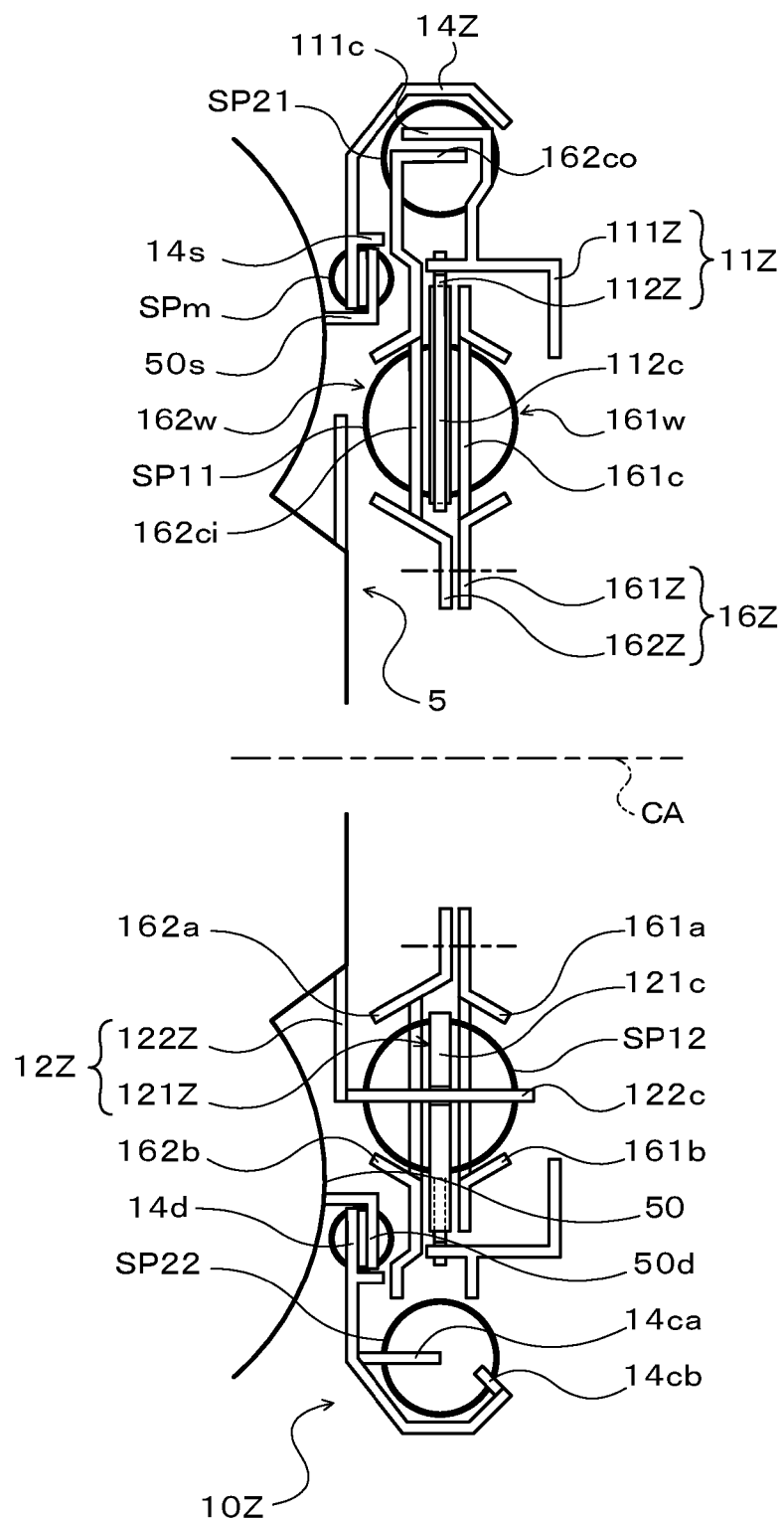
FIG. 14 is a sectional view illustrating another damper device according to the present disclosure.

FIG. 14 is a sectional view illustrating another damper device 10Z according to the present disclosure. Constituent elements of the damper device 10Y that are identical to the elements of the damper devices 10 to 10Y discussed above are given the same numerals to omit redundant descriptions.

A drive member 11Z of the damper device 10Z illustrated in FIG. 14 is basically identical to the drive member 11Y of the damper device 10Y illustrated in FIG. 13, and includes first and second plate members 111Z and 112Z. Furthermore, a driven member 16Z is basically identical to the driven member 16Y of the damper device 10Y, and includes first and second output plates 161Z and 162Z. In addition, a coupling member 122Z of a first intermediate member 12Z is basically identical to the coupling member 122Y of the damper device 10Y. In contrast, an annular member 121Z of the first intermediate member 12Z differs from the annular member 121Y of the damper device 10Y in not having the second spring abutment portions 121d. Furthermore, a second intermediate member 14Z of the damper device 10Z is rotatably supported (aligned) by the turbine runner 5, and supports the plurality of first outer springs SP21 and second outer springs SP22 so as to be arranged side by side along the circumferential direction. The second intermediate member 14X also has a natural frequency that is higher than that of the first intermediate member 12Z and a moment of inertia that is smaller than that of the first intermediate member 12Z.

An annular support portion 50s is fixed to the turbine shell 50 of the turbine runner 5 so as to be positioned between the first and second inner springs SP11 and SP12 and the first and second outer springs SP21 and SP22 in the radial direction of the damper device 10Z. A plurality of (e.g. four) spring abutment portions 50d extend in the radial direction from the support portion 50s at intervals in the circumferential direction. The spring abutment portions 50d are formed symmetrically with respect to the axis of the turbine runner 5 such that two (a pair of) spring abutment portions 50d are proximate to each other. The two spring abutment portions 50d which are paired with each other are arranged in the circumferential direction at an interval that matches the natural length of the intermediate spring SPm, for example. In addition, the second intermediate member 14Z is formed with a supported portion 14s supported by the support portion 50s in the radial direction. Furthermore, a plurality of (e.g. four) second spring abutment portions 14d extend in the radial direction from the second intermediate member 14Z at intervals in the circumferential direction. The second spring abutment portions 14d are formed symmetrically with respect to the axis of the turbine runner 5 such that two (a pair of) second spring abutment portions 14d are proximate to each other. The two second spring abutment portions 14d which are paired with each other are arranged in the circumferential direction at an interval that matches the natural length of the intermediate spring SPm, for example.

The plurality of intermediate springs SPm are supported in the radial direction by the support portion 50s of the turbine runner 5. With the damper device 10Z in the attached state, in addition, each intermediate spring SPm is supported from both sides in the circumferential direction by the pair of spring abutment portions 50d of the turbine runner 5, and supported from both sides in the circumferential direction by the pair of second spring abutment portions 14d of the second intermediate member 14Z. Consequently, the first intermediate member 12Z which rotates together with the turbine runner 5 and the second intermediate member 14Z are coupled to each other via the plurality of intermediate springs SPm. The intermediate springs SPm are disposed between the first and second outer springs SP21 and SP22 and the first and second inner springs SP11 and SP12 in the radial direction of the damper device 10Z. In the damper device 10Z, in addition, the intermediate springs SPm partially overlap at least one of the first and second outer springs SP21 and SP22 and at least one of the first and second inner springs SP11 and SP12 in the axial direction as seen in the radial direction of the damper device 10Z. Spring seats may be disposed between the end portions of the intermediate springs SPm and the spring abutment portions 50d and the second spring abutment portions 14d.

In the damper device 10Z configured as discussed above, the average attachment radius ro of the first and second outer springs SP21 and SP22 corresponding to the second intermediate member 14Z, which has a natural frequency that is higher than that of the first intermediate member 12Z, is larger than the average attachment radius ri of the first and second inner springs SP11 and SP12 corresponding to the first intermediate member 12. That is, the axes of the first and second outer springs SP21 and SP22 are positioned on the outer side in the radial direction of the damper device 10Z with respect to the axes of the first and second inner springs SP11 and SP12. In the damper device 10Z as well, further, the first and second outer springs SP21 and SP22 are disposed such that the entire first and second outer springs SP21 and SP22 are positioned on the radially outer side with respect to the first and second inner springs SP11 and SP12. Consequently, it is possible to increase the torsional angle (stroke) of the first and second outer springs SP21 and SP22 with a high rigidity, and the rigidity of the first and second outer springs SP21 and SP22 can be lowered while allowing transfer of large torque to the drive member 11Z. As a result, it is possible to reduce the equivalent rigidity keq of the damper device 10Z, and to further shift resonance of the entire vibration system including the damper device 10Z to the low-rotation side (low-frequency side). Thus, the vibration damping performance of the damper device 10Z can also be improved extremely well by bringing the frequency of the antiresonance point A described above closer to the frequency of resonance of the entire vibration system.

In addition, by causing the second intermediate member 14Z to support the first and second outer springs SP21 and SP22, it is possible to reduce the relative speed between the first and second outer springs SP21 and SP22, which are deflected in accordance with the torsional angle of the second intermediate member 14Z with respect to the drive member 11Z or the driven member 16Z, and the second intermediate member 14Z. Thus, a friction force generated between the second intermediate member 14Z and the first and second outer springs SP21 and SP22 can be reduced. Thus, it is possible to lower the hysteresis of the entire damper device 10Z. Furthermore, the first intermediate member 12Z of the damper device 10Z also includes the coupling member 122Z which has the spring abutment portions 122c which are fixed to the turbine runner 5 and which are each provided between the first and second inner springs SP11 and SP12, which are adjacent to each other, to abut against the end portions of such first and second inner springs SP11 and SP12 in the circumferential direction. Consequently, it is possible to couple the first intermediate member 12Z to both the first and second inner springs SP11 and SP12, which are disposed on the radially outer side, and to couple the first intermediate member 12Z to the turbine runner 5 while suppressing an increase in the axial length of the damper device 10Z. In addition, by disposing the intermediate springs SPm between the first and second outer springs SP21 and SP22 and the first and second inner springs SP11 and SP12 in the radial direction of the damper device 10Z, it is possible to secure the torsional angle (stroke) of the springs SP11 to SPm well.

In the damper device 10Z, the intermediate springs SPm may be supported in the radial direction by the first intermediate member 12Z (e.g. the coupling member 122). In this case, the first intermediate member 12Z may be provided with a plurality of second spring abutment portions that support the intermediate springs SPm from both sides in the circumferential direction.

Figure 15:
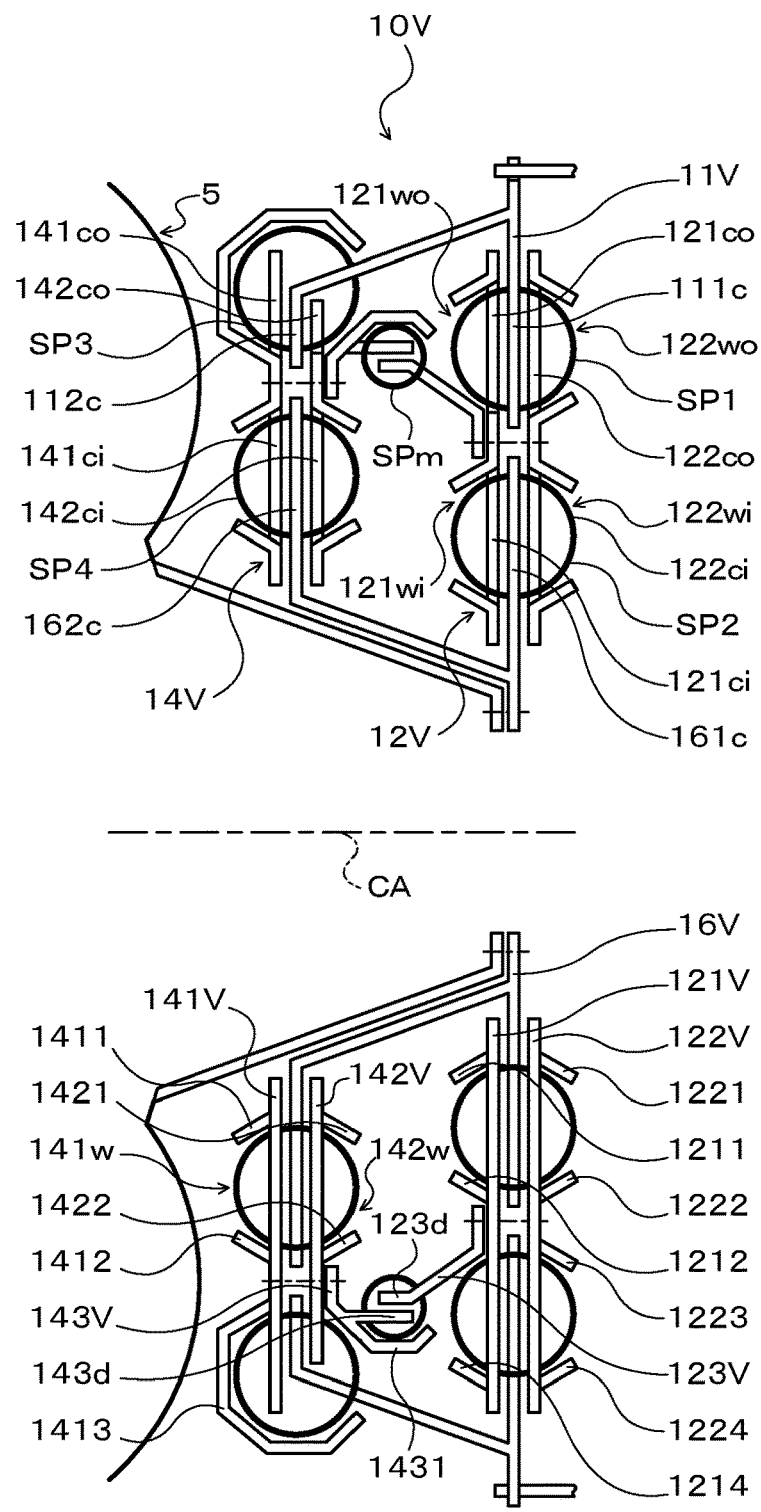
FIG. 15 is a sectional view illustrating still another damper device according to the present disclosure.

FIG. 15 is a sectional view illustrating still another damper device 10V according to the present disclosure. Constituent elements of the damper device 10V that are identical to the elements of the damper devices 10 to 10Z discussed above are given the same numerals to omit redundant descriptions.

The damper device 10V illustrated in FIG. 15 includes: a plurality of first springs (first elastic bodies) SP1 disposed between a drive member 11V and a first intermediate member 12V to transfer rotational torque; a plurality of second springs (second elastic bodies) SP2 disposed between the first intermediate member 12V and a driven member 16V to transfer rotational torque; a plurality of third springs (third elastic bodies) SP3 disposed between the drive member 11V and a second intermediate member 14V to transfer rotational torque; a plurality of fourth springs (fourth elastic bodies) SP4 disposed between the second intermediate member 14V and the driven member 16V to transfer rotational torque; and a plurality of intermediate springs (fifth elastic bodies) SPm disposed between the first intermediate member 12V and the second intermediate member 14V to transfer rotational torque.

In addition, in the damper device 10V, the rigidity, that is, the spring constant, of the first springs SP1 is defined as "$k_{11}$", the rigidity, that is, the spring constant, of the second springs SP2 is defined as "$k_{12}$", the rigidity, that is, the spring constant, of the third springs SP3 is defined as "$k_{21}$", and the rigidity, that is, the spring constant, of the fourth springs SP4 is defined as "$k_{22}$". The spring constants $k_{11}$, $k_{12}$, $k_{21}$, and $k_{22}$ are selected such that the relations $k_{11} \neq k_{21}$ and $k_{11}/k_{21} \neq k_{12}/k_{22}$ are met. The spring constants $k_{11}$, $k_{12}$, $k_{21}$, and $k_{22}$ are selected so as to meet the relations $k_{11} \neq k_{21}$ and $k_{11}/k_{21} \neq k_{12}/k_{22}$. More particularly, the spring constants $k_{11}$, $k_{12}$, $k_{21}$, and $k_{22}$ meet the relations $k_{11}/k_{21} < k_{12}/k_{22}$ and $k_{11} < k_{12} < k_{22} < k_{21}$. That is, the larger one ($k_{21}$) of the spring constants $k_{21}$ and $k_{22}$ of the third and fourth springs SP3 and SP4 is larger than the larger one ($k_{12}$) of the spring constants $k_{11}$ and $k_{12}$ of the first and second springs SP1 and SP2. When the rigidity, that is, the spring constant, of the intermediate springs SPm is defined as "$k_m$", further, the spring constants $k_{11}$, $k_{12}$, $k_{21}$, $k_{22}$, and $k_m$ meet the relation $k_{11} < k_m < k_{12} < k_{22} < k_{21}$.

The drive member 11V of the damper device 10V illustrated in FIG. 15 is coupled so as to rotate together with a lock-up piston of a single-plate lock-up clutch or a clutch drum of a multi-plate lock-up clutch, and has a plurality of first spring abutment portions 111c and a plurality of second spring abutment portions 112c. The outer peripheral portion of the drive member 11V is engaged with the lock-up piston or the clutch drum. In addition, the plurality of first spring abutment portions 111c extend inward in the radial direction of the damper device 10V from the outer peripheral portion of the drive member 11V. In the damper device 10V, further, the plurality of second spring abutment portions 112c extend in the axial direction of the damper device 10V from the outer peripheral portion of the drive member 11V toward the turbine runner 5, and extend inward in the radial direction of the damper device 10V. Consequently, the first and second spring abutment portions 111c and 112c are spaced away from each other in the axial direction of the damper device 10V.

The first intermediate member 12V of the damper device 10V includes: a first plate member 121V disposed in proximity to the second intermediate member 14V; a second plate member 122V disposed on the front cover (not illustrated) side with respect to the first plate member 121V in the axial direction of the damper device 10V; and a third plate member 123V disposed on the second intermediate member 14V side with respect to the first plate member 121V. The first to third plate members 121V, 122V, and 123V are formed in an annular shape, and coupled to each other via a plurality of rivets. As illustrated in the drawing, the first plate member 121V has a plurality of inner spring housing windows 121wi, a plurality of outer spring housing windows 121wo, a plurality of spring support portions 1211, 1212, and 1214, a plurality of inner spring abutment portions 121ci, and a plurality of outer spring abutment portions 121co.

The plurality of inner spring housing windows 121wi extend arcuately, and are disposed at intervals (equal intervals) in the circumferential direction in the inner peripheral portion of the first plate member 121V. The plurality of spring support portions 1211 extend along the inner peripheral edges of the respective inner spring housing windows 121wi, and are arranged at intervals (equal intervals) in the circumferential direction. The plurality of spring support portions 1212 extend along the outer peripheral edges of the respective inner spring housing windows 121wi, and are arranged at intervals (equal intervals) in the circumferential direction to face the respective spring support portions 1211 in the radial direction of the first plate member 121V. In addition, the inner spring abutment portions 121ci are provided such that each inner spring abutment portion 121ci is interposed between the inner spring housing windows 121wi (spring support portions 1211 and 1212) which are adjacent to each other along the circumferential direction. The plurality of outer spring housing windows 121wo extend arcuately, and are disposed at intervals in the circumferential direction in the outer peripheral portion of the first plate member 121V so as to be positioned on the radially outer side with respect to the inner spring housing windows 121wi. The plurality of spring support portions 1214 extend along the outer peripheral edges of the respective outer spring housing windows 121wo, and are arranged at intervals (equal intervals) in the circumferential direction. In addition, the outer spring abutment portions 121co are provided such that each outer spring abutment portion 121co is interposed between the outer spring housing windows 121wo (spring support portions 1214) which are adjacent to each other along the circumferential direction.

The second plate member 122V has a plurality of inner spring housing windows 122wi, a plurality of outer spring housing windows 122wo, a plurality of spring support portions 1221, 1222, 1223, and 1224, a plurality of inner spring abutment portions 122ci, and a plurality of outer spring abutment portions 122co. The plurality of inner spring housing windows 122wi extend arcuately, and are disposed at intervals (equal intervals) in the circumferential direction in the inner peripheral portion of the second plate member 122V. The plurality of spring support portions 1221 extend along the inner peripheral edges of the respective inner spring housing windows 122wi, and are arranged at intervals (equal intervals) in the circumferential direction. The plurality of spring support portions 1222 extend along the outer peripheral edges of the respective inner spring housing windows 122wi, and are arranged at intervals (equal intervals) in the circumferential direction to face the respective spring support portions 1221 in the radial direction of the second plate member 122V. In addition, the inner spring abutment portions 122ci are provided such that each inner spring abutment portion 122ci is interposed between the inner spring housing windows 122wi (spring support portions 1221 and 1222) which are adjacent to each other along the circumferential direction.

The plurality of outer spring housing windows 122wo extend arcuately, and are disposed at intervals in the circumferential direction in the outer peripheral portion of the second plate member 122V so as to be positioned on the radially outer side with respect to the inner spring housing windows 122wi. The plurality of spring support portions 1223 extend along the inner peripheral edges of the respective outer spring housing windows 122wo, and are arranged at intervals (equal intervals) in the circumferential direction. The plurality of spring support portions 1224 extend along the outer peripheral edges of the respective outer spring housing windows 122wo, and are arranged at intervals (equal intervals) in the circumferential direction to face the respective spring support portions 1223 in the radial direction of the second plate member 122V. In addition, the outer spring abutment portions 122co are provided such that each outer spring abutment portion 122co is interposed between the outer spring housing windows 122wo (spring support portions 1223 and 1224) which are adjacent to each other along the circumferential direction.

The third plate member 123V has a plurality of spring abutment portions 123d. The spring abutment portions 123d are formed symmetrically with respect to the axis of the third plate member 123V such that two (a pair of) spring abutment portions 123d are proximate to each other. The two spring abutment portions 123d which are paired with each other are arranged in the circumferential direction at an interval that matches the natural length of the intermediate spring SPm, for example. As illustrated in FIG. 15, the inner peripheral portion of the third plate member 123V is coupled (fixed) to the first and second plate members 121V and 122V via a plurality of rivets so as to project toward the second intermediate member 14V at locations between the spring support portions 1212 and the outer spring abutment portions 121co in the radial direction.

The second intermediate member 14V of the damper device 10V includes: a first plate member 141V disposed in proximity to the turbine runner 5; a second plate member 142V disposed on the front cover (not illustrated) side, that is, the engine side (right side in the drawing), with respect to the first plate member 141V; and a third plate member 143V disposed on the front cover side with respect to the second plate member 142V. The first to third plate members 141V, 142V, and 124V are formed in an annular shape, and coupled to each other via a plurality of rivets.

The first plate member 141V has: a plurality of spring housing windows 141w that extend arcuately and that are disposed at intervals (equal intervals) in the circumferential direction; a plurality of spring support portions 1411 that extend along the inner peripheral edges of the respective spring housing windows 141w and that are arranged at intervals (equal intervals) in the circumferential direction; a plurality of spring support portions 1412 that extend along the outer peripheral edges of the respective spring housing windows 141w and that are arranged at intervals (equal intervals) in the circumferential direction to face the respective spring support portions 1411 in the radial direction of the first plate member 141V; a plurality of inner spring abutment portions 141ci; an annular spring support portion 1413 formed on the radially outer side with respect to the plurality of spring support portions 1412; and a plurality of outer spring abutment portions 141co formed on the radially outer side with respect to the plurality of spring support portions 1412.

The plurality of inner spring abutment portions 141ci of the first plate member 141V are provided such that each inner spring abutment portion 141ci is interposed between the spring housing windows 141w (spring support portions 1411 and 1412) which are adjacent to each other along the circumferential direction. In addition, the annular spring support portion 1413 is formed so as to support (guide) the outer peripheral portions of the plurality of third springs SP3, the side portions (left side portions in FIG. 15) of such springs on the turbine runner 5 side (transmission side), the inner peripheral side of the side portions, and the outer peripheral side (shoulder portions) of the side portions of the plurality of third springs SP3 on the front cover side. Furthermore, the plurality of outer spring abutment portions 141co are formed at intervals in the circumferential direction so as to project into the annular spring support portion 1413.

The second plate member 142V has: a plurality of spring housing windows 142w that extend arcuately and that are disposed at intervals (equal intervals) in the circumferential direction; a plurality of spring support portions 1421 that extend along the inner peripheral edges of the respective spring housing windows 142w and that are arranged at intervals (equal intervals) in the circumferential direction; a plurality of spring support portions 1422 that extend along the outer peripheral edges of the respective spring housing windows 142w and that are arranged at intervals (equal intervals) in the circumferential direction to face the respective spring support portions 1421 in the radial direction of the second plate member 142V; a plurality of inner spring abutment portions 142ci; and a plurality of outer spring abutment portions 142co formed on the radially outer side with respect to the plurality of spring support portions 1242. The plurality of inner spring abutment portions 142ci of the second plate member 142V are provided such that each inner spring abutment portion 142ci is interposed between the spring housing windows 142w (spring support portions 1421 and 1422) which are adjacent to each other along the circumferential direction. In addition, the plurality of outer spring abutment portions 142co are formed at intervals in the circumferential direction so as to project in the radial direction of the damper device 10V.

The third plate member 143V has an annular spring support portion 1431 and a plurality of spring abutment portions 143d. The spring support portion 1431 is formed so as to support (guide) the outer peripheral portions of the plurality of intermediate springs SPm, the side portions (left side portions in FIG. 15) of such springs on the turbine runner 5 side (transmission side), and the outer peripheral side (shoulder portions) of the side portions of such springs on the front cover side. The spring abutment portions 143d are formed symmetrically with respect to the axis of the third plate member 143V such that two (a pair of) spring abutment portions 143d are proximate to each other. The two spring abutment portions 143d which are paired with each other are arranged in the circumferential direction at an interval that matches the natural length of the intermediate spring SPm, for example. As illustrated in FIG. 15, the inner peripheral portion of the third plate member 143V is coupled (fixed) to the first and second plate members 141V and 142V via a plurality of rivets so as to project toward the front cover (not illustrated) (toward the first intermediate member 12V) at locations between the spring support portions 1422 and the outer spring abutment portions 142co in the radial direction.

The inner peripheral portion of the driven member 16V of the damper device 10V is fixed to a damper hub (not illustrated) together with the turbine runner 5 via rivets. As illustrated in the drawing, the driven member 16V has a plurality of first spring abutment portions 161c and a plurality of second spring abutment portions 162c. In the damper device 10V, the plurality of first spring abutment portions 161c extend outward in the radial direction of the damper device 10V from the inner peripheral portion of the driven member 16V. In addition, the plurality of second spring abutment portions 162c extend in the axial direction of the damper device 10V from the inner peripheral portion of the driven member 16V toward the turbine runner 5, and extend outward in the radial direction of the damper device 10V. Consequently, the first and second spring abutment portions 161c and 162c are also spaced away from each other in the axial direction of the damper device 10V.

As illustrated in FIG. 15, the first and second plate members 121V and 122V of the first intermediate member 12V are coupled such that the spring support portions 1211 to 1214 face the respective spring abutment portions 1221 to 1224. In the damper device 10V, in addition, the first intermediate member 12V is positioned on the front cover (not illustrated) side with respect to the second intermediate member 14V away from the second intermediate member 14V in the axial direction, and disposed such that the outermost peripheral portion of the first intermediate member 12V is positioned on the radially inner side with respect to the outermost peripheral portion of the second intermediate member 14V. Furthermore, the spring support portions 1211 and 1212 of the first plate member 121V and the spring support portions 1221 and 1222 of the second plate member 122V support (guide) the associated second springs SP2. That is, the plurality of fourth springs SP4 are supported by the first and second plate members 141V and 142V so as to be arranged at intervals in the circumferential direction. The spring support portions 1214 of the first plate member 121V and the spring support portions 1223 and 1224 of the second plate member 122V support (guide) the associated first springs SP1. That is, the plurality of first springs SP1 are supported by the first and second plate members 141V and 142V so as to be arranged at intervals in the circumferential direction on the radially outer side with respect to the plurality of second springs SP2. The first spring abutment portions 111c of the drive member 11V are inserted from the radially outer side, and the first spring abutment portions 161c of the driven member 16V are inserted from the radially inner side, into a space between the first and second plate members 121V and 122V in the axial direction.

With the damper device 10V in the attached state, the first spring abutment portions 111c of the drive member 11V are each provided between the first springs SP1 which are adjacent to each other to abut against the end portions of such first springs SP1 in the circumferential direction. Meanwhile, with the damper device 10V in the attached state, the outer spring abutment portions 121co and 122co of the first intermediate member 12V abut against the end portions, in the circumferential direction, of the first springs SP1, which are adjacent to each other, that do not abut against the spring abutment portions 111c of the drive member 11V. Furthermore, with the damper device 10V in the attached state, each inner spring abutment portion 121ci and each inner spring abutment portion 122ci of the first intermediate member 12V are provided between the second springs SP2 which are adjacent to each other to abut against the end portions of such second springs SP2 in the circumferential direction. Meanwhile, with the damper device 10V in the attached state, the first spring abutment portions 161c of the driven member 16V abut against the end portions, in the circumferential direction, of the second springs SP2, which are adjacent to each other, that do not abut against the inner spring abutment portions 121ci and 122ci of the first intermediate member 12V. Consequently, the drive member 11V and the first intermediate member 12V are coupled to each other via the plurality of first springs SP1 which act in parallel with each other, and the first intermediate member 12V and the driven member 16V are coupled to each other via the plurality of second springs SP2 which act in parallel with each other. Thus, the drive member 11V and the driven member 16V are coupled to each other via the plurality of first springs SP1, the first intermediate member 12V, and the plurality of second springs SP2.

As illustrated in FIG. 15, the first and second plate members 141V and 142V of the second intermediate member 14V are coupled such that the respective spring support portions 1411 and 1421 face each other and the respective spring support portions 1412 and 1422 face each other. In addition, the spring support portion 1413 of the first plate member 141V of the second intermediate member 14V supports the plurality of third springs SP3 so as to be arranged at intervals in the circumferential direction. Furthermore, the spring support portions 1411 and 1412 of the first plate member 141V and the spring support portions 1421 and 1422 of the second plate member 142V support (guide) the associated fourth springs SP4. That is, the plurality of fourth springs SP4 are supported by the first and second plate members 141V and 142V so as to be arranged at intervals in the circumferential direction on the radially inner side with respect to the plurality of third springs SP3. Furthermore, the second spring abutment portions 112c of the drive member 11V are inserted from the radially outer side, and the second spring abutment portions 162c of the driven member 16V are inserted from the radially inner side, into a space between the first and second plate members 141V and 142V in the axial direction.

With the damper device 10V in the attached state, the second spring abutment portions 112c of the drive member 11V are each provided between the third springs SP3 which are adjacent to each other to abut against the end portions of such third springs SP3 in the circumferential direction. Meanwhile, with the damper device 10V in the attached state, the outer spring abutment portions 141co and 142co of the second intermediate member 14V abut against the end portions, in the circumferential direction, of the third springs SP3, which are adjacent to each other, that do not abut against the spring abutment portions 112c of the drive member 11V. Furthermore, with the damper device 10V in the attached state, each inner spring abutment portion 141ci and each inner spring abutment portion 142ci of the second intermediate member 14V are provided between the fourth springs SP4 which are adjacent to each other to abut against the end portions of such fourth springs SP4 in the circumferential direction. Meanwhile, with the damper device 10V in the attached state, the second spring abutment portions 162c of the driven member 16V abut against the end portions, in the circumferential direction, of the fourth springs SP4, which are adjacent to each other, that do not abut against the inner spring abutment portions 141ci and 142ci of the second intermediate member 14V. Consequently, the drive member 11V and the second intermediate member 14V are coupled to each other via the plurality of third springs SP3 which act in parallel with each other, and the second intermediate member 14V and the driven member 16V are coupled to each other via the plurality of fourth springs SP4 which act in parallel with each other. Thus, the drive member 11V and the driven member 16V are coupled to each other via the plurality of third springs SP3, the second intermediate member 14V, and the plurality of fourth springs SP4.

Meanwhile, the intermediate springs SPm are supported by the spring support portion 1431 of the third plate member 143V of the second intermediate member 14V, and partially overlap the first springs SP1 and the third springs SP3 in the radial direction as seen in the axial direction at locations between the first and second springs SP1 and SP2 and the third and fourth springs SP3 and SP4 in the axial direction. Furthermore, with the damper device 10V in the attached state, the pair of spring abutment portions 123d of the third plate member 123V which is included in the first intermediate member 12V abut against the respective end portions of the intermediate springs SPm in the circumferential direction. In addition, the pair of spring abutment portions 143d of the third plate member 143V which is included in the second intermediate member 14V also abut against the respective end portions of the intermediate spring SPm in the circumferential direction. Consequently, with the damper device 10V in the attached state, each intermediate spring SPm is supported from both sides in the circumferential direction by the pair of spring abutment portions 123d of the first intermediate member 12V, that is, the third plate member 123V, and supported from both sides in the circumferential direction by the pair of spring abutment portions 143d of the second intermediate member 14V, that is, the third plate member 143V. Thus, the first intermediate member 12V and the second intermediate member 14V are coupled to each other via the plurality of intermediate springs SPm. Spring seats may be disposed between the end portions of the intermediate springs SPm and the spring abutment portions 123d and 143d.

In the damper device 10V discussed above, an attachment radius $r_{SP3}$ of the third springs SP3 is determined to be larger than attachment radii $r_{SP1}$, $r_{SP2}$, and $r_{SP4}$ of the first, second, and fourth springs SP1, SP2, and SP4. In addition, the attachment radius $r_{SP1}$ of the first springs SP1 is determined to be larger than the attachment radii $r_{SP2}$ and $r_{SP4}$ of the second and fourth springs SP2 and SP4. Furthermore, the attachment radius $r_{SP4}$ of the fourth springs SP4 is determined to be larger than the attachment radius $r_{SP2}$ of the second springs SP2. In the damper device 10V as well, the natural frequency ($f_{22}$) of the second intermediate member 14V is higher than the natural frequency ($f_{21}$) of the first intermediate member 12V, and the average attachment radius ro of the third and fourth springs SP3 and SP4 corresponding to the second intermediate member 14V, which has a natural frequency that is higher than that of the first intermediate member 12V, is determined to be larger than the average attachment radius ri of the first and second springs SP1 and SP2 corresponding to the first intermediate member 12. That is, the axis of the third springs SP3 which have the largest spring constant (rigidity), of the first to fourth springs SP1 to SP4, is positioned on the outer side, in the radial direction of the damper device 10V, with respect to the axes of the first and second springs SP1 and SP2 (and the fourth springs SP4). In the damper device 10V, in addition, the third springs SP3 are disposed on the radially outer side of the first and second springs SP1 and SP2 (and the fourth springs SP4) so as to partially overlap the first springs SP1 in the radial direction as seen in the axial direction.

Consequently, it is possible to increase the torsional angle (stroke) of the third springs SP3 with a high rigidity, and the rigidity of the third springs SP3 can be lowered while allowing transfer of large torque to the drive member 11V. As a result, it is possible to further reduce the equivalent rigidity keq of the damper device 10V, and to further shift resonance of the entire vibration system including the damper device 10V to the low-rotation side (low-frequency side). Thus, the vibration damping performance of the damper device 10V can also be improved extremely well by bringing the frequency of the antiresonance point A described above closer to the frequency of resonance of the entire vibration system. In addition, by causing the second intermediate member 14V to support the third springs SP3, it is possible to reduce the relative speed between the third springs SP3, which are deflected in accordance with the torsional angle of the second intermediate member 14V with respect to the drive member 11V or the driven member 16V, and the second intermediate member 14V. Thus, a friction force generated between the second intermediate member 14V and the third springs SP3 can be reduced. Thus, it is possible to lower the hysteresis of the entire damper device 10V.

Furthermore, the third springs SP3 are disposed on the outer side of the fourth springs SP4 in the radial direction of the damper device 10V, the first and second springs SP1 and SP2 are disposed away from the third and fourth springs SP3 and SP4 in the axial direction of the damper device 10V, and the first springs SP1 are disposed on the outer side of the second spring SP2 in the radial direction. Consequently, it is possible to enhance the degree of freedom in setting of the first to fourth springs SP1 to SP4 such as the spring constant (rigidity), the number of the first to fourth springs SP1 to SP4 to be disposed, and the torsional angle (stroke). In the damper device 10V, in addition, the axis of the third springs SP3 and the axis of the fourth springs SP4 are included in a first plane that is orthogonal to the center axis CA. Furthermore, the axis of the first springs SP1 and the axis of the second springs SP2 are included in a second plane that is orthogonal to the center axis CA and that is located away from the first plane described above in the axial direction of the damper device 10V. Consequently, it is possible to suppress an increase in the axial length of the damper device 10V. Furthermore, the degree of freedom in setting of the intermediate springs SPm such as the rigidity, the number of the intermediate springs SPm to be disposed, and the torsional angle (stroke) can be enhanced by disposing the intermediate springs SPm between the first and second springs SP1 and SP2 and the third and fourth springs SP3 and SP4 in the axial direction.

The axes of the third and fourth springs SP3 and SP4 may not be included in the first plane described above which is orthogonal to the center axis CA. The axes of the first and second springs SP1 and SP2 may not be included in the second plane described above which is orthogonal to the center axis CA. In the damper device 10V, in addition, the intermediate springs SPm may be supported by the first intermediate member 12V (e.g. the third plate 123V).

Figure 16:
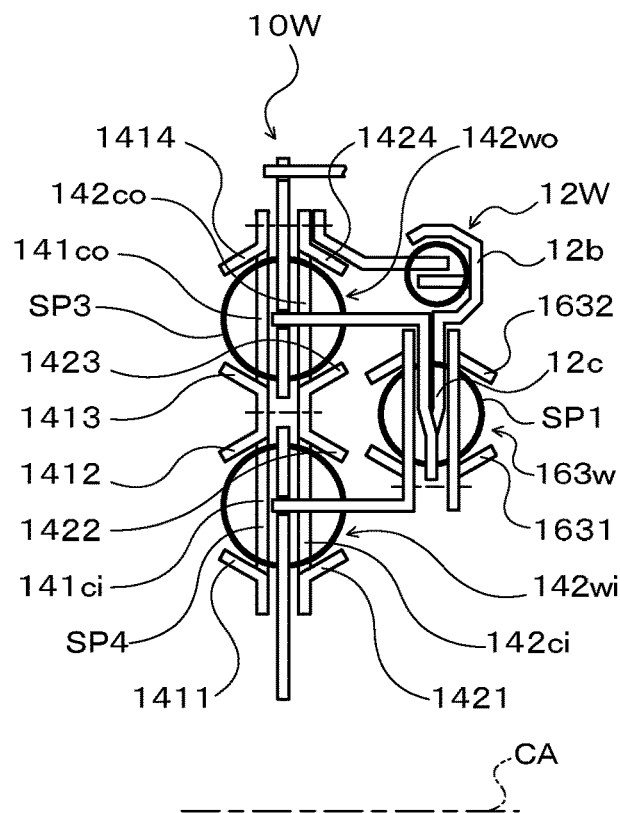
FIG. 16 is a sectional view illustrating another damper device according to the present disclosure.
Figure 16:
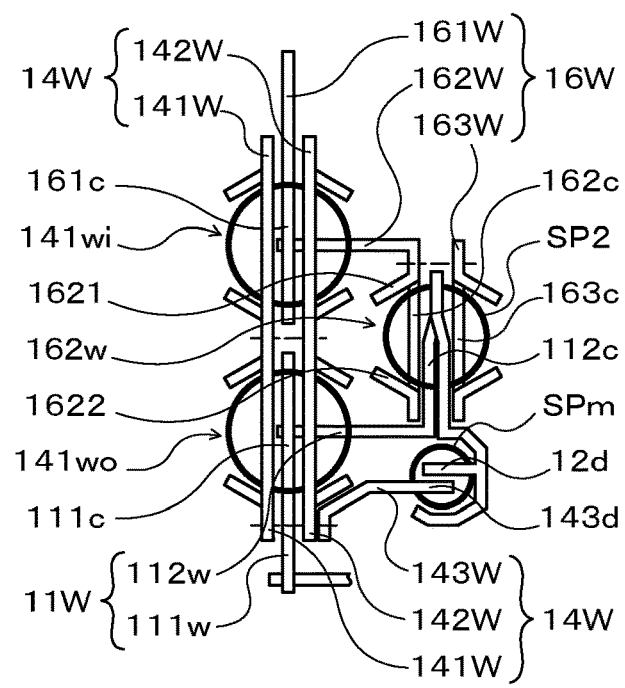

FIG. 16 is a sectional view illustrating another damper device 10W according to the present disclosure. Constituent elements of the damper device 10W that are identical to the elements of the damper devices 10 to 10V discussed above are given the same numerals to omit redundant descriptions.

A drive member 11W of the damper device 10W illustrated in FIG. 16 is coupled so as to rotate together with a lock-up piston of a single-plate lock-up clutch or a clutch drum of a multi-plate lock-up clutch, and includes a first plate member 111W and a second plate member 112W formed in an annular shape. The first plate member 111W has a plurality of spring abutment portions 111c formed at intervals in the circumferential direction so as to extend in the radial direction of the damper device 10W. The outer peripheral portion of the first plate member 111W is engaged with the lock-up piston or the clutch drum. The second plate member 112W has a plurality of spring abutment portions 112c formed at intervals in the circumferential direction so as to extend in the radial direction of the damper device 10W, and is coupled so as to rotate together with the first plate member 111W. When the first and second plate members 111W and 112W are coupled to each other, the plurality of spring abutment portions 111c and the plurality of spring abutment portions 112c are spaced away from each other in the axial direction and the radial direction of the damper device 10W.

A first intermediate member 12W of the damper device 10W has an annular spring support portion 12b, a plurality of inner spring abutment portions 12c, and a plurality of outer spring abutment portions 12d formed on the radially outer side with respect to the inner spring abutment portions 12c. The spring support portion 12b is formed so as to support (guide) the outer peripheral portions of the plurality of intermediate springs SPm, the side portions (right side portions in FIG. 16) of such springs on the front cover side (transmission side), and the outer peripheral side (shoulder portions) of the side portions of such springs on the turbine runner side. The plurality of inner spring abutment portions 12c are formed at intervals in the circumferential direction so as to project radially inward from the inner peripheral portion of the spring support portion 12b. The outer spring abutment portions 12d are formed symmetrically with respect to the axis of the first intermediate member 12W such that two (a pair of) outer spring abutment portions 12d are proximate to each other. The two outer spring abutment portions 12d which are paired with each other are arranged in the circumferential direction at an interval that matches the natural length of the intermediate spring SPm, for example.

A second intermediate member 14W of the damper device 10W includes: a first plate member 141W disposed in proximity to the turbine runner (not illustrated); a second plate member 142W disposed on the front cover (not illustrated) side, that is, the engine side (right side in the drawing), with respect to the first plate member 141W; and a third plate member 143W disposed on the front cover side with respect to the second plate member 142W. The first to third plate members 141W, 142W, and 143W are formed in an annular shape, and coupled to each other via a plurality of rivets.

The first plate member 141W has a plurality of inner spring housing windows 141wi, a plurality of outer spring housing windows 141wo, a plurality of spring support portions 1411, 1412, 1413, and 1414, a plurality of inner spring abutment portions 141ci, and a plurality of outer spring abutment portions 141co. The plurality of inner spring housing windows 141wi extend arcuately, and are disposed at intervals (equal intervals) in the circumferential direction in the inner peripheral portion of the first plate member 141W. The plurality of spring support portions 1411 extend along the inner peripheral edges of the respective inner spring housing windows 141wi, and are arranged at intervals (equal intervals) in the circumferential direction. The plurality of spring support portions 1412 extend along the outer peripheral edges of the respective inner spring housing windows 141wi, and are arranged at intervals (equal intervals) in the circumferential direction to face the respective spring support portions 1411 in the radial direction of the first plate member 141W. In addition, the inner spring abutment portions 141ci are provided such that each inner spring abutment portion 141ci is interposed between the inner spring housing windows 141wi (spring support portions 1411 and 1412) which are adjacent to each other along the circumferential direction.

The plurality of outer spring housing windows 141wo extend arcuately, and are disposed at intervals in the circumferential direction in the outer peripheral portion of the first plate member 141W so as to be positioned on the radially outer side with respect to the inner spring housing windows 141wi. The plurality of spring support portions 1413 extend along the inner peripheral edges of the respective outer spring housing windows 141wo, and are arranged at intervals (equal intervals) in the circumferential direction. The plurality of spring support portions 1414 extend along the outer peripheral edges of the respective outer spring housing windows 141wo, and are arranged at intervals (equal intervals) in the circumferential direction to face the respective spring support portions 1413 in the radial direction of the first plate member 141W. Furthermore, the outer spring abutment portions 141co are provided such that each outer spring abutment portion 141co is interposed between the outer spring housing windows 141wo (spring support portions 1413 and 1414) which are adjacent to each other along the circumferential direction.

The second plate member 142W has a plurality of inner spring housing windows 142wi, a plurality of outer spring housing windows 142wo, a plurality of spring support portions 1421, 1422, 1423, and 1424, a plurality of inner spring abutment portions 142ci, and a plurality of outer spring abutment portions 142co. The plurality of inner spring housing windows 142wi extend arcuately, and are disposed at intervals (equal intervals) in the circumferential direction in the inner peripheral portion of the second plate member 142W. The plurality of spring support portions 1421 extend along the inner peripheral edges of the respective inner spring housing windows 142wi, and are arranged at intervals (equal intervals) in the circumferential direction. The plurality of spring support portions 1422 extend along the outer peripheral edges of the respective inner spring housing windows 142wi, and are arranged at intervals (equal intervals) in the circumferential direction to face the respective spring support portions 1421 in the radial direction of the second plate member 142W. In addition, the inner spring abutment portions 142ci are provided such that each inner spring abutment portion 142ci is interposed between the inner spring housing windows 142wi (spring support portions 1421 and 1422) which are adjacent to each other along the circumferential direction.

The plurality of outer spring housing windows 142wo extend arcuately, and are disposed at intervals in the circumferential direction in the outer peripheral portion of the second plate member 142W so as to be positioned on the radially outer side with respect to the inner spring housing windows 142wi. The plurality of spring support portions 1423 extend along the inner peripheral edges of the respective outer spring housing windows 142wo, and are arranged at intervals (equal intervals) in the circumferential direction. The plurality of spring support portions 1424 extend along the outer peripheral edges of the respective outer spring housing windows 142wo, and are arranged at intervals (equal intervals) in the circumferential direction to face the respective spring support portions 1423 in the radial direction of the second plate member 142W. In addition, the outer spring abutment portions 142co are provided such that each outer spring abutment portion 142co is interposed between the outer spring housing windows 142wo (spring support portions 1423 and 1424) which are adjacent to each other along the circumferential direction.

The third plate member 143W has a plurality of spring abutment portions 143d that extend in the axial direction of the damper device 10W. The spring abutment portions 143d are formed symmetrically with respect to the axis of the third plate member 143W such that two (a pair of) spring abutment portions 143d are proximate to each other. The two spring abutment portions 143d which are paired with each other are arranged in the circumferential direction at an interval that matches the natural length of the intermediate spring SPm, for example. As illustrated in FIG. 16, the end portion of the third plate member 143W on the opposite side of the plurality of spring abutment portions 143d is coupled (fixed) to the first and second plate members 141W and 142W via a plurality of rivets on the radially outer side of the spring support portions 1424. Consequently, the plurality of spring abutment portions 143d project toward the front cover (rightward in the drawing).

A driven member 16W of the damper device 10W includes a first plate member 161W, a second plate member 162W, and a third plate member 163W formed in an annular shape. The first plate member 161W has a plurality of spring abutment portions 161c formed at intervals in the circumferential direction so as to extend radially outward from the inner peripheral portion. The inner peripheral portion of the first plate member 161W is fixed to the turbine hub (not illustrated) via a plurality of rivets. The second plate member 162W has: a plurality of spring housing windows 162w disposed at intervals (equal intervals) in the circumferential direction; a plurality of spring support portions 1621 that extend along the inner peripheral edges of the respective spring housing windows 162w; a plurality of spring support portions 1622 that extend along the outer peripheral edges of the respective spring housing windows 162w; and a plurality of spring abutment portions 162c. The plurality of spring abutment portions 162c are provided such that each spring abutment portion 162c is interposed between the spring housing windows 162w (spring support portions 1621 and 1622) which are adjacent to each other along the circumferential direction. The second plate member 162W is coupled so as to rotate together with the first plate member 161W. When the first and second plate members 161W and 162W are coupled to each other, the plurality of spring abutment portions 161c and the plurality of spring abutment portions 162c are spaced away from each other in the axial direction and the radial direction of the damper device 10W.

The third plate member 163W has: a plurality of (e.g. three) spring housing windows 163w disposed at intervals (equal intervals) in the circumferential direction; a plurality of spring support portions 1631 that extend along the inner peripheral edges of the respective spring housing windows 163w; a plurality of spring support portions 1632 that extend along the outer peripheral edges of the respective spring housing windows 163w; and a plurality of spring abutment portions 163c. The plurality of spring abutment portions 163c are provided such that each spring abutment portion 163c is interposed between the spring housing windows 163w (spring support portions 1631 and 1632) which are adjacent to each other along the circumferential direction. As illustrated in FIG. 16, the third plate member 163W is coupled (fixed) to the second plate member 162W via a plurality of rivets such that the spring support portions 1631 and 1632 face the respective spring support portions 1621 and 1622 of the second plate member 162W.

As illustrated in FIG. 16, the first and second plate members 141W and 142W of the second intermediate member 14W are coupled such that the associated spring support portions 1411 to 1414 and spring support portions 1421 to 1424 face each other. In addition, the spring support portions 1413 and 1414 of the first plate member 141W and the spring support portions 1423 and 1424 of the second plate member 142W support (guide) the associated third springs SP3. Furthermore, the spring support portions 1411 and 1412 of the first plate member 141W and the spring support portions 1421 and 1422 of the second plate member 142W support (guide) the associated second springs SP2. Consequently, the plurality of third springs SP3 are supported by the first and second plate members 141W and 142W so as to be arranged at intervals in the circumferential direction on the outer peripheral side of the damper device 10W. In addition, the plurality of fourth springs SP4 are supported by the first and second plate members 141W and 142W so as to be arranged at intervals in the circumferential direction on the radially inner side with respect to the plurality of third springs SP3. Furthermore, the first plate member 111W of the drive member 11W is disposed between the outer spring abutment portions 141co and 142co of the first and second plate members 141W and 142W in the axial direction. In addition, the first plate member 161W of the driven member 16W is disposed between the inner spring abutment portions 141$ci$ and 142$ci$ of the first and second plate members 141W and 142W in the axial direction.

With the damper device 10W in the attached state, the spring abutment portions 111$c$ of the first plate member 111W of the drive member 11W are each provided between the third springs SP3 which are adjacent to each other to abut against the end portions of such third springs SP3 in the circumferential direction. Meanwhile, with the damper device 10W in the attached state, the outer spring abutment portions 141$co$ and 142$co$ of the second intermediate member 14W abut against the end portions, in the circumferential direction, of the third springs SP3, which are adjacent to each other, that do not abut against the spring abutment portions 111$c$ of the drive member 11W. Furthermore, with the damper device 10W in the attached state, each inner spring abutment portion 141$ci$ and each inner spring abutment portion 142$ci$ of the second intermediate member 14W are provided between the fourth springs SP4 which are adjacent to each other to abut against the end portions of such fourth springs SP4 in the circumferential direction. Meanwhile, with the damper device 10W in the attached state, the spring abutment portions 161$c$ of the first plate member 161W of the driven member 16W abut against the end portions, in the circumferential direction, of the fourth springs SP4, which are adjacent to each other, that do not abut against the inner spring abutment portions 141$ci$ and 142$ci$ of the second intermediate member 14W. Consequently, the drive member 11W and the second intermediate member 14W are coupled to each other via the plurality of third springs SP3 which act in parallel with each other, and the second intermediate member 14W and the driven member 16W are coupled to each other via the plurality of fourth springs SP4 which act in parallel with each other. Thus, the drive member 11W and the driven member 16W are coupled to each other via the plurality of third springs SP3, the second intermediate member 14W, and the plurality of fourth springs SP4.

As illustrated in FIG. 16, the spring abutment portions 112$c$ of the second plate member 112W of the drive member 11W and the inner spring abutment portions 12$c$ of the first intermediate member 12W are disposed between the second and third plate members 162W and 13W of the driven member 16W in the axial direction. In addition, the first and second springs SP1 and SP2 are supported by the associated spring support portions 1621, 1622, 1631, and 1632 of the driven member 16W, that is, the second and third plate members 162W and 163W, such that one first spring SP1 and one second spring SP2 are paired (act in series with each other) and such that the first and second springs SP1 and SP2 are arranged alternately in the circumferential direction (circumferential direction of the first intermediate member 12W). Furthermore, with the damper device 10W in the attached state, the spring abutment portions 112$c$ of the second plate member 112W of the drive member 11W are each provided between the first and second springs SP1 and SP2, which are not paired (do not act in series with each other), to abut against the end portions of such first and second springs SP1 and SP2 in the circumferential direction. In addition, the inner spring abutment portions 112$c$ of the first intermediate member 12W are each provided between the second and third plate members 161W and 162W in the axial direction, and between the first and second springs SP1 and SP2, which are paired with each other (act in series with each other), to abut against the end portions of such first and second springs SP1 and SP2 in the circumferential direction. Further, with the damper device 10W in the attached state, as with the spring abutment portions 112$c$ of the drive member 11W, each spring abutment portion 162$c$ and each spring abutment portion 163$c$ of the driven member 16W are provided between the first and second springs SP1 and SP2, which are not paired (do not act in series with each other), to abut against the end portions of such first and second springs SP1 and SP2 in the circumferential direction. Consequently, the drive member 11W and the driven member 16W are coupled to each other via the plurality of first springs SP1, the first intermediate member 12W, and the plurality of second springs SP2.

Meanwhile, the intermediate springs SPm are supported by the spring support portion 12$b$ of the first intermediate member 12W, overlap the first and second springs SP1 and SP2 in the axial direction as seen in the radial direction on the radially outer side of the first and second springs SP1 and SP2, and partially overlap the third springs SP3 in the radial direction as seen in the axial direction. Furthermore, the pair of outer spring abutment portions 12$d$ of the first intermediate member 12W abut against the respective end portions of the intermediate spring SPm in the circumferential direction. In addition, with the damper device 10W in the attached state, the pair of spring abutment portions 143$d$ of the third plate member 143W which is included in the second intermediate member 14W abut against the respective end portions of the intermediate spring SPm in the circumferential direction. Consequently, with the damper device 10W in the attached state, each intermediate spring SPm is supported from both sides in the circumferential direction by the pair of outer spring abutment portions 12$d$ of the first intermediate member 12W, and supported from both sides in the circumferential direction by the pair of spring abutment portions 143$d$ of the second intermediate member 14W, that is, the third plate member 143W. Thus, the first intermediate member 12W and the second intermediate member 14W are coupled to each other via the plurality of intermediate springs SPm. Spring seats may be disposed between the end portions of the intermediate springs SPm and the spring abutment portions 12$d$ and 143$d$.

In the damper device 10W discussed above, the attachment radius $r_{SP3}$ of the third springs SP3 is determined to be larger than the attachment radii $r_{SP1}$, $r_{SP2}$, and $r_{SP4}$ of the first, second, and fourth springs SP1, SP2, and SP4, and the attachment radii $r_{SP1}$ and $r_{SP2}$ of the first and second springs SP1 and SP2 are determined to be the same as each other and larger than the attachment radius $r_{SP4}$ of the fourth springs SP4. In the damper device 10W as well, the natural frequency ($f_{22}$) of the second intermediate member 14W is higher than the natural frequency ($f_{21}$) of the first intermediate member 12W, and the average attachment radius ro of the third and fourth springs SP3 and SP4 corresponding to the second intermediate member 14W, which has a natural frequency that is higher than that of the first intermediate member 12W, is determined to be larger than the average attachment radius ri of the first and second springs SP1 and SP2 corresponding to the first intermediate member 12. That is, the axis of the third springs SP3 which have the largest spring constant (rigidity), of the first to fourth springs SP1 to SP4, is positioned on the outer side, in the radial direction of the damper device 10W, with respect to the axes of the first and second springs SP1 and SP2 (and the fourth springs SP4). In the damper device 10W, in addition, the third springs SP3 are disposed on the radially outer side of the first and second springs SP1 and SP2 (and the fourth springs SP4) so as to partially overlap the first and second springs SP1 and SP2 in the radial direction as seen in the axial direction.

Consequently, it is possible to increase the torsional angle (stroke) of the third springs SP3 with a high rigidity, and the rigidity of the third springs SP3 can be lowered while allowing transfer of large torque to the drive member 11W. As a result, it is possible to further reduce the equivalent rigidity keq of the damper device 10W, and to further shift resonance of the entire vibration system including the damper device 10W to the low-rotation side (low-frequency side). Thus, the vibration damping performance of the damper device 10V can also be improved extremely well by bringing the frequency of the antiresonance point A described above closer to the frequency of resonance of the entire vibration system. In addition, by causing the second intermediate member 14W to support the third springs SP3, it is possible to reduce the relative speed between the third springs SP3, which are deflected in accordance with the torsional angle of the second intermediate member 14W with respect to the drive member 11W or the driven member 16W, and the second intermediate member 14W. Thus, a friction force generated between the second intermediate member 14W and the third springs SP3 can be reduced. Thus, it is possible to lower the hysteresis of the entire damper device 10W.

Furthermore, the third springs SP3 are disposed on the outer side of the fourth springs SP4 in the radial direction of the damper device 10W, the first and second springs SP1 and SP2 are disposed away from the third and fourth springs SP3 and SP4 in the axial direction of the damper device 10W, and the first and second springs SP1 and SP2 are disposed on the same circumference. Consequently, it is possible to enhance the degree of freedom in setting of the third and fourth springs SP3 and SP4, in particular, such as the spring constant (rigidity), the number of the third and fourth springs SP3 and SP4 to be disposed, and the torsional angle (stroke). In the damper device 10W, in addition, the axis of the third springs SP3 and the axis of the fourth springs SP4 are included in a first plane that is orthogonal to the center axis CA. In addition, the axis of the first springs SP1 and the axis of the second springs SP2 are included in a second plane that is orthogonal to the center axis CA and that is located away from the first plane described above in the axial direction of the damper device 10W. Consequently, it is possible to suppress an increase in the axial length of the damper device 10W. Furthermore, by disposing the intermediate springs SPm as discussed above, the degree of freedom in setting of the intermediate springs SPm such as the rigidity, the number of the intermediate springs SPm to be disposed, and the torsional angle (stroke) can be enhanced. It should be noted, however, that the axes of the third and fourth springs SP3 and SP4 may not be included in the first plane described above which is orthogonal to the center axis CA, and that the axes of the first and second springs SP1 and SP2 may not be included in the second plane described above which is orthogonal to the center axis CA.

As has been described above, the present disclosure provides a damper device (10, 10V, 10W, 10X, 10Y, 10Z) that has an input element (11, 11V, 11W, 11X, 11Y, 11Z) to which torque from an engine (EG) is transferred and an output element (16, 16V, 16W, 16X, 16Y, 16Z), including: a first intermediate element (12, 12V, 12W, 12X, 12Y, 12Z); a second intermediate element (14, 14V, 14W, 14X, 14Y, 14Z); a first elastic body (SP1, SP1) that transfers torque between the input element (11, 11V, 11W, 11X, 11Y, 11Z) and the first intermediate element (12, 12V, 12W, 12X, 12Y, 12Z); a second elastic body (SP12, SP2) that transfers torque between the first intermediate element (12, 12V, 12W, 12X, 12Y, 12Z) and the output element (16, 16V, 16W, 16X, 16Y, 16Z); a third elastic body (SP21, SP3) that transfers torque between the input element (11, 11V, 11W, 11X, 11Y, 11Z) and the second intermediate element (14, 14V, 14W, 14X, 14Y, 14Z); a fourth elastic body (SP22, SP4) that transfers torque between the second intermediate element (14, 14V, 14W, 14X, 14Y, 14Z) and the output element (16, 16V, 16W, 16X, 16Y, 16Z); and a fifth elastic body (SPm) that transfers torque between the first intermediate element (12, 12V, 12W, 12X, 12Y, 12Z) and the second intermediate element (14, 14V, 14W, 14X, 14Y, 14Z), in which: a natural frequency ($f_{22}$) of the second intermediate element at a time when torque is transferred from the input element to the output element via all of the first to fifth elastic bodies is higher than a natural frequency ($f_{21}$) of the first intermediate element at a time when torque is transferred from the input element to the output element via all of the first to fifth elastic bodies; and at least one of the third and fourth elastic bodies (SP21, SP3, SP22, SP4) is disposed on a radially outer side of the first and second elastic bodies (SP11, SP1, SP12, SP2).

In the damper device according to the present disclosure, two natural frequencies can be set for the entire device when deflection of all of the first to fifth elastic bodies is allowed. The studies and the analyses conducted by the inventors revealed that the natural frequency of the damper device which included the first to fifth elastic bodies became lower as the rigidity of the fifth elastic body was lowered, and that variations in the equivalent rigidity of the damper device with respect to variations in the rigidity of the fifth elastic body were significantly small compared to variations in the equivalent rigidity of the damper device with respect to variations in the rigidities of the first to fourth elastic bodies. Thus, with the damper device according to the present disclosure, by adjusting the rigidity of the fifth elastic body, it is possible to set the two natural frequencies of the entire damper device appropriately while keeping the equivalent rigidity of the damper device appropriate and suppressing an increase in the weights (moments of inertia) of the first and second intermediate elements. Furthermore, the equivalent rigidity of the damper device can be reduced by disposing at least one of the third and fourth elastic bodies corresponding to the second intermediate element, which has a higher natural frequency, on the radially outer side of the first and second elastic bodies corresponding to the first intermediate element, which has a lower natural frequency. As a result, the vibration damping performance of the damper device according to the present disclosure can be improved well.

More particularly, in the damper device according to the present disclosure, a first torque transfer path is formed by the first intermediate element and the first and second elastic bodies, and a second torque transfer path is formed by the second intermediate element and the third and fourth elastic bodies, between the input element and the output element. In addition, the damper device according to the present disclosure includes the fifth elastic body in addition to the first to fourth elastic bodies, and torque is transferred between the first intermediate element and the second intermediate element by the fifth elastic body. In such a damper device, two natural frequencies can be set for the entire device when deflection of all of the first to fifth elastic bodies is allowed. In the case where two natural frequencies are set for the entire device in this way, once resonance at the lower one of the two natural frequencies is generated in accordance with the frequency of vibration transferred to the input element, the phase of vibration transferred from the second elastic body to the output element and the phase of vibration transferred from the fourth elastic body to the output element are shifted from each other. Therefore, as the rotational speed of the input element is increased after resonance at the lower one of the two natural frequencies is generated, one of vibration transferred from the second elastic body to the output element and vibration transferred from the fourth elastic body to the output element cancels out at least a part of the other of vibration transferred from the second elastic body to the output element and vibration transferred from the fourth elastic body to the output element. It is possible to set the antiresonance point at which the vibration amplitude of the output element is zero in theory with the phase of vibration transferred from the second elastic body to the output element and the phase of vibration transferred from the fourth elastic body to the output element shifted by 180 degrees from each other so that the vibrations cancel out each other.

Furthermore, the studies and the analyses conducted by the inventors revealed that the natural frequency on the low-rotation side (low-frequency side) and the frequency of the antiresonance point became lower as the rigidity of the fifth elastic body was lowered, and that the difference between the natural frequency on the low-rotation side and the frequency of the antiresonance point became larger as the rigidity of the fifth elastic body was enhanced. Thus, with the damper device according to the present disclosure, by adjusting the rigidity of the fifth elastic body, the natural frequency on the low-rotation side and the frequency of the antiresonance point can be set appropriately while keeping the equivalent rigidity appropriate in accordance with the maximum torque input to the input element and suppressing an increase in the weights (moments of inertia) of the first and second intermediate elements. That is, by further reducing the natural frequency on the low-rotation side and the frequency of the antiresonance point by adjusting the rigidity of the fifth elastic body, it is possible to set the start point of a rotational speed band (frequency band) in which one of vibration transferred from the second elastic body to the output element and vibration transferred from the fourth elastic body to the output element is used to cancel out at least a part of the other on the lower-rotation side, and to set the rotational speed (frequency) at which the phase of vibration transferred from the second elastic body to the output element and the phase of vibration transferred from the fourth elastic body to the output element are shifted by 180 degrees from each other to the low-rotation side. In addition, by increasing the difference between the natural frequency on the lower-rotation side and the frequency of the antiresonance point by adjusting the rigidity of the fifth elastic body, the rotational speed band in which one of vibration transferred from the second elastic body to the output element and vibration transferred from the fourth elastic body to the output element is used to cancel out at least a part of the other can also be widened. Furthermore, it is possible to increase the torsional angle of at least one of the third and fourth elastic bodies by disposing one of the third and fourth elastic bodies corresponding to the second intermediate element, which has a higher natural frequency, on the radially outer side of the first and second elastic bodies corresponding to the first intermediate element, which has a lower natural frequency. Consequently, the rigidity of at least one of the third and fourth elastic bodies can be lowered while allowing transfer of large torque to the input element. Thus, it is possible to reduce the equivalent rigidity of the damper device, and to further shift resonance of the entire vibration system including the damper device to the low-rotation side (low-frequency side). As a result, the vibration damping performance of the damper device according to the present disclosure can be improved well by bringing the frequency of the antiresonance point described above closer to the frequency of vibration (resonance) to be damped by the damper device.

An axis of at least one of the third and fourth elastic bodies (SP21, SP3, SP22, SP4) may be positioned on the radially outer side with respect to axes of the first and second elastic bodies (SP11, SP1, SP12, SP2). That is, at least one of the third and fourth elastic bodies may be disposed so as to partially overlap at least one of the first and second elastic bodies in the radial direction as seen in the axial direction.

A higher one of a rigidity of the third elastic body (SP21, SP3) and a rigidity of the fourth elastic body (SP22, SP4) may be higher than a higher one of a rigidity of the first elastic body (S11, SP1) and a rigidity of the second elastic body (SP12, SP2), and one of the third and fourth elastic bodies (SP21, SP3) with the higher rigidity may be disposed on the radially outer side of the first and second elastic bodies (SP11, SP1, SP12, SP2). Consequently, it is possible to reduce the equivalent rigidity of the damper device.

Rigidities of the third and fourth elastic bodies (SP21, SP3, SP22, SP4) may be higher than rigidities of the first and second elastic bodies (SP11, SP1, SP12, SP2), and the third and fourth elastic bodies (SP21, SP3) may be disposed on the radially outer side of the first and second elastic bodies (S11, SP1, SP12, SP2). Consequently, it is possible to lower the rigidities of the third and fourth elastic bodies while allowing transfer of large torque to the input element.

Rigidities $k_{11}$, $k_{12}$, $k_{21}$, and $k_{22}$ of the first to fourth elastic bodies (SP11, SP1, SP12, SP2, SP21, SP3, SP22, SP4) may be selected so as to meet $k_{11} < k_2 < k_{22} \leq k_{21}$. In the damper device configured in this way, when deflection of all of the first to fifth elastic bodies is allowed, torque is transferred between the input element and the output element via a third torque transfer path that includes the third elastic body, the second intermediate element, the fifth elastic body, the first intermediate element, and the second elastic body, in addition to the first and second torque transfer paths described above. Consequently, it is possible to lower the rigidity of the first elastic body by decreasing torque distribution to the first elastic body. Additionally, by selecting the rigidities $k_{11}$, $k_{12}$, $k_{21}$, and $k_{22}$ so as to meet $k_{11} < k_{12} < k_2 \leq k_{21}$, not only the rigidity $k_{11}$ of the first elastic body can be lowered, but also the rigidity $k_{12}$ of the second elastic body can be lowered. Thus, it is possible to further reduce a friction force, that is, a hysteresis, generated between the first and second elastic bodies and the rotary elements by the weight reduction of the first and second elastic bodies due to the low rigidity, and to immediately complete phase inversion of vibration transferred from the second or fourth elastic body to the output element due to resonance of the first intermediate element by further reducing the natural frequency of the first intermediate element. As a result, the vibration damping performance of the damper device can be improved well by reducing a shift to the high-frequency side due to the hysteresis in frequency in which the phase of vibration transferred from the second elastic body to the output element is shifted by 180 degrees with respect to the phase of vibration transferred from the fourth elastic body to the output element.

When a rigidity of the fifth elastic body (SPm) is defined as "$k_m$", rigidities $k_{11}$, $k_{12}$, $k_{21}$, $k_{22}$, and $k_m$ of the first to fifth elastic bodies (SP11, SP1, SP12, SP2, SP21, SP3, SP22, SP4, SPm) may be selected so as to meet $k_{11} < k_m < k_{12} < k_{22} \leq k_{21}$. Consequently, it is possible to improve the vibration damping performance of the damper device extremely well by appropriately transferring torque from the second intermediate element to the first intermediate element via the fifth elastic body.

It should be noted, however, that the rigidity ($k_m$) of the fifth elastic body (SPm) may be higher than the rigidities ($k_{11}$, $k_{12}$, $k_{21}$, and $k_{22}$) of the first to fourth elastic bodies (SP11, SP1, SP12, SP2, SP21, SP3, SP22, SP4). That is, the difference between the natural frequency on the low-rotation side and the frequency of the antiresonance point is larger as the rigidity of the fifth elastic body is higher as discussed above. Thus, by making the rigidity of the fifth elastic body higher than the rigidities of the first to fourth elastic bodies, it is possible to widen the rotational speed band in which one of vibration transferred from the second elastic body to the output element and vibration transferred from the fourth elastic body to the output element is used to cancel out at least a part of the other, that is, a range in which the vibration level of the output element may be lowered well, by increasing the difference between the natural frequency of the first intermediate element and the frequency of the antiresonance point. Alternatively, the rigidity ($k_m$) of the fifth elastic body (SPm) may be lower than the rigidities ($k_{11}$, $k_{12}$, $k_{21}$, and $k_{22}$) of the first to fourth elastic bodies (SP11, SP1, SP12, SP2, SP21, SP3, SP22, SP4). That is, the natural frequency on the low-rotation side (low-frequency side) and the frequency of the antiresonance point are lower as the rigidity of the fifth elastic body is lower as discussed above. Thus, by making the rigidity of the fifth elastic body lower than the rigidities of the first to fourth elastic bodies, it is possible to set the start point of a rotational speed band (frequency band) in which one of vibration transferred from the second elastic body to the output element and vibration transferred from the fourth elastic body to the output element is used to cancel out at least a part of the other on the lower-rotation side by reducing the natural frequency of the first intermediate element and the frequency of the antiresonance point, and to set the rotational speed (frequency) at which the phase of vibration transferred from the second elastic body to the output element and the phase of vibration transferred from the fourth elastic body to the output element are shifted by 180 degrees from each other to the lower-rotation side.

The third and fourth elastic bodies (SP21, SP3, SP22, SP4) may be disposed side by side along a circumferential direction. Consequently, it is possible to make the damper device compact in the radial direction.

The third elastic body (SP3) may be disposed on the radially outer side of the fourth elastic body (SP4), and the first and second elastic bodies (SP1, SP2) may be disposed away from the third and fourth elastic bodies (SP3, SP4) in an axial direction. Consequently, it is possible to enhance the degree of freedom in setting of the third and fourth elastic bodies such as the rigidity, the number of the third and fourth elastic bodies to be disposed, and the torsional angle (stroke).

The first and second elastic bodies (SP11, SP1, SP12, SP2) may be disposed side by side along a circumferential direction. Consequently, it is possible to make the damper device compact in the radial direction.

The fifth elastic body (SPm) may be disposed side by side with the third and fourth elastic bodies (SP21, SP22) along a circumferential direction.

The fifth elastic body (SPm) may be disposed between the third and fourth elastic bodies (SP21, SP22) and the first and second elastic bodies (SP11, SP12) in a radial direction. Consequently, it is possible to secure the torsional angle (stroke) of the first to fifth elastic bodies well. In this case, the fifth elastic body may be disposed so as to at least partially overlap the first and second elastic bodies and the third and fourth elastic bodies in the axial direction of the damper device as seen in the radial direction of the damper device.

The fifth elastic body (SPm) may be disposed between the first and second elastic bodies (SP1, SP2) and the third and fourth elastic bodies (SP3, SP4) in the axial direction. Consequently, the degree of freedom in setting of the intermediate springs SPm such as the rigidity, the number of the intermediate springs SPm to be disposed, and the torsional angle (stroke) can be enhanced.

The fifth elastic body (SPm) may be disposed on the radially outer side of the first and second elastic bodies (SP1, SP2). Consequently, the degree of freedom in setting of the intermediate springs SPm such as the rigidity, the number of the intermediate springs SPm to be disposed, and the torsional angle (stroke) can be enhanced.

The input element (11, 11V, 11W, 11X, 11Y, 11Z) may have an abutment portion (111ci, 112ci, 111c, 112c, 113c) that abuts against an end portion of the first elastic body (SP11, SP1) in a circumferential direction and an abutment portion (111co, 112co, 111c, 112c) that abuts against an end portion of the third elastic body (SP21) in the circumferential direction; the output element (16, 16V, 16W, 16X, 16Y, 16Z) may have an abutment portion (16ci, 161c, 162ci, 162c, 163c) that abuts against an end portion of the second elastic body (SP12, SP2) in the circumferential direction and an abutment portion (16co, 162co, 162c) that abuts against an end portion of the fourth elastic body (SP22) in the circumferential direction; the first intermediate element (12, 12V, 12W, 12X, 12Y, 12Z) may have an abutment portion (121c, 122c, 12c, 121co, 122co) that abuts against an end portion of the first elastic body (SP11, SP1) in the circumferential direction, an abutment portion (121c, 122c, 12c, 121ci, 122ci) that abuts against an end portion of the second elastic body (SP12, SP2) in the circumferential direction, an abutment portion (121d, 12d, 123d) that abuts against a first end portion of the fifth elastic body (SPm) in the circumferential direction, and an abutment portion (121d, 12d, 50d, 123d) that abuts against a second end portion of the fifth elastic body (SPm) in the circumferential direction; and the second intermediate element (14, 14V, 14W, 14X, 14Y, 14Z) may have an abutment portion (14c, 14ca, 14cb, 141co, 142co) that abuts against an end portion of the third elastic body (SP21, SP3) in the circumferential direction, an abutment portion (14c, 14ca, 14cb, 141ci, 142c) that abuts against an end portion of the fourth elastic body (SP22, SP4) in the circumferential direction, an abutment portion (14d, 143d) that abuts against the first end portion of the fifth elastic body (SPm) in the circumferential direction, and an abutment portion (14d, 14da, 14db, 143d) that abuts against the second end portion of the fifth elastic body (SPm) in the circumferential direction.

A moment of inertia ($J_{21}$) of the first intermediate element (12, 12V, 12W, 12X, 12Y, 12Z) may be larger than a moment of inertia ($J_{22}$) of the second intermediate element (14, 14V, 14W, 14X, 14Y, 14Z). Consequently, it is possible to lower the vibration level around the antiresonance point by reducing the natural frequency of the first intermediate element.

The first intermediate element (12, 12V, 12W, 12X, 12Y, 12Z) may be coupled so as to rotate together with a turbine runner (5) of a fluid transmission apparatus. Consequently, the substantial moment of inertia of the first intermediate element (the total moment of inertia) can be increased. Thus, it is possible to further reduce the natural frequency of the first intermediate element.

Torque from the engine (EG) may be transferred to the input element (11, 11V, 11W, 11X, 11Y, 11Z) via a lock-up clutch (8); and a lock-up rotational speed (Nlup) of the lock-up clutch (8) may be higher than a rotational speed corresponding to the natural frequency ($f_{21}$) of the first intermediate element (12, 12V, 12W, 12X, 12Y, 12Z) at the time when torque is transferred from the input element (11, 11V, 11W, 11X, 11Y, 11Z) to the output element (16, 16V, 16W, 16X, 16Y, 16Z) via all of the first to fifth elastic bodies (SP11, SP1, SP12, SP2, SP21, SP3, SP22, SP4, SPm), and lower than a rotational speed corresponding to the natural frequency ($f_{22}$) of the second intermediate element (14, 14V, 14W, 14X, 14Y, 14Z). In this way, with the rotational speed corresponding to the natural frequency of the first intermediate element included in the non-lock-up region of the lock-up clutch, one of vibration transferred from the second elastic body to the output element and vibration transferred from the fourth elastic body to the output element can be used to cancel out at least a part of the other since the time when lock-up is established by the lock-up clutch.

Deflection of the first to fifth elastic bodies (SP11, SP1, SP12, SP2, SP21, SP3, SP22, SP4, SPm) may be allowed until torque (T) transferred to the input element (11, 11V, 11W, 11X, 11Y, 11Z) becomes equal to or more than a threshold (T1) determined in advance. Consequently, it is possible to improve the vibration damping performance of the damper device well when torque transferred to the input element is relatively small and the rotational speed of the input element is low.

The output element (16, 16V, 16W, 16X, 16Y, 16Z) may be functionally (directly or indirectly) coupled to an input shaft (IS) of a transmission (TM). The input element (11, 11V, 11W, 11X, 11Y, 11Z) may be functionally (directly or indirectly) coupled to an output shaft of an internal combustion engine (EG).

The disclosure according to the present disclosure is not limited to the embodiment described above in any way, and it is a matter of course that the disclosure may be modified in various ways without departing from the range of the extension of the present disclosure. Furthermore, the embodiment described above is merely a specific form of the disclosure described in the "SUMMARY" section, and does not limit the elements of the disclosure described in the "SUMMARY" section.

INDUSTRIAL APPLICABILITY

The disclosure according to the present disclosure can be utilized in the field of manufacture of damper devices or the like.

The invention claimed is:
1. A damper device comprising:
an input element to which torque from an engine is transferred;
an output element;
a first intermediate element;
a second intermediate element;
a first elastic body that transfers torque between the input element and the first intermediate element;
a second elastic body that transfers torque between the first intermediate element and the output element;
a third elastic body that transfers torque between the input element and the second intermediate element;
a fourth elastic body that transfers torque between the second intermediate element and the output element; and
a fifth elastic body that transfers torque between the first intermediate element and the second intermediate element, wherein:

a natural frequency of the second intermediate element at a time when torque is transferred from the input element to the output element via all of the first to fifth elastic bodies is higher than a natural frequency of the first intermediate element at the time when torque is transferred from the input element to the output element via all of the first to fifth elastic bodies; and
at least one of the third and fourth elastic bodies is disposed on a radially outer side of the first and second elastic bodies.

2. The damper device according to claim 1, wherein an axis of at least one of the third and fourth elastic bodies is positioned on the radially outer side with respect to axes of the first and second elastic bodies.

3. The damper device according to claim 2, wherein a higher one of a rigidity of the third elastic body and a rigidity of the fourth elastic body is higher than a higher one of a rigidity of the first elastic body and a rigidity of the second elastic body, and one of the third and fourth elastic bodies with the higher rigidity is disposed on the radially outer side of the first and second elastic bodies.

4. The damper device according to claim 1, wherein a higher one of a rigidity of the third elastic body and a rigidity of the fourth elastic body is higher than a higher one of a rigidity of the first elastic body and a rigidity of the second elastic body, and the one of the third and fourth elastic bodies with the higher rigidity is disposed on the radially outer side of the first and second elastic bodies.

5. The damper device according to claim 1, wherein rigidities of the third and fourth elastic bodies are higher than rigidities of the first and second elastic bodies, and the third and fourth elastic bodies are disposed on the radially outer side of the first and second elastic bodies.

6. The damper device according to claim 1, wherein rigidities $k_{11}$, $k_{12}$, $k_{21}$, and $k_{22}$ of the first to fourth elastic bodies are selected so as to meet $k_{11} < k_2 < k_{22} \le k_{21}$.

7. The damper device according to claim 1, wherein when a rigidity of the fifth elastic body is defined as "$k_m$", rigidities $k_{11}$, $k_{12}$, $k_{21}$, $k_{22}$, and $k_m$ of the first to fifth elastic bodies are selected so as to meet $k_{11} < k_m < k_{12} < k_{22} \le k_{21}$.

8. The damper device according to claim 1, wherein the third and fourth elastic bodies are disposed side by side along a circumferential direction.

9. The damper device according to claim 1, wherein the third elastic body is disposed on the radially outer side of the fourth elastic body, and the first and second elastic bodies are disposed away from the third and fourth elastic bodies in an axial direction.

10. The damper device according to claim 9, wherein the fifth elastic body is disposed between the third and fourth elastic bodies and the first and second elastic bodies in a radial direction.

11. The damper device according to claim 9, wherein the fifth elastic body is disposed between the first and second elastic bodies and the third and fourth elastic bodies in the axial direction.

12. The damper device according to claim 9, wherein the fifth elastic body is disposed on the radially outer side of the first and second elastic bodies.

13. The damper device according to claim 1, wherein the first and second elastic bodies are disposed side by side along a circumferential direction.

14. The damper device according to claim 1, wherein the fifth elastic body is disposed side by side with the third and fourth elastic bodies along a circumferential direction.

15. The damper device according to claim 1, wherein:
the input element has an abutment portion that abuts against an end portion of the first elastic body in a circumferential direction and an abutment portion that abuts against an end portion of the third elastic body in the circumferential direction;
the output element has an abutment portion that abuts against an end portion of the second elastic body in the circumferential direction and an abutment portion that abuts against an end portion of the fourth elastic body in the circumferential direction;
the first intermediate element has an abutment portion that abuts against an end portion of the first elastic body in the circumferential direction, an abutment portion that abuts against an end portion of the second elastic body in the circumferential direction, an abutment portion that abuts against a first end portion of the fifth elastic body in the circumferential direction, and an abutment portion that abuts against a second end portion of the fifth elastic body in the circumferential direction; and
the second intermediate element has an abutment portion that abuts against an end portion of the third elastic body in the circumferential direction, an abutment portion that abuts against an end portion of the fourth elastic body in the circumferential direction, an abutment portion that abuts against the first end portion of the fifth elastic body in the circumferential direction, and an abutment portion that abuts against the second end portion of the fifth elastic body in the circumferential direction.

16. The damper device according to claim 1, wherein a moment of inertia of the first intermediate element is larger than a moment of inertia of the second intermediate element.

17. The damper device according to claim 1, wherein the first intermediate element is coupled so as to rotate together with a turbine runner of a fluid transmission apparatus.

18. The damper device according to claim 1, wherein:
torque from the engine is transferred to the input element via a lock-up clutch; and
a lock-up rotational speed of the lock-up clutch is higher than a rotational speed corresponding to the natural frequency of the first intermediate element at the time when torque is transferred from the input element to the output element via all of the first to fifth elastic bodies, and lower than a rotational speed corresponding to the natural frequency of the second intermediate element.

19. The damper device according to claim 1, wherein deflection of the first to fifth elastic bodies is allowed until torque transferred to the input element becomes equal to or more than a threshold determined in advance.

20. The damper device according to claim 1, wherein the output element is functionally coupled to an input shaft of a transmission.

\* \* \* \* \*